United States Patent
Chang et al.

(10) Patent No.: US 9,780,859 B2
(45) Date of Patent: Oct. 3, 2017

(54) MULTI-USER MIMO VIA ACTIVE SCATTERING PLATFORMS

(71) Applicants: Donald C. D. Chang, Thousand Oaks, CA (US); Juo-Yu Lee, Camarillo, CA (US)

(72) Inventors: Donald C. D. Chang, Thousand Oaks, CA (US); Juo-Yu Lee, Camarillo, CA (US)

(73) Assignee: Spatial Digital Systems, Inc., Agoura Hills, CA (US)

( * ) Notice: Subject to any disclaimer, the term of this patent is extended or adjusted under 35 U.S.C. 154(b) by 0 days.

(21) Appl. No.: 14/193,540

(22) Filed: Feb. 28, 2014

(65) Prior Publication Data

US 2014/0219124 A1  Aug. 7, 2014

(51) Int. Cl.
| | |
|---|---|
| *H04B 7/06* | (2006.01) |
| *H04L 5/00* | (2006.01) |
| *H04B 7/0413* | (2017.01) |
| *H04B 7/0456* | (2017.01) |

(52) U.S. Cl.
CPC ......... *H04B 7/0626* (2013.01); *H04B 7/0413* (2013.01); *H04L 5/0048* (2013.01); *H04B 7/0456* (2013.01)

(58) Field of Classification Search
CPC .. H04B 7/0626; H04B 7/0417; H04B 7/0639; H04B 7/024; H04B 7/0413; H04B 7/0632; H04B 7/0617; H04B 7/0421; H04L 1/0026; H04L 5/0057; H04L 5/0035; H04W 24/10
See application file for complete search history.

(56) References Cited

U.S. PATENT DOCUMENTS

| | | | | |
|---|---|---|---|---|
| 2007/0205943 A1* | 9/2007 | Nassiri-Toussi et al. | ...... | 342/377 |
| 2007/0217433 A1* | 9/2007 | Doppler | .................. | H04B 7/02 370/400 |
| 2008/0291864 A1* | 11/2008 | Chang | .......................... | 370/316 |
| 2009/0279490 A1* | 11/2009 | Alcorn | .......................... | 370/329 |
| 2012/0155562 A1* | 6/2012 | Lucidarme | ........... | H04B 7/0689 375/267 |
| 2012/0200458 A1* | 8/2012 | Jalali et al. | .................... | 342/372 |
| 2012/0250541 A1* | 10/2012 | Ko et al. | ....................... | 370/252 |
| 2013/0163461 A1* | 6/2013 | Kim et al. | ..................... | 370/252 |
| 2014/0165144 A1* | 6/2014 | Kim | ...................... | H04W 12/02 726/3 |

* cited by examiner

*Primary Examiner* — Charles C Jiang
*Assistant Examiner* — Oussama Roudani

(57) ABSTRACT

Aircrafts flying near Earth or naval vessels are used as active scattering platforms in a multipath communications channel in MIMO communications systems. These man-made platforms in a communications channel, with techniques of beam forming and wavefront multiplexing in both transmitters at source and receivers at destinations enhance the ability to coherently combine the power of the communication signals, and improve the signal-to-noise ratio in addition to the MIMO advantage of multiple times of channel capacity over a finite bandwidth via frequency reuse. These platforms may be stationary, mobile ground based, or ocean surface based. They may also be airborne, or space borne. A swarm of 10's micro-UAV based mini-transponders is an example through active scattering of these micro-UAV to generate 10x more available bandwidth between a base station and ground mobile users over same bandwidth.

28 Claims, 34 Drawing Sheets

MULTI-USER MIMO VIA ACTIVE SCATTERING PLATFORMS

RELATED APPLICATIONS

This application claims priority to U.S. provisional application No. 61/903,909, filed on Nov. 13, 2013, which is incorporated herein by reference in its entirety. Present invention relates to multiple-user multiple-input-multiple-output (MU MIMO) communications systems, as well as communications via fixed platforms such as basestations, mobile and relocatable ground platforms, air platforms such as UAVs, and satellites. It is also related to wavefront multiplexing/de-multiplexing (WF muxing/demuxing) technologies.

U.S. patent application Ser. No. 13/623,882, filed Sep. 21, 2012, entitled "Concurrent Airborne Communication Methods and Systems," is incorporated herein by reference in its entirety.

U.S. patent application Ser. No. 13/778,171, filed Feb. 27, 2013, entitled "Multi-Channel Communication Optimization Methods and Systems," is incorporated herein by reference in its entirety.

U.S. patent application Ser. No. 14/182,665, filed Feb. 18, 2014, entitled "Multi-User MIMO via Frequency Re-Use in Smart Antennas," is incorporated herein by reference in its entirety.

TECHNICAL FIELD

MIMO communications channels provide an interesting solution to multipath challenges by requiring multiple signal paths. In effect, MIMO systems use a combination of multiple antenna elements and multiple signal paths to gain knowledge of a communications channel. By using the spatial dimension of a communications link, MIMO systems can achieve significantly higher data rates than traditional single-input, single-output (SISO) channels. In a 2×2 MIMO system, signals propagate along multiple paths from the transmitter to the receiver antennas. Using this channel knowledge, a receiver can recover independent streams from each of the transmitter's antennas, A 2×2 MIMO system produces two spatial streams to effectively double the maximum data rate of what might be achieved in a traditional 1×1 SISO communications channel.

The present invention relates to multiple-user multiple-input-multiple-output (MU MIMO) communications systems through multipath propagation scattering from multiple transponding platforms; including unman air vehicles (UAVs), geo-stationary earth orbit (GEO) satellites, and non-geostationary earth orbit (NGEO) satellites. Transponding RF signals on a platform comprises of functions of receiving RF signals, low-noise-amplifying the received RG signals, filtering the amplified received signals, frequency translating the filtered signals, power-amplifying the frequency translated signals, and re-radiating the amplified signals. A multiple-user multiple-input-multiple-output (MU MIMO) communications system for a point-to-multipoint (p-to-mp) via a composited transfer function technique for efficient frequency reused is described. One of the key features of the MIMO systems is a multipath dominated communications channel comprising of multiple active scattering platforms. As a result, a multipath propagation channel from a source to multiple destinations will not only be measurable but also controllable via these active scattering platforms to more efficiently provide frequency reuse among multiple users via discriminative propagation features to various destinations.

The invention is also related to wavefront multiplexing/de-multiplexing (WF muxing/demuxing) technologies. The objectives for the invention is to provide means for (1) multiple users to re-use allocated spectrum concurrently in MIMO communications configurations, and (2) enabling these users to share allocated resources dynamically and efficiently. Conventional MIMOs take advantage of scattering in a multi-path dominated communication channel which is typically characterized by many "transfer functions". A transfer function, hij, is for typical measurements of propagation delays and attenuation from an ith source element in transmit to a jth destination element in receiving through the multipath dominated communications channel.

SUMMARY OF THE INVENTION

This disclosure describes exemplary embodiments on improving the operation and use of MIMO communication methods and systems for multiple users (MU) to re-use same spectrum such as through channel state information (CSI) to form user-selection and/or rejection processing in transmission side. Embodiments pertain to wireless communications through a multipath dominant channel; where the multipaths are through man-made active scattering platforms. These platforms are in parallel paths providing amplifications, delays and directional adjustments from a signals source to a destination. When the sources and destinations are on ground in many embodiments, airborne platforms serve as bent-pipe transponders, which perform receiving, low-noise-amplifying, filtering, frequency translating, power-amplifying, and re-radiating functions for serving signals through the platforms.

This disclosure on MU-MIMO is summarized as followed;

- MIMO Communications channels from a transmitting source to multiple receiving destinations are through active scattering from many transponding platforms
- Frequency reuse is accomplished by directional diversity in transmitters via formulations of point-to-multipoint (p-to-mp) composited transfer functions and optimizations on the formulated functions under multiple specified performance constraints for user identifications and discriminations.
- Optimizations are through beam shaping techniques under performance constraints associated with locations indexed by user identifications or indexed by user element identifications.
- A composited transfer function is optimized to represent an optimally shaped beam, featuring a point-to-multipoint (p-to-mp) characteristics including integrated effects of transponding platforms; with favorable connectivity for one specified user and discrimination against others
- a composited transfer function
  i. used for specified performance constraints for a shaped transmitting beam which features p-to-mp with connectivity for one user and discrimination against others
  ii. a radiation pattern of shaped beam is a linear combination from radiation patterns of multiple transmitting elements
  iii. performance constraints for optimization via
     1. Orthogonal beam (OB) criteria
     2. Quiet zone criteria, and 3. others.

multiple concurrent transmit beams are optimized under performance constraints by a set of many composited transfer functions different signal streams for various destinations are sent via multiple shaped transmitting beams, WF muxing/demuxing are incorporated as effective means for dynamic allocations on communications resources (bandwidth and RF power) among multiple users.

examples of many different configurations are presented.

In some embodiments, MIMO configurations feature a point-to-point (p-to-p) architecture with a source at a communication hub via radiations from multiple base-stations (BS) to a destination in a common coverage of these BS's which are on transponding platforms. The MIMO configurations may also feature a point-to-multipoint (p-to-mp) architecture with a source at a communication hub via radiations from multiple base-stations (BS) to multiple destinations in a common coverage of these transponding platforms.

In the MIMO systems of present invention, the serving signals for transmission to user equipment (UE) via multiple paths will utilize composited transfer functions selected and characterized based on channel state information (CSI); which comprises of responses from probing signal sequences for a propagation channel dominated by multipaths in accordance with a dynamic user distribution. Each propagating path features a set of unique transponding functions. The composited transfer functions are constructed or shaped to be "user dependent" with enhanced responses to a selected user and suppressed ones for other users. When operating in coordinated modes, more cooperating UEs are configured to suppress interference to other UE using the same frequency resources. Optimization methods for the composited transfer functions based on selected criteria are presented in latter sections.

Some embodiments relate to coordinated point-to-multipoint (p-to-mp) communications in spoke- and hub configurations. The criteria for shaping the composited transfer functions for a transmitter in a communications hub may include those in many beam-shaping techniques; such as orthogonal beams (OB), quiet-zones, and others. Some embodiments relate to wavefront multiplexing (WF muxing)/demultiplexing (demuxing) as means for coordinated or organized concurrent propagations through multipath dominated channels. As a result, methods for calibrations and equalizations among multiple path propagations become possible. Some are through forward paths only. Consequently, implementations of techniques on coherent power combining in receivers for enhance signal-to-noise ratios (SNR) are simple and cost effective.

BACKGROUND

Wireless communication using multiple-input multiple-output (MIMO) systems enables increased spectral efficiency for a given total transmit power. Increased capacity is achieved by introducing additional spatial channels in multipath dominant propagation environment, which are exploited by various techniques such as spatial multiplexing, space-time (Block) coding and others as a part of pre-processing to maximize isolations among these parallel channels. Many MIMO systems feature enhanced spectral efficiency for single users. A single use MIMO features a single multi-antenna transmitter communicating with a single multi-antenna receiver. Given a MIMO channel, duplex method and a transmission bandwidth, a system can be categorized according to (1) flat or frequency selective fading, and/or (2) with full, limited, or without transmitter channel state information (CSI).

In contrast, multi-user MIMO (MU-MIMO) is a set of advanced MIMO technologies where the available antenna elements are spread over a multitude of independent access points and independent radio terminals—each terminal with one or multiple elements. To enhance communication capabilities of all terminals, MU-MIMO applies an extended version of space-division multiple access (SDMA) to allow multiple transmitters to send separate signals and multiple receivers to receive separate signals simultaneously in the same frequency or time slots, or with same codes in the same frequency or time slots. There have been many MIMO-OFDM systems for multiple users' applications. Different users will use various sets of frequency slot distribution patterns over the same bandwidth over which orthogonal frequency components are radiated.

Our techniques exploit three aspects of propagation channels for multiple user MIMO systems; (1) the multiple parallel paths are through multiple active bent-pipe transponding platforms; (2) shaping MIMO channel transfer functions based on available channel state information (CSI) at transmission side including effects of propagating through multiple transponding platforms, and (3) applying WF multiplexing to efficiently sharing power and bandwidth provide by these transponding platforms among multiple users.

Transponding platforms include ground based basestations (BS), airborne platforms, and satellites. The airborne platforms may comprise of unmanned air vehicles (UAVs) equipped with transponders, which may be as large as in wing spans >100 ft carrying >10 medium or low power transponders operated above 10 Km in stratosphere, or as small as less than 6 inches carrying only one set of low power transponding devices usually operated at a height <1 km. Medium or low power transponders are referred to those with ~10 Watt or ~1 Watt radiated RF power, respectively. Transponding satellites may be configured as powerful as a high power communications satellite in geo-stationary earth orbit (GEO) with slightly less than 20 KW total DC power and >5000 Kg gross weight carrying >100 transponders with a height of ~10 m with unfolded antennas and a width of ~50 m measured with deployed solar panels. Some of transponding satellites may also be configured as small as a microsat carrying a low to medium power transponder in low earth orbits (LEO) with ~10 W in total DC power, ~1 Kg in gross weight, and a 10 cm cube in volume.

Present invention features additional pre-processing at transmission side on available channel state information (CSI) which is formulated via channel transfer functions/matrixes, simply composited transfer functions (CTFs), or composited transfer matrixes. The preprocessors are built via linear combinations of multiple transmitting antennas by beam forming networks, "shaping" the MIMO transfer functions. As a result, the inputs of the preprocessors become accessible to user-selectable composited transfer functions (CTFs), which are optimized via shaping and optimization algorithms; similar to many in smart beam shaping techniques. However, discrimination parameters for a composited transfer functions are not "constrained" in directions as those specified in conventional shaped beams. The constraints in the composited transfer functions are identified (ID) as "user indexed" or specified as "user ID indexed". These user indexed performance constraints effectively enable optimizations for composited transfer functions so that frequency re-use via "directional diversity" become possible.

To make clear of meaning of a few technical terms related to multiple "active scattering platforms" in this application, we summarize a few below.

i. Active scattering platforms feature communications electronics which receive RF signals originated from a remote transmitter from a given direction through a receiving antenna. The received signals are amplified, filtered, "further processed", and then power amplified before re-radiated toward various directions via a transmitting antenna. The pointing directions and coverage of the receiving and the transmitting antennas may not be the same. As a result, the incoming RF signals to these active scattering platforms are much weaker than the intensity levels of the re-radiated RF signals in various directions. The re-radiated RF signals may be "biased" to a preselected field of view (FOV).

ii. The FOV for the re-radiated RF signals may be remotely configurable iii. The "further processed" may include frequency translations. In those cases the communications electronics on the active scattering platforms are transponders.

iv. When the transponding platforms are mobile airborne or space borne without de-modulations and re-modulations, their communications electronic payloads are non-regenerative transponders.

v. When users, including both transmitters and receivers remotely connected to the transponding platforms, are on ground or near ground, the non-regenerative electronic payloads are "bent-pipe" transponders.

vi. The transponding platforms may be dynamically distributed, ground base or near ground base, while remote users (either transmitting or receiving) are airborne or space borne. This feature shall be applicable of setting up a set of ground base crosslinks among low-earth-orbit (LEO) satellites via MIMO techniques.

vii. A p-to-p MIMO channel for enhanced channel capacity via frequency reused is built on the randomness of a dynamic distribution of the multiple platforms which feature a common coverage.

viii. For a p-to-mp scenario, each transponding platform will carry an aggregation of many sets of partial information to various receivers.

ix. A p-to-mp MIMO channel for multi-users via frequency re-usage is built on a randomness of a different dynamic distribution of the multiple platforms which feature concurrent but discriminative coverage. The discriminative resolution among multiple receivers relays on the dimensions of the distributed platforms.

A composited transfer function (CTF) optimized under a finite number of user indexed performance constraints featuring a 1-to-m concurrent relationship, and is a spatially sampled radiation pattern of an optimally shaped beam viewed through a dynamic communication channel dominant by multiple paths. There are m spatially sampled outputs in a radiation pattern from an optimized BFN and only one common input to the BFN. In other words, this optimized function features integrated effects of an optimally shaped beam cascaded by effects of multiple scattering paths in a propagation channel. The function is optimized under the user indexed performance constraints via a selected optimization algorithm.

Composited transfer functions shaped for enhanced isolations among multiple users will have distinct responsive features to various users. For a two-user MIMO example in a multipath dominated environment; a first set of parallel preprocessors for transmission in a hub may feature composited transfer functions (CTFs), characterizing propagation paths from the inputs of the pre-processors all the way to various elements of the two user antennas, with "high" intensity responses to antenna elements of a first users while concurrently showing "low" intensity responses to a second users. Similarly, a second set of preprocessors may feature complex transfer functions (CTFs) with "low" intensity responses to all antenna elements of the first users while concurrently showing "high" intensity responses to those of the second users.

Outputs of two conventional MIMO processors, one for the first user and the other for the second user, are respectively connected to the inputs of the two sets of the preprocessors. The multiple outputs of the pre-processors are then connected to the same suite of the transmitting antenna elements. As a result, spectrum can be reused multiple times for better spectrum utility efficiency.

Our receiver design concepts include techniques incorporating multiple antenna elements and using space-time-frequency adaptive processing. Coordinated multi-user communication networks coordinate and/or combine signals from multiple antenna elements or base stations to make it possible for mobile users to enjoy consistent performance and quality when they access and share videos, photos and other high-bandwidth services, whether they are close to the center of their serving cell or at its outer edges. One issue with these networks is that conventional channel quality feedback schemes do not take into account a reduction in interference that can be achieved by coordination. Thus, there are general needs for these networks and methods for beamforming coordination that take into account the reduction in interference that results from the coordination of the base stations. There are also general needs for channel quality feedback schemes suitable for interference suppression in a coordinated multi-user network.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Unmanned air platforms (UAVs), are used in most of the illustrations for active scattering in a communications channel dominated by multipath propagations. In many embodiments, other types of mobile or stationary transponding platforms, including other air platforms, satellites, and those ground or sea based stationary and mobile platforms, may be incorporated to substitute the transponding UAVs for active scattering in a multipath dominated communications channel. Embodiments set forth in the claims also encompass all available equivalents of those claims.

Figure 1A:
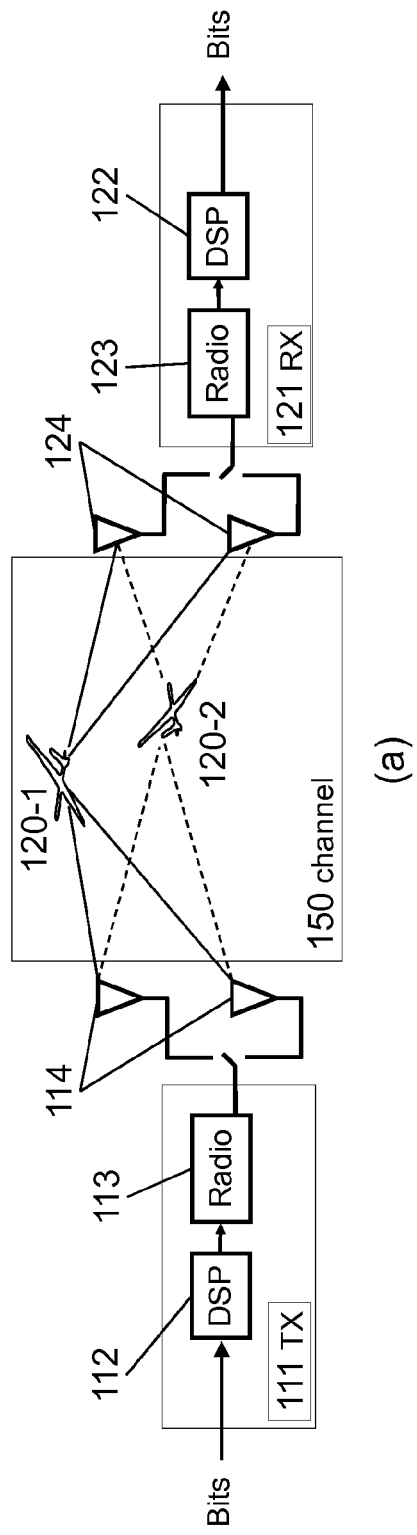
FIG. 1a illustrates a communication network in a multipath dominated propagation environment with antenna diversity. The multipaths are created via airborne platforms.

FIG. 1a illustrates a point-to-point (p-to-p) communication network in accordance with some embodiments. It shows the UAVs 120-1 and 120-2 and "bent-pipe" links from a transmitter 111 at a source on ground to a receiver 121 at a destination on ground via the UAVs in a communication channel 150. The communications system features a transmitter 111 at a source with a transmit antenna with diversity 114, and a receiver 121 at a destination with a receive antenna with diversity 124. The transmitter 111 at the source comprises a digital signal processor (DSP) 111 and a radio 113 comprising a frequency up-converter, and power amplifiers, or their equivalents. The DSP 111 may perform additional coding and other formatting functions on input signals which shall have already been modulated for transmission. The additional coding may include demodulating and re-modulating with new codes, or simply adding codes on modulated waveforms; e.g. OFDM. A propagation channel 150 comprises multiple transponding UAVs 120-1 and 120-2 in slow-moving flying patterns; such as in forms of small figures of "8" or small race tracks. The UAVs 120-1 and 120-2 feature receiving links covering the transmitter 111 at the source, and transmitting links for the receiver 121 at the destination. We also referred these UAVs as active scattering platforms in a multipath dominate channel 150.

Transponding payloads just like typical payloads for transponding satellites in C or Ku band, not shown, each of the UAVs features L or S-band transponders to receive signals in a first uplink frequency slot, $f_{u1}$, radiated by the transmitter 111 on a ground source site. The received signals on the UAV 120-1 are amplified by low noise amplifiers, and then properly filtered, frequency translated to a first down link frequency slot, $f_{d1}$, power-amplified before re-radiated toward the receiver 121 at a destination.

Referring to FIG. 1a, the receiver 121 comprises a radio 123 which comprising low noise amplifiers, frequency down-converters, digitizers, and a digital signal processor (DSP) 122 performing channel-decoding and other re-formatting functions. In MIMO terminology, this is called Single Input, Single Output (SISO). In information theory, the Shannon-Hartley theorem tells the maximum rate at which information can be transmitted over a communications of a specified bandwidth in the presence of noise. The channel 150 comprises of two independent links in series; an uplink from the transmitter 111 at a source location to UAVs, and a down link from UAVs to the receiver 121 at a destination. The theorem establishes Shannon's channel capacity for such a communication link, a bound on the maximum amount of error-free information that can be transmitted with a specified bandwidth in the presence of the noise interference. According to Shannon, the capacity C of a radio channel 150 is dependent on bandwidth B and the signal-to-noise ratio S/N which shall include effects of both links. The following applies to a SISO system:

$$C = B \log_2(1 + S/N) \quad (1)$$

Conventional "Single Input Single Output" (SISO) systems were favored for simplicity and low-cost but have some shortcomings: (a) outage occurs if receiving antennas fall into null, however, switching between different antennas 114 and 124 (among total four possibilities as depicted in FIG. 1) can help in circumventing channel fading, (b) radiated power is wasted by sending signals in all directions from Omni directional transmitting antennas and will cause additional interference to other users; (c) sensitive to interference from all directions, and (d) total radiated power limited by output of a single power amplifier.

Figure 1B:
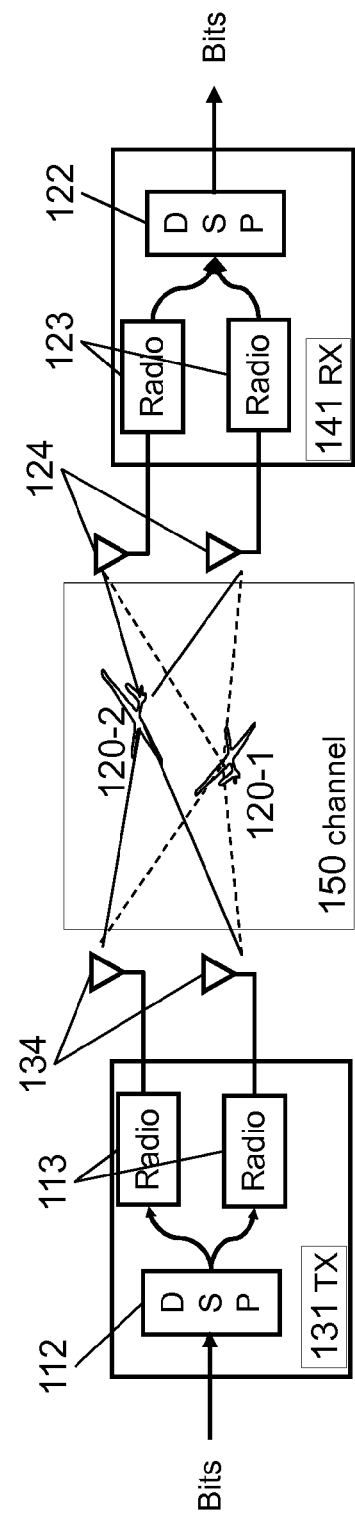
FIG. 1b illustrates a point-to-point (p-to-p) communication network in a multipath dominated propagation environment with a multiple-input and multiple-output (MIMO) configuration in accordance with some embodiments. The multipaths are created via airborne platforms.

FIG. 1b depicts a Multiple Input Multiple Output (MIMO) system with multiple parallel radios for single user. The system links a source to a destination through a communication channel with multiple active scattering UAV platforms, and features a transmitter 131 at the source with a two transmit antennas 134, and a receiver 141 with two receive antennas 124 at the destination. The transmitter 131 comprises a digital signal processor (DSP) 112 performing segmenting (or dividing), additional coding and other formatting functions on input signals which has been modulated, and a radio 113 comprising of a frequency up-converter, and power amplifiers, or their equivalents. A propagation channel 150 comprises multiple transponding UAVs 120-1 and 120-2 in slow-moving flying patterns; such as in forms of small figures of "8" or small race tracks. Each of the UAVs 120-1 and 120-2 feature receiving links covering the transmitter 111 at the source, and transmitting links for the receiver 121 at the destination. The receiver 141 comprises a radio 123 consisting low noise amplifiers, frequency down-converters, and demodulators; and a digital signal processor (DSP) 142 performing decoding, de-segmenting (or combining), and other re-formatting functions.

MIMO systems with multiple parallel radios in general improve the following; (a) outages due to dynamic fading are reduced by using information from multiple antennas, (b) total transmit power are increased via multiple power amplifiers, (c) higher throughputs are possible, and (d) transmit and receive interference can be limited by many techniques.

The MIMO system in FIG. 1b consists of n (n=2) transmit and m (m=2) receive antennas. By using the same channel 150 as that in FIG. 1a, every receiving antenna 124 receives two leaking components intended for the other antenna. The connection from antenna 1 of the transmitter antennas 134 through a communication channel 150 to antenna 1 of the receiver antennas 124 is specified with $h_{11}$, etc., while the leaking connections from antenna 1 of the transmitter antennas 134 via the communication channel 150 to antenna 2 of the receiver antennas 124 is identified as cross component $h_{21}$, etc. There is a transmission matrix; $\|H\|$ with the dimensions n×m, or 2×2 for FIG. 1b;

$$\|H\| = \begin{bmatrix} h_{11} & h_{12} \\ h_{21} & h_{22} \end{bmatrix}. \quad (2)$$

The following transmission formula results from receive vector y, transmit vector x, and noise n;

$$y = Hx + n. \quad (3)$$

To characterize the propagation effects in the multipath dominant communications channel 150 from a first one of the radiating elements 134 of the transmitter 131 to a first one of the receiving elements 124 of the receiver 141, a transfer function $h_{11}$ is a result of following two parallel paths; (1) path 1 from the first radiating element 134 to the first UAV 120-1 followed by a link to the first receiving element 124, and (2) path 2 from the first radiating element 134 to the second UAV 120-2 followed by a link to the first receiving element 124. Similarly, each of the other three transfer functions, $h_{21}$, $h_{12}$, and $h_{22}$, are results of two parallel propagating effects through the two UAVs 120-1 and 120-2. If there were M UAVs, each of the 4 four transfer functions ($h_{11}$, $h_{21}$, $h_{12}$, and $h_{22}$) should become results of effects from parallel propagating paths through the M UAVs.

Data to be transmitted is divided into independent data sub-streams. The number of sub-streams M is always less than or equal to the number of radiating or transmitting antennas. In the case of asymmetrical (m≠n) antenna constellations, M is always smaller or equal the minimum number of antennas. For example, a 4×4 system could be used to transmit four or fewer streams, while a 3×2 system could transmit two or fewer streams. Theoretically, the capacity C increases linearly with the number of streams M $$C = MB \log_2(1 + S/N) \quad (4)$$

When the individual streams are assigned to various users, this is called Multi-User MIMO (MU-MIMO). This mode is particularly useful in the uplink because the complexity on the UE side can be kept at a minimum by using only one transmit antenna. This is also called 'collaborative MIMO'. Cyclic delay diversity (CDD) introduces virtual echoes into OFDM-based systems. This increases the frequency selectivity at the receiver. In the case of CDD, the signals are transmitted by the individual antennas with a time delay. Because CDD introduces additional diversity components, it is particularly useful as an addition to spatial multiplexing.

Spatial diversity comprises receiving (Rx) and transmitting (Tx) versions. The purpose of spatial diversity in FIG.

1a is to make the transmission more robust. There is no increase in the data rate. This mode uses redundant data on different paths.

Rx diversity uses more antennas on the receiver side than on the transmitter side. A simple scenario consists of two Rx and one Tx antenna (SIMO, 1×2). Because special coding methods are not needed, this scenario is very easy to implement. Only two RF paths are needed for the receiver. Because of the different transmission paths, the receiver sees two differently faded signals. By using the appropriate method in the receiver, the signal-to-noise ratio can now be increased. Switched diversity as shown in FIG. 1a always uses the stronger signal, while maximum ratio combining uses a summed signal from the two signals. On the other hand for Tx diversity, there are more number of Tx than that of Rx antennas. A simple scenario uses two Tx and one Rx antenna (MISO, 2×1). The same data is transmitted redundantly over two antennas. This method has the advantage that the multiple antennas and redundancy coding is moved from the mobile UE to the base station, where these technologies are simpler and cheaper to implement.

To generate a redundant signal, space-time codes may be used. Alamouti developed the first codes for two antennas in 1998, and reported results on IEEE Journal on Select Areas in Communications, Vol. 16, No. 8, October 1998. Space-time codes additionally improve the performance and make spatial diversity usable. The signal copy is transmitted not only from a different antenna but also at a different time. This delayed transmission is called delayed diversity. Alamouti's space-time codes combine spatial and temporal signal copies as followed;

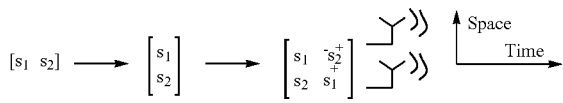

The signals $s_1$ and $s_2$ are multiplexed in two data chains. After that, a signal replication is added to create the Alamouti space-time block code.

Figure 1C:
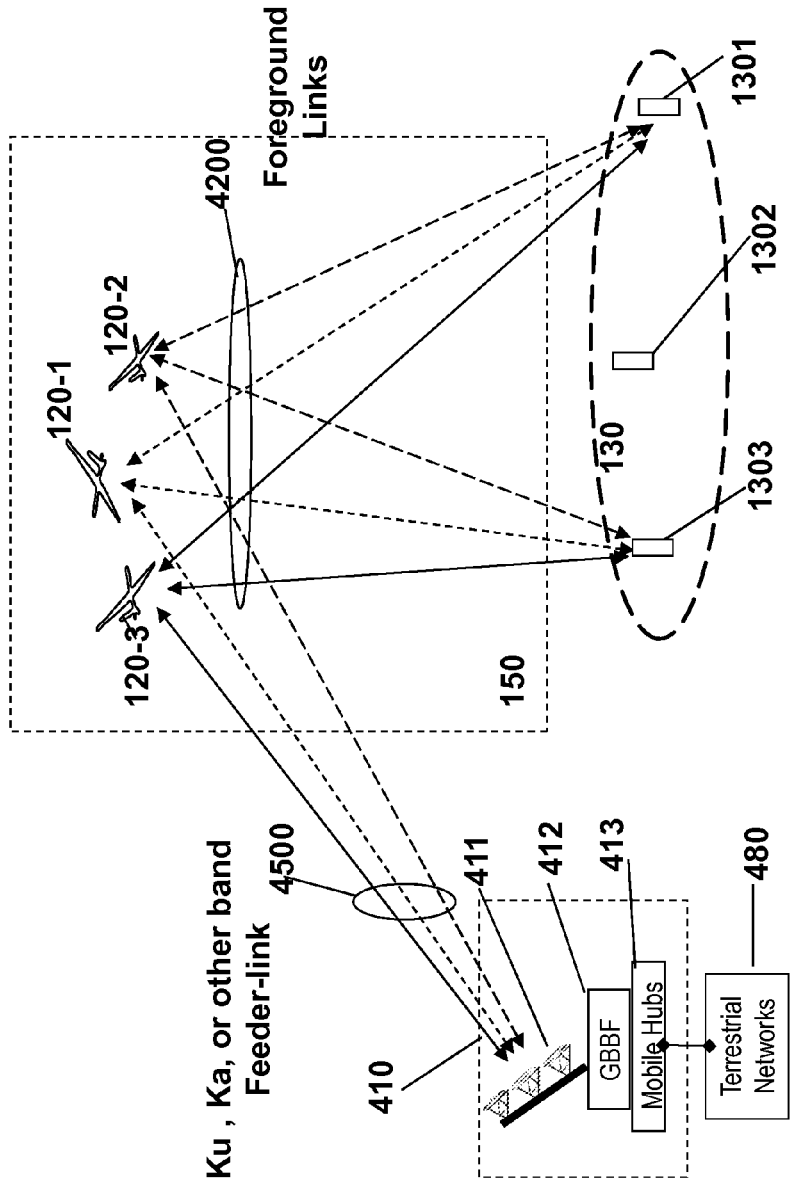
FIG. 1c illustrates a point-to-multiple point (p-to-mp) communication network via multiple airborne platforms; the foreground links 4200 are in L/S band and the background links 4500 are in X, Ku, Ka, or other band.

FIG. 1c depicts a MU-MIMO system serving 3 users 1301, 1302, and 1303 via a communications channel 150 with 3 transponding UAVs 120-1, 120-2, and 120-3 for some embodiments. The 3 users are in a common service area 130 by all three UAVs 120 via foreground links 4200 in L/S bands, while a communications hub 410 is connected to all three UAV's 120-1, 120-2 and 120-3 via feeder-links 4500 at X, Ku, Ka, or other bands.

In other embodiments, air platforms may functions as repeaters. In those cases, the down link frequency slot, $f_{d1}$, for the re-radiated signals would be at same as the uplink frequency slot; $f_{u1}$. These frequency slots may be in commercial cell phone bands. However, the repeaters shall be on large UAVs, which can adequately separating receiving and transmitting apertures physically to avoid positive feedbacks causing self-oscillating in the repeater.

In some additional embodiments (not shown), two transponding air platforms may be cascaded to function as a repeater. In those cases, a first air platform shall feature a uplink at $f_1$, and a "crosslink" frequency slot, $f_x$, for the re-radiated signals; while a second transponding air platform feature a cross link input at $f_x$, and re-radiation frequency for down link, at $f_1$; where $f_1$ shall be in commercial cell phone band, and $f_x$ in cross links may be in X, Ku, Ka or other millimeter, or optical bands. As a result, a transmitted signal stream radiated by a source on ground will be linked to the first air platform at $f_1$, re-radiated toward the second platform at $f_x$, captured by the second platform and re-radiated toward a user at the destination at $f_1$ again.

Referred back to FIG. 1c, the ground facility 410 via multiplexed feeder links 4500 feature (1) directional high gain antennas 411 tracking and communicating with UAVs 120 individually, (2) a ground base beam forming (GBBF) 412 capability to deliver different signal streams to various radiators for foreground communications on any one of the UAVs 120 in transmit and to recover different signal streams from various receiving elements for foreground communications on any one of the UAVs 120 in receiving, and (3) an interface or a gateway via its function as a mobile hub 413 to external networks 480.

In other embodiments, the antennas for the ground hub 410 may comprise array elements. There may not be GBBF 412 functions, but other equivalents to deliver forward link signals and receive return links signals to and from groups of array elements on board UAVs servicing users in foreground coverage areas. In some embodiments, the foreground coverage via foreground links and the background coverage via feeder links are significantly overlapped. In some other embodiments, the feeder links for background coverage feature the same frequency bands of foreground links.

Figure 2A:
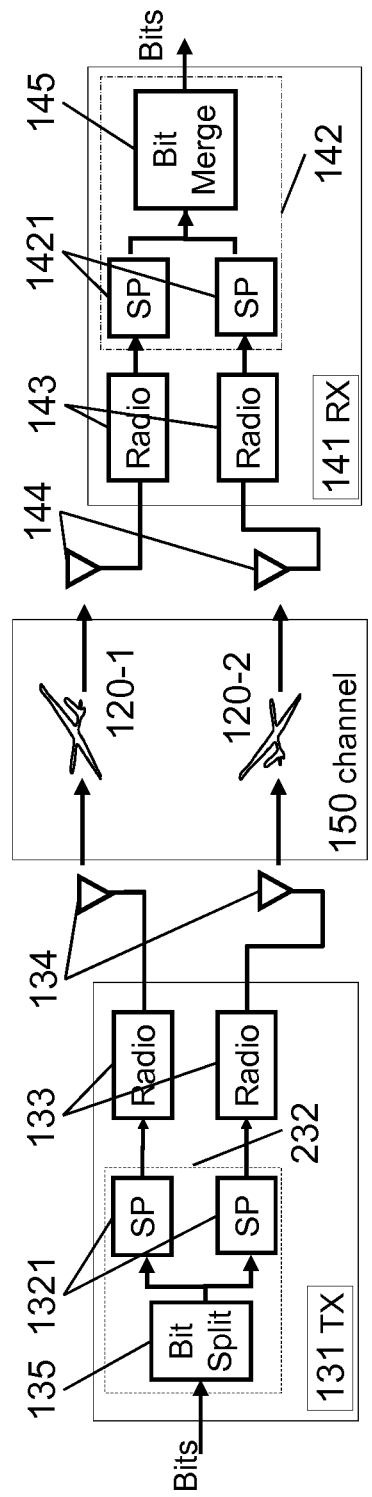
FIG. 2a illustrates a point-to-point (p-to-p) MIMO scheme in accordance with some embodiments; forming multiple independent links (on same frequency channels) between a transmitter and a receiver to communicate at higher total data rates. The multipaths are created via airborne platforms.

Spatial multiplexing in MIMO as depicted in FIG. 2a is not intended to make the wireless transmission more robust; rather it increases the data rate. As depicted, the DSP 232 comprises two portions; a segmenting device 135 and two signal processors (SP) 1321. Input signal stream is divided or segmented by a segmenting device, or a splitter 135 into 2 separated substreams; which are to be transmitted independently via 2 separate antennas 134 after being additional coded and formatted (e.g. such as space-time coding) by the SP 1321, frequency up-converted, and then power amplified by radios 133.

At a destination with a receiver 141, the two antennas 144 will capture the two separated signal substreams independently. In a simplified and idealized scenario, a first one of the two antennas 144 will only respond to a first signal substream sent by a first of the two transmitting antennas 134; while a second one of the two antennas 144 will only respond to a second signal substream sent by a second one of the two transmitting antennas 134. The received signal substreams will then be properly conditioned by the radios 143 before being reformatted and decoded (e.g. such as space-time decoding) by the signal processors (SP) 1421 and then de-segmented by a combining device 145. The radios 143 perform, among other functions, low noise amplification, and frequency down conversion. The functions of SP 1421 and combiner 145 are parts of functions of DSPs 142.

Figure 2B:
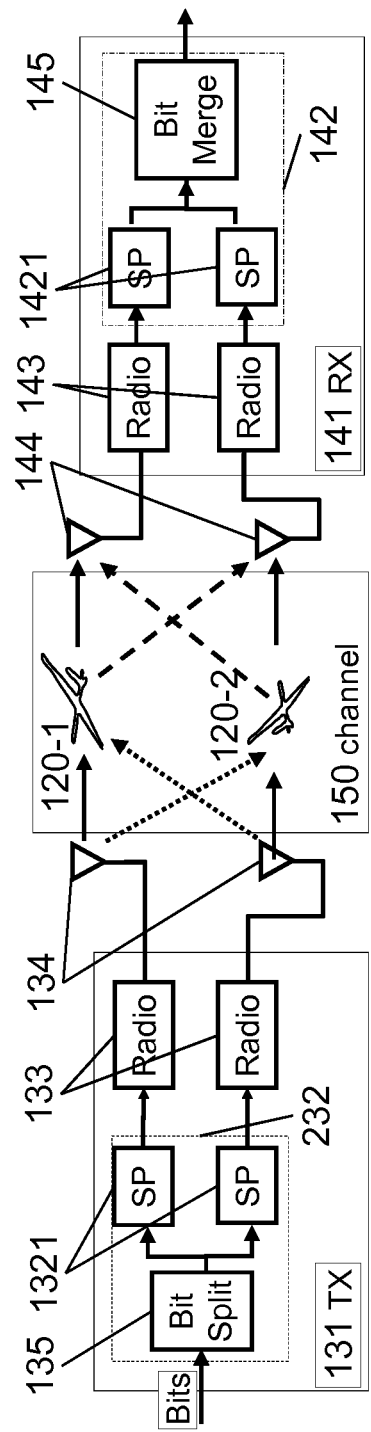
FIG. 2b illustrates a point-to-point (p-to-p) MIMO scheme in accordance with some embodiments; forming multiple independent links (on same frequency channels) between a transmitter and a receiver to communicate at higher total data rates, but there are cross-paths between antenna elements. The multipaths are created via airborne platforms.

However, there are cross-paths between antennas in real world. Because MIMO transmits via the same channel 150, transmissions with cross components not equal to 0 will mutually influence one another as depicted in FIG. 2b. The first of the two receiving antennas 144 will also respond to the second data stream sent by the second antenna. Similarly, the second of the two receiving antennas 144 will also respond to the first data stream sent by the first of the two transmitting antennas 134. When strong effects of cross-paths occur, the received signals by the two received antennas 144 shall exhibit high cross-correlation. On the other hand, when effects of cross-paths becoming weak; so will the cross correlations among the two received signal or data streams. The cross correlations must be minimized via optimization algorithms, which may be implemented by signal processors (SP) 1421. In other words, the correlation among the two received substreams must be decoupled before a de-segmenting, summing, or merging device 145. As indicated without a decoupling processing in the two SPs 1421, the output of the de-segmenting device 145 for the two received signal substreams will be a received signal stream with high self-interference due to multipaths.

Figure 3A:
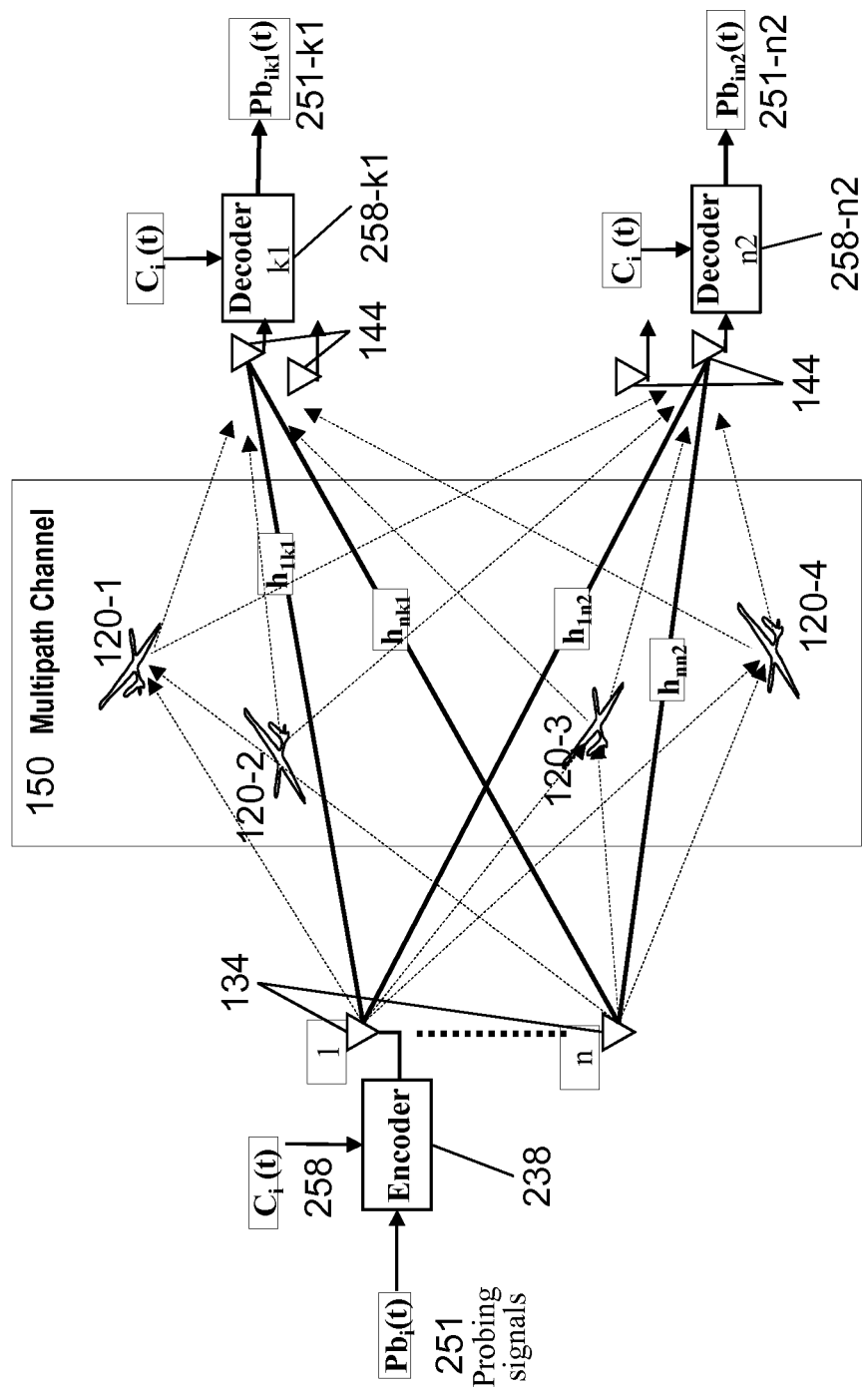
FIG. 3a illustrates a point-to-multiple point (p-to-mp) MIMO scheme in characterizing a multipath dominant propagation channel by measuring transfer functions $h_{ikj}$ from an ith transmitting element in a transmitter to a $j^{th}$ receiving element of a $k^{th}$ user elements accordance with some embodiments. The multipath dominated channel features multiple transponding airborne platforms.

FIG. 3a illustrates a MIMO scheme in characterizing a multipath dominant propagation channel by measuring transfer functions $h_{ikj}$; from an $i^{th}$ transmitting element 134 in a transmitter to a $j^{th}$ receiving element 144 of a $k^{th}$ user in accordance with some embodiments. The multipath dominant channel 150 comprises active scattering from 4 UAVs 120. A probing signal 251, $Pb_i(t)$, is encoded by an encoder 238 and a spreading code 258, before sent to various user elements by an $i^{th}$ one of the n transmitting elements 134. The encoded signals after propagating through a multipath dominated propagation channel 150, and arriving at various receiving elements; k1 through n2. The received probing signals after properly conditioned (low-noised amplified, filtered, frequency down converted, and digitized will be send to various decoders, 258-k1 to 258-n2, which performing de-spreading processed. Propagations from a source to a destination, such as from element 1 of the transmitter array 134 to the decoder 258-n2 for element 2 of the receiving array 144 of the $n^{th}$ user, feature at least 4 active paths in the communication channel 150; (1) a first path via a first UAV 120-1, (2) a second one via a second UAV 120-2, (3) a third one via a third UAV 120-3, and (4) a fourth one via a fourth UAV 120-4, respectively. Therefore, the transfer function $h_{1n2}$ represents a propagation characteristics of combining effects of the 4 parallel propagation paths from element 1 of the transmitting array 134 to element 2 of the array 144 for the $n^{th}$ user.

Figure 3B:
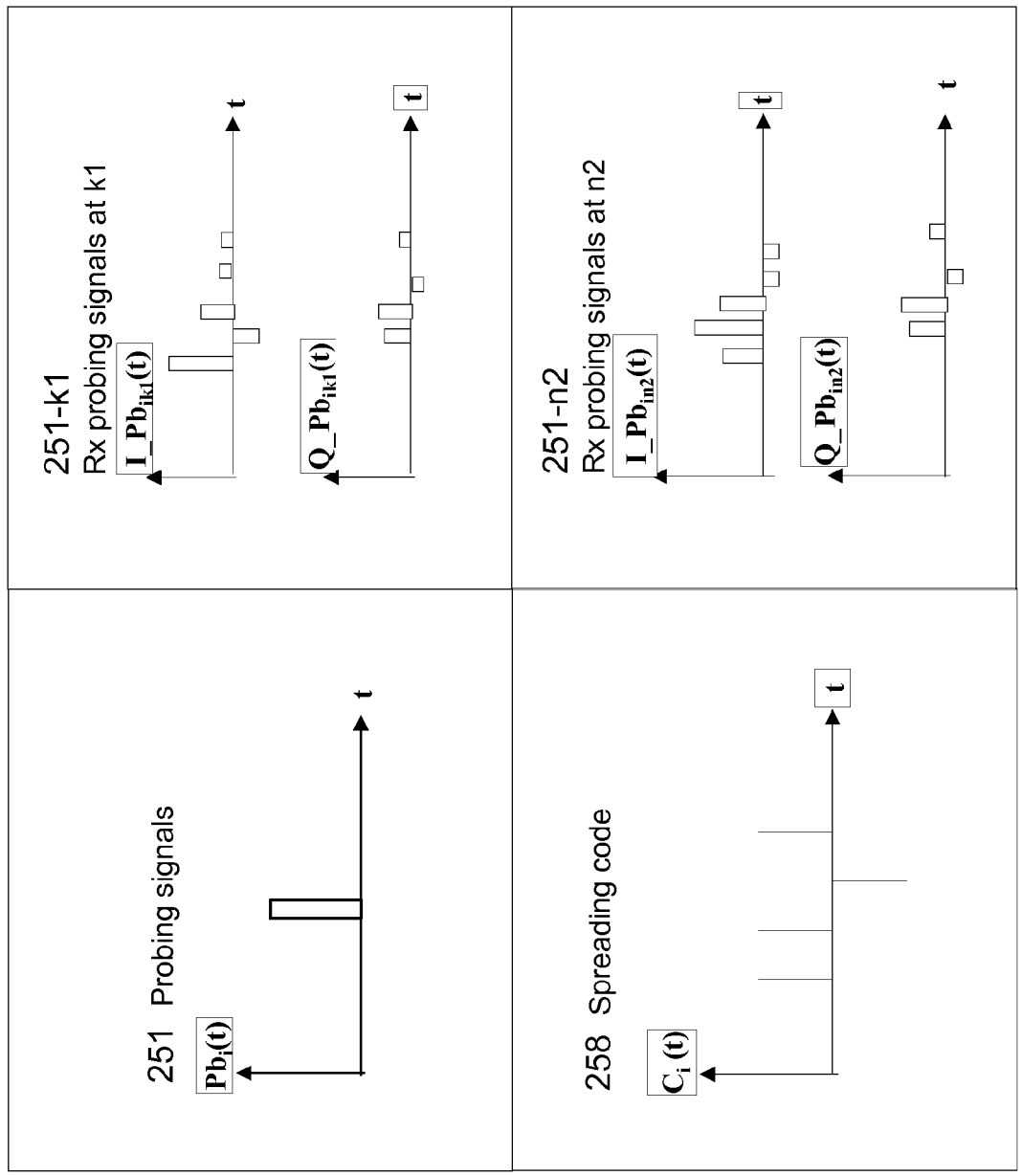
FIG. 3b illustrates an exemplified probing signal at transmitter, that at a k1 receiving element, and that at the n2 element accordance with some embodiments as shown in FIG. 3a. A spreading code Ci is depicted, and the multipath dominated channel features multiple transponding airborne platforms.

FIG. 3b depicts an example of a probing signal 251 at the transmitter source. The probing signal is modulated by a spreading code $C_i$ 258. After propagating through the multipath channel 150, received probing signals 251-k1 and 251-n2 feature multipath propagation effects in both I and Q channels representing time delays, phase and amplitude effects. In-phase and quadrature-phase components of the received probing signals for first element of the $k^{th}$ receiver radiated by the $i^{th}$ transmitting element are depicted as ($I\_Pb_{ik1}(t)$, $Q\_Pb_{ik1}(t)$), and those for second element of the $n^{th}$ receiver are indexed as ($I\_Pb_{in2}(t)$, $Q\_Pb_{in2}(t)$).

Figure 4A:
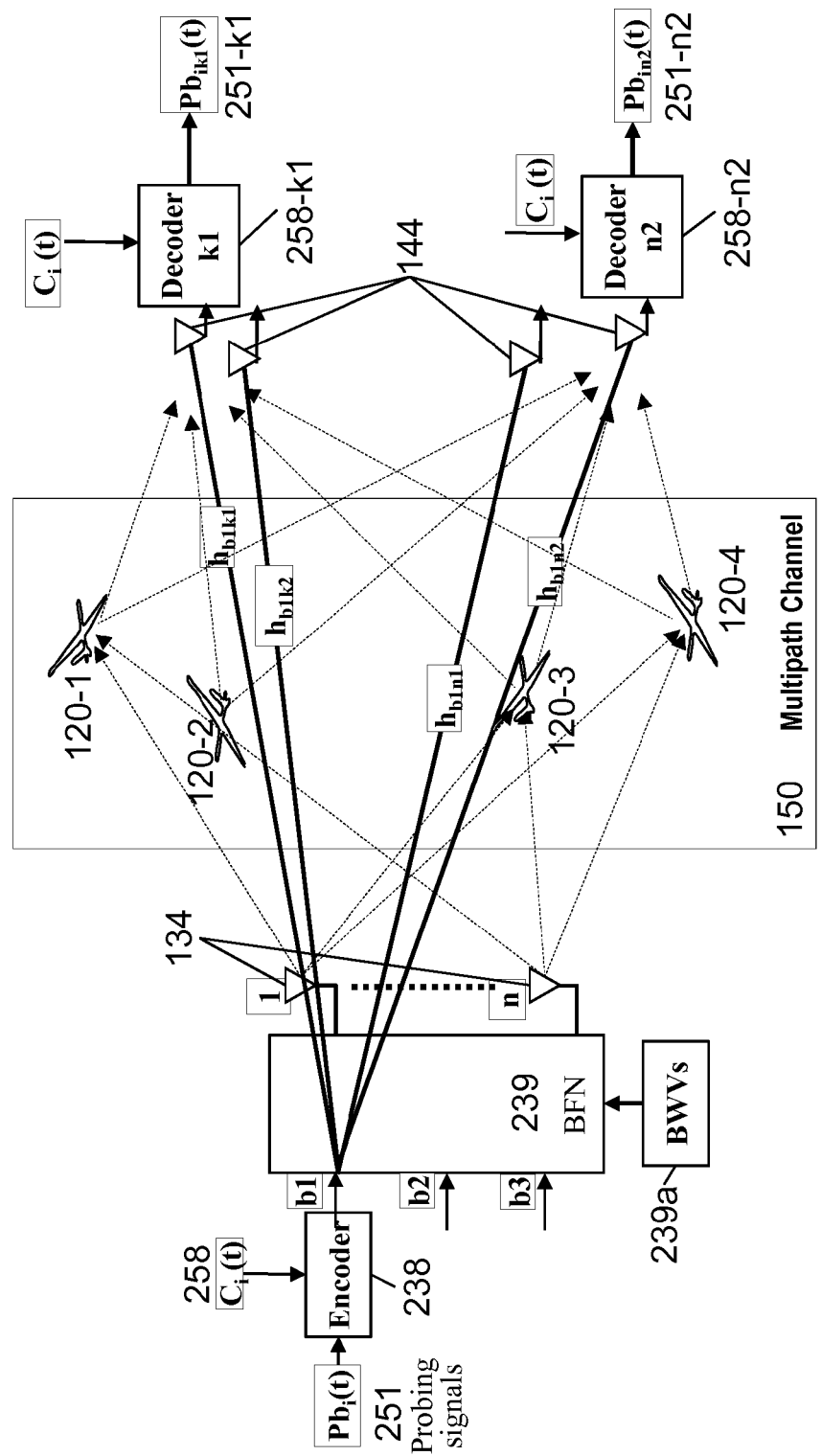
FIG. 4a illustrates a scheme for a point-to-multiple point (p-to-mp) MIMO in characterizing a multipath dominant propagation channel by measuring composited transfer functions $h_{baki}$ from an input port, ba, of a transmitting beam forming network (BFN) in a transmitter to a $j^{th}$ receiving element of a $k^{th}$ user. The multipath dominated channel features multiple transponding airborne platforms; A composited transfer function (CTF) is a linear combination of many point-to-point transfer functions

FIG. 4a illustrates a beam forming scheme for MIMO in characterizing a multipath dominant propagation channel by measuring a composited transfer functions $h_{bakj}$; which is defined from an input port, ba, of a transmitting beam in a transmitter to a $j^{th}$ receiving element of a $k^{th}$ user, where "a" represents one of the integer 1, 2, 3, or 4. A composited transfer function (CTF) is generated by a linear combinations of various conventional transfer functions from different $i^{th}$ transmitting elements to a set of same receiving elements (i.e by summing over all the properly weighted i's). The function which performs a linear combination over a transmitting array with n antenna elements of is a 1-to-n beam forming network (BFN). The associated weighting parameters to various transfer functions are a weighting vector, referred as beam-weighting vector (BWV). By changing the BWV, the associated radiating pattern of an updated beam by the BFN is altered accordingly. With n-elements, the radiating pattern from an array can be optimized or shaped to meet precisely up to n independent performance constraints; including forming beam peaks and nulls at those constraining directions or locations of receiving elements which picking up integrated effects of multipath scattered signals radiated by the transmitting beam.

In other words, the transmitting beam with a set of optimized BWV in a BFN feature a unique wavefront generated by concurrent radiations from multiple transmitting elements. The wavefront after propagating through the multipath dominated channel arrives at various destinations shall exhibit amplitude and phase distributions which shall fulfill a set of performance constraints concurrently. Various M BFNs via a same set of radiating elements shall produce M different beams concurrently. Each shall feature a unique and independent wavefront under a set of unique performance constraints. The M wavefronts will go through the same multipath dominated channel and reach to various receivers with specified performance constraints concurrently.

On the other hand, optimized radiation patterns with n components of a BWV may be shaped to meet more than n-constrained performance. Performance constraints may also be specified preferred coverage zones and rejection zones or quiet zones. Over a specified quiet zone, the intensity levels of radiated signals by the shaped beam after scattered by a multipath dominated channel are below a pre-determined threshold with low intensity levels; usually a −35 to −50 dB below the levels of coverage zones.

Figure 4B:
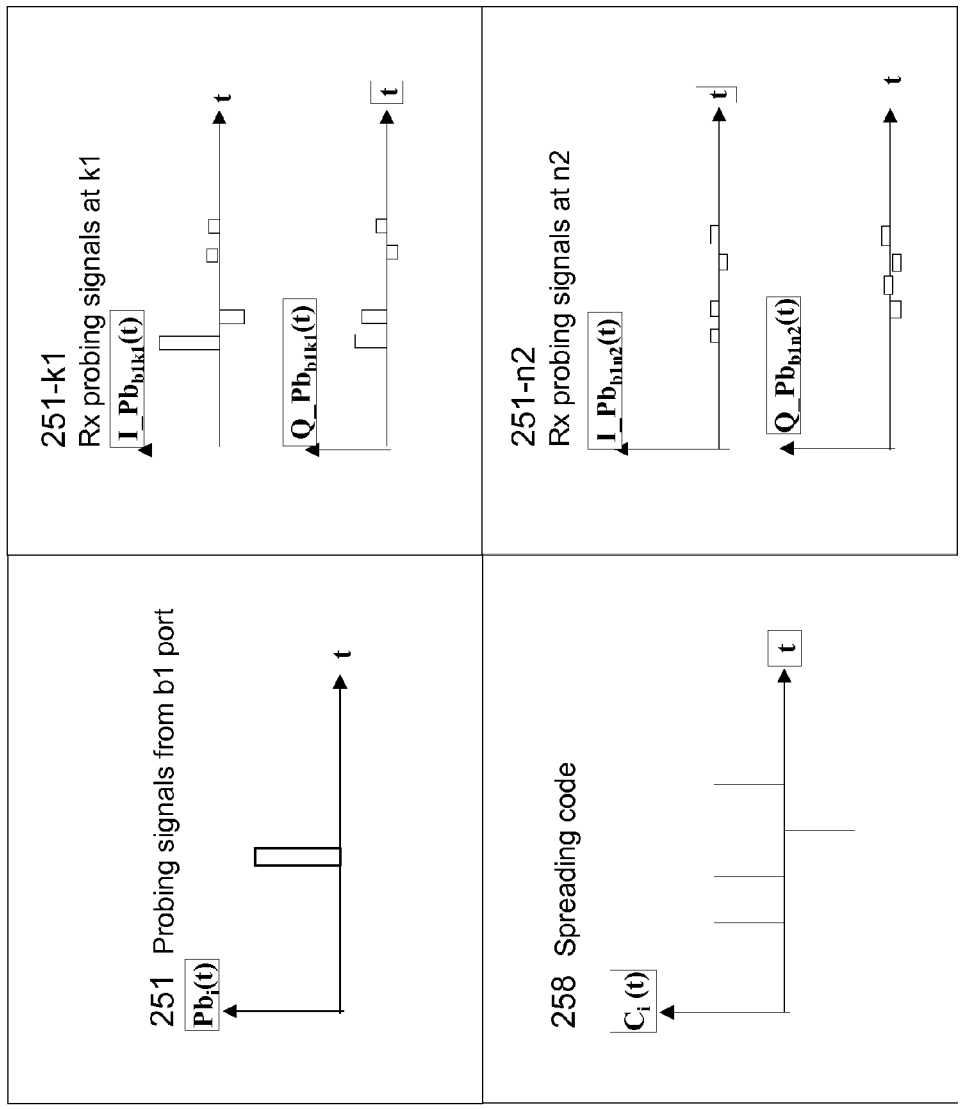
FIG. 4b illustrates an exemplified probing signal at transmitter, that at a k1 receiving element, and that at the n2 element accordance with some embodiments as shown in FIG. 4a. A spreading code Ci is depicted, and the multipath dominated channel features multiple transponding airborne platforms.

A probing signal 251 depicted in FIG. 4b, $Pb_{ib}(t)$, is encoded by an encoder 238 with a spreading code 258 also depicted in FIG. 4b, before sent to an input of a beam forming network (BFN) 239 for the $i^{th}$ beam, with multiple transmitting elements 134. A beam weight vector 239a (BWV) is optimized under a set performance constraints (not shown). The probing signals are then radiated to a multipath dominated propagation channel 150. As a result, a unique wavefront is generated and propagating toward various user elements through the multipath dominated channels. The encoded signals after propagating through a multipath dominated channel 150, and arriving at various receiving elements; k1 through n2, are captured by these elements 144 individually. The received probing signals after properly conditioned (low-noised amplified, filtered, frequency down converted, and digitized will be send to various decoders, 258-k1 to 258-n2, which performing de-spreading processed. The received probing signals 251-k1 to 251-n2 depicted in FIG. 4b feature multipath propagation effects in both I and Q channels representing time delays, phase and amplitude effects. For this example the desired coverage zone is set for the $k^{th}$ receiver, therefore, received optimized probing signals in I/Q format by the k1 element depicted in the insert 251-k1 feature high intensities of multiple pulses. On the other hand, a rejection zone or a quiet zone is assigned to an $n^{th}$ receiver. As a result, received optimized probing signals in I/Q format by the second receiving element of the $n^{th}$ receiver after decoded by a decoder 258-n2 feature extremely low intensities of multiple pulses as depicted.

The active scattering effects from the UAVs 120 are "integrated" as a part of a scattering matrix with matrix components, $h_{ijk}$, to characterize dynamic propagations between a $i^{th}$ transmitting element of the transmitter to a $j^{th}$ receiving element of the $k^{th}$ receiver. As the UAVs hover slowly over a service area, these matrix components, $h_{ijk}$, will alter accordingly. The associated BWV's for optimized shaped beams must be updated continuously in order to fulfill the prescribed performance constraints, which shall be indexed according to user identifications.

Figure 5:
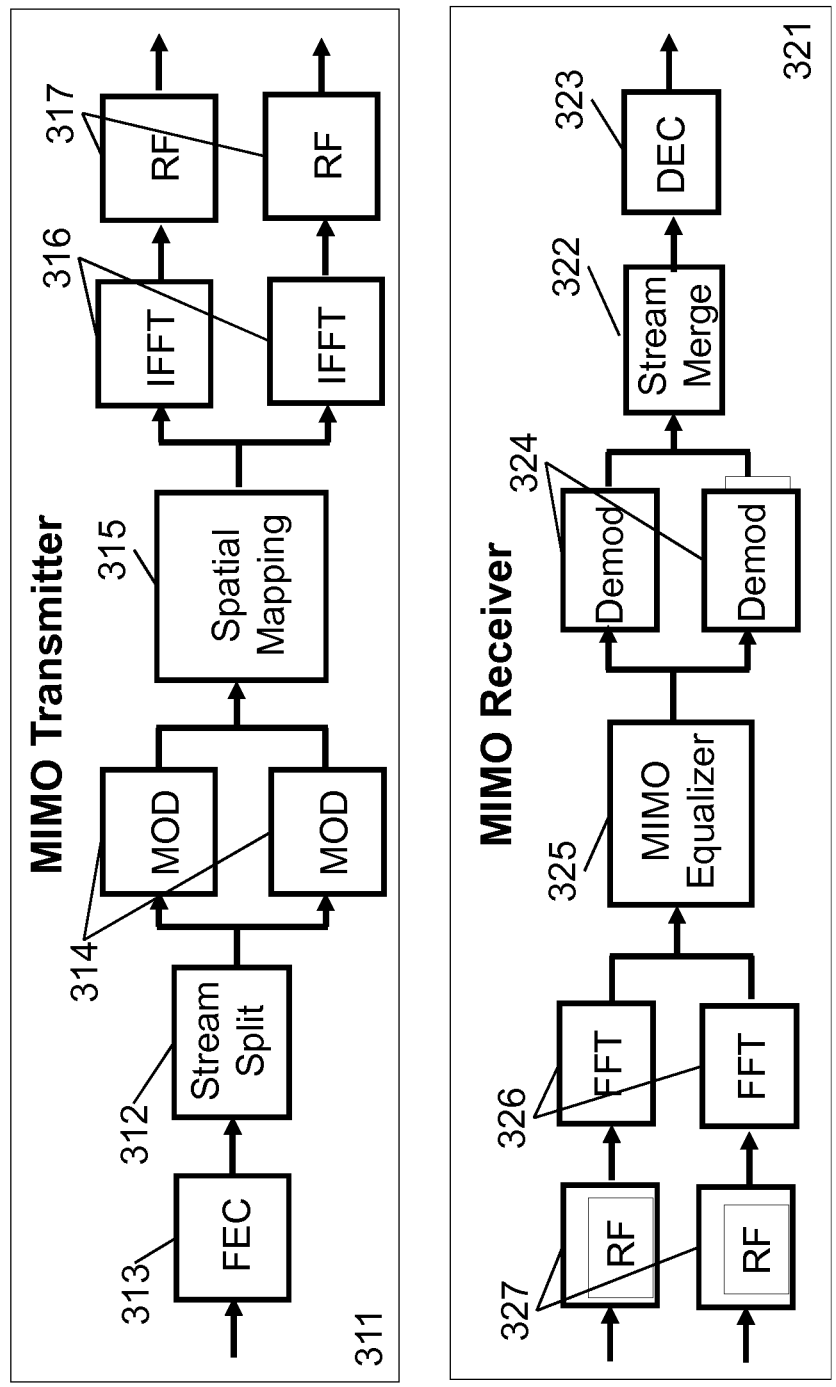
FIG. 5 depicts signal flow diagrams for (a) a MIMO transmitter and (b) a MIMO receiver in accordance with some embodiments.

FIG. 5 depicts signal flow charts of typical MIMO systems for single users; a top panel for MIMO transmitters 311 a bottom panel for MIMO receivers 321. There are feedback networks (not shown) for dynamic updating the channel state information (CSI). As depicted in the top panel 311 for a typical MIMO transmitter, an input signal stream is segmented by a stream splitter 312 into multiple parallel substreams after source-coded by a forward error correction (FEC) device 313. The substreams after modulated by a bank of modulators 314 will be spatially mapped into different combinations of transmit antenna indices at each time instance via a spatial mapping device/block 315. To convert space-time streams (STS) into transmit chains (TC), a spatial mapping block may be implemented via, among many other techniques, (1) direct mapping, a 1-to-1 mapping from STS to TC; (2) spatial expansion, additional multiplication with a matrix for cases such as two STS and three Tx antennas; (3) beam forming, additional multiplication with a steering vector; and (4) subcarrier mapping. Multiple parallel outputs from the spatial mapping block 315 for a transmitting antenna are converted to a TC format by devices such as IFFT blocks 316 before frequency up-converted and power amplified by RF blocks 317. Various amplified signals are then radiated by different transmitting antennas (not shown).

As depicted in the bottom panel 321 of FIG. 5, multiple receive signals captures by various Rx antennas are conditioned properly individually by RF frontends 327 which may comprise low-noise-amplifiers, and frequency down-converters. At baseband digital format, the received substreams are channelized by FFT processors 326; and the channelized signals are equalized and spatially unmapped into STS signals by a MIMO equalizer 325. After demodulated by demodulators 324 and merged into single streams by de-segmenting devices 322, the recovered STS signals are decoded by a decoder 323 and become reconstituted original data.

Figure 6:
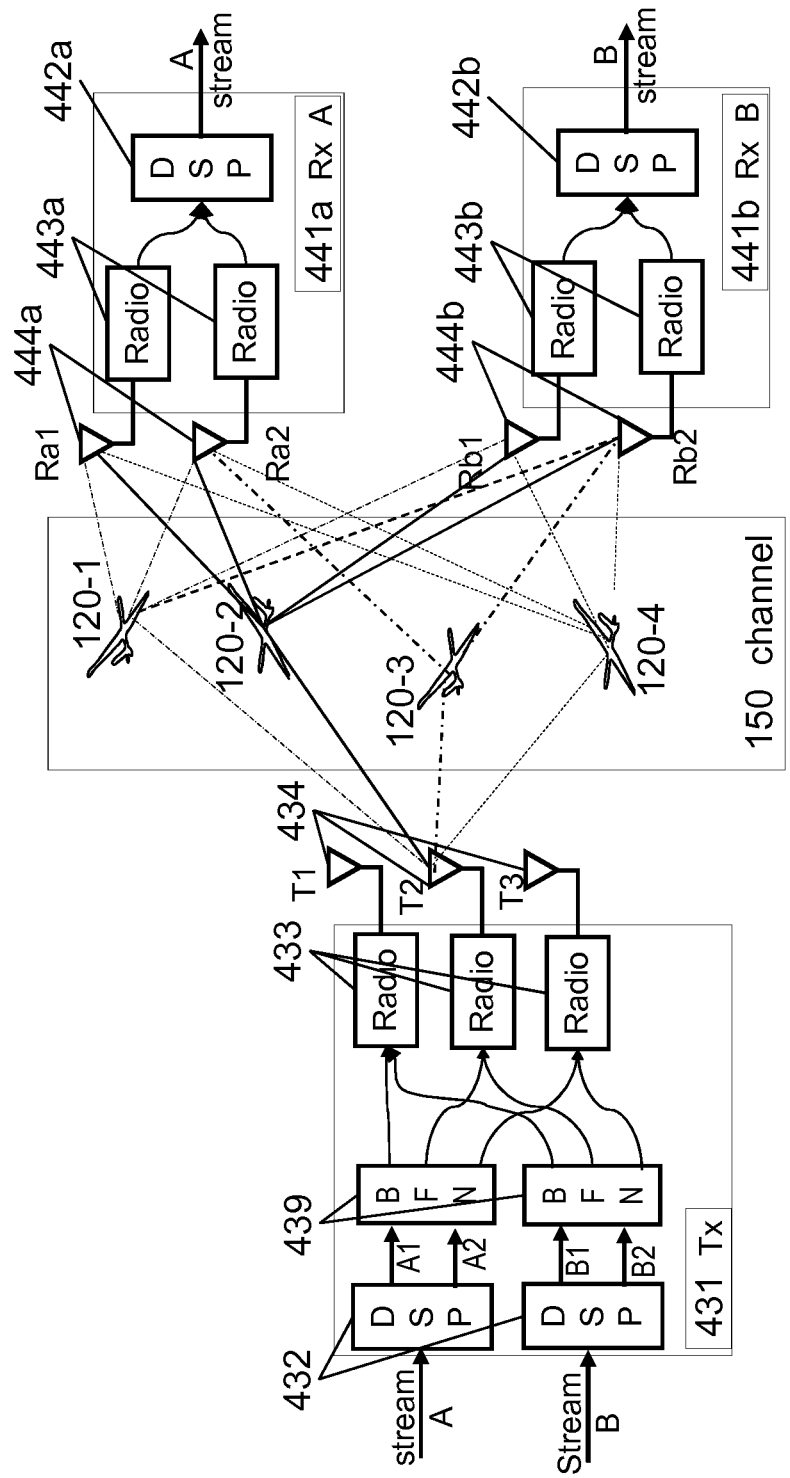
FIG. 6 illustrates a communication network in a multipath dominated propagation environment performing preprocessing to form two groups of user sensitive composited transfer functions in accordance with some embodiments; The multipath dominated channel features multiple transponding airborne platforms.

FIG. 6 depicted how to formulate composited transfer functions of a point-to-2 point (p-to-2p) communications system featuring a transmitter 431 at a source with 3 transmitting (Tx) elements 434, T1, T2, and T3, sending 2 signal streams independently through a multipath dominated communication channel 150 to two different receivers Rx A 441a at a first destination and Rx B 441b at a second destination. The multiple path dominated channel 150 comprises multiple UAVs 120 as active scattering platforms. A first signal stream, stream A, aiming for the Rx A 441a is divided into two segments; A1 and A2 substreams, in a first of two DSPs 432. Following the first of the DSPs 432, A1 substream will be connected to a first input of a first 2-to-3 beam forming network (BFN) 439 for a first shaped beam. Concurrently, A2 substream is connected to a second input of the first 2-to-3 beam forming network (BFN) 439 for a second shaped beam. The three combined outputs for the two shaped beams from the first 2-to-3 BFN 439 are frequency up-converted, and amplified by Radios 433 and radiated by three transmitting elements 434. Signal substreams of A1 and A2 radiated by three transmitting elements 434 organized via two transmitting shaped beams shall feature two independent radiation patterns, or wavefronts. After actively scattered by the 4 UAVs 120 in a propagation channel 150, these radiation patterns or wavefronts shall deliver transmitted signals with discriminative features; low intensities of flux densities of radiated A1 and A2 signal substreams for the second receiver Rx B 411b at the second destination, and high intensities of radiated A1 and A2 signal substream flux densities for the first receiver Rx A 441a over the first destination. Furthermore, the first shaped beam shall aim for maximizing the signal flux density of A1 substream over the first element Ra1 of the receiving elements 444a, while the second shaped beam shall aim for maximizing the signal flux density of A2 substream over the second element Ra2 of the receiving elements 444a.

We shall refer to a radiation pattern of a shaped beam for a transmitted signal as a wavefront for the transmitted signal. A wavefront of a shaped beam radiated by the transmitting elements 434 is optimally synthesized (not shown) by a beam forming mechanisms in one of the BFN 439 under a set of performance constraints formulated by a composite transfer function. The optimization (not shown) is identical to procedures for shaped beam antennas under various discriminative performance constraints favoring one user and against others. There are two wavefronts associated to two shaped beams by the first 2-to-3 BFN 439. We shall present formulation of composited transfer functions later in this section.

Similarly a second signal stream, B stream, aiming for Rx B 441b is also divided into two segments; B1 and B2 substreams in a second 2-to-3 BFN 439. Furthermore, B1 substream will be connected to a first input of a second 2-to-3 BFN 439 for a third shaped beam. Concurrently, B2 substream is connected to a second input of the second 2-to-3 BFN 439 for a fourth shaped beam. The 3 common outputs of the third and the fourth beams, or the 3 outputs from the second 2-to-3 BFNs 439, are frequency up-converted, and amplified by Radios 433 and radiated by the same three transmitting elements 434. The optimization (not shown) is identical to the procedures for the first two shaped beams by the first BFN 439. There are two optimally shaped wavefronts associated to the third and the fourth shaped beams by the second 2-to-3 BFN 439.

Signals radiated by the third and the fourth shaped beams via the three transmitting elements 434, and after actively scattered by the 4 UAVs 120, shall exhibit discriminative features; low intensities of radiated flux densities of B1 and B2 signal substreams for the first receiver Rx A at the first destination, and high radiated flux densities for the second receiver over the second destination. Furthermore, the third shaped beam shall aim for maximizing the signal flux density of B1 substream over the first element Rb1 of the receiving elements 444b, while the fourth shaped beam shall aim for maximizing the signal flux density of B2 substream over the second element Rb2 of the receiving elements 444b.

The first receiver Rx A 441a features two Rx element Ra1 and Ra2 444a to capture a first of two radiated signal streams by the transmitter 431 dedicated for the first receiver Rx A. Concurrently, the second receiver Rx B 441b featuring two Rx element Rb1 and Rb2 444b will capture a second radiated signal stream by the transmitter 431 dedicated for the second receiver Rx B.

The p-to-2p MIMO communications systems in FIG. 6 will deliver signals from a common source 431 to two separated destinations 441a and 441b; each with two receipted elements concurrently. Signal substreams A1 and A2 will be delivered only to and captured by antenna elements in Rx A 441a, while signal substreams B1 and B2 only to antenna elements of Rx B 441b. There are also feedback networks (not shown) for dynamic updating the channel state information (CSI). Both the DSPs 432 at the source 431 and the DSPs 442a and 442b at the respective destinations 441a and 441b are used for additional directional mapping and de-mapping. With robust feedback networks in some embodiments, directional mapping/de-mapping are all done as preprocessing at a source 431 so that correlations among received signals by individual receiving elements at a destination become minimized. As a result, low cost terminals with limited processing capability can be used in a MIMO network. On the other hand, with some capability in feedback channels in other embodiments, directional mapping/de-mapping are done as post-processing at destinations 441a and 441b, respectively, to minimize correlations among received signals by individual receiving elements in a user device with high processing capability.

CSI is organized as transfer functions; $h_{ik}$ characterizing propagation features a set of multiple propagation paths from a $i^{th}$ element of a transmitter to a $k^{th}$ element of a receiver. For a communications systems with m antenna element in transmit and N elements in receive the transfer functions can be represented by a M×N transfer matrix, ||H||.

It is noticed that the transfer functions/matrixes characterizing propagation channels feature parameters indexed by user's antenna elements, neither in forms of locations as lengths in a Cartesian coordinates nor in direction as angles in a spherical coordinates. More precisely, they are specified or indexed by antenna element identifications (IDs) of various users. We shall refer these identification conventions as "user ID indexed" or simply as "user indexed' in this application. Therefore, the phrase of "user indexed performance criteria" means performance criteria at locations identified by ID of user element, and/or user ID. A user indexed transfer function $h_{ik}$ represents a transfer function between the $i^{th}$ elements of a transmitting array to the $k^{th}$ element of a receiver.

In this disclosure, many transfer functions have been indexed by subscripts with three symbols. A component ($h_{ijk}$) has been used to characterize propagation features of channel characteristics from $i^{th}$ element of a transmitter via set of multiple propagation paths to a $k^{th}$ element of a $j^{th}$ receiver.

Many conventional antenna synthesis designs and methods feature optimizations in beam shaping techniques for a transmitting array with multiple transmitting antenna elements in formulating a shaped beam radiation pattern as a weighted sum of radiation patterns of individual antenna elements. Furthermore the optimization process is to find a set of the weighting parameters of the individual element radiation patterns so that the performances of the optimized shaped beam fulfill a set of predetermined performance constraints. Both the radiation patterns of shaped beams and associated performance constraints are specified as functions of angles in various coordinates. The shaped beam with a unique wavefront will radiate a signal stream to various directions in space according to its radiation pattern.

However, measurements of known probing signals from the shaped beam on discrete locations, or spatially sampled points, in a common coverage region for receivers, such as receiving elements of multiple receivers, may be used for optimizing the shaped beam so that the radiated wavefront at those discrete locations meet prescribed performance criteria, which are specified as functions of user indexes, not as functions of directions or angles. The performance constraints on these selected locations are characterized as a point-to-multipoint (p-to-mp) composited transfer function in transmitter. These measurements; from the input of a shaped beam in a transmitter to multiple receiving element locations of various sets of user equipment (UE), do include (1) discriminative effects of radiation pattern of the shaped beam, and (2) multipath active scattering effects by the UAVs 120 in a dynamic communication channels 150.

In some embodiments, we will incorporate concepts of orthogonal beams (OB) at the transmit side as performance constraints; forming two groups of shaped beams, which are injected into a multipath dominant channel 150. Instead of using line-of-sight directions as constraint parameters in beam shaping optimization; we use components of a scattering matrix, known as transfer functions, $h_{ij}$, characterizing time delays, amplitude attenuations, and phase delays from the $i^{th}$ element position in a transmitter via a set of multipaths of the channel 150 to the $j^{th}$ position in a receiver. The first sets of shape beams will feature beam peaks toward first receiver and nulls toward the second receiver, while the second sets of shape beams with beam peaks toward the second receiver and nulls toward the first receiver. These two sets are "orthogonal" to one another. A shaped beam is constrained by a composited transfer function (CTF), which is a linear combinations of the transfer functions $h_{ik}$, for all i's; where i is an index of the $i^{th}$ transmitting element. A composited transfer function (CTF), constrained by a set of functions on multiple locations indexed by IDs of user elements instead of directions, features a unique wavefront characterizing effects of propagation from the input of a beam forming network (BFN) of a shape beam all the way to various elements on receivers from multiple sets of user equipment, respectively.

In other embodiments, we will incorporate performance constraints of "quiet zones" at the transmit side; forming two groups of beams. For this example of a p-to-2p configuration, two sets of shaped beams will be formed at the transmission side taking advantage of a multipath dominant communications channel 150. Instead of line-of-sight directions as constraint parameters in beam shaping optimization; we will use components of a scattering matrix, known as transfer functions $h_{ij}$, characterizing time delays, amplitude attenuations, and phase delays in propagation via a set of multipaths from the $i^{th}$ position in a transmitter to the $j^{th}$ position in a receiver. The first sets will have shape beams with beam peaks toward first receiver and "quiet zones" toward the second receiver, while the second sets will have shape beams with beam peaks toward the second receiver and "quiet-zone" toward the first receiver.

"Quiet zone" criteria are different from those of "nulling." Over "selected" quiet zones the associated transfer functions, the signal flux densities for a desired signal stream will be below a predefined threshold value; which shall be −20 or −30 dB below those at the beam peaks of shaped beams. Beam shaping constraints via quiet zones are set for low intensity values of desired signal flux densities on composited transfer functions over a region, while those for OB are set for zero responses on desired signal flux over specified locations only. Feed-back information for quiet zone shall be from line integrations of received powers of selected signals over many in situ point sensors or received power of selected signals from line-sensors; while that for OB performance constraints shall be from received power of selected signals from point-sensors.

Let us define $h_{iax}$ as the scattering matrix component from a Ti element of a transmitter to the $k^{th}$ element of the Ra receiver, Rak, where i=1, 2, or 3 and k=1, or 2. Similarly, $h_{ibx}$ as the scattering matrix component from the Ti element to the $k^{th}$ element of the Rb receiver, Rbk, where i=1, 2, or 3 and k=1, or 2. A first beam forming mechanism for a beam $B_{a1}$ is resided in a first 2-to-3 BPFs 439. The signal substream A1, to be radiated by the beam $B_{a1}$, is connected to a first beam port, $BP_{a1}$, a first input of the first 2-to-3 BFN 439.

A composited transfer function (CTF), $H\_B_{a1}$, from the beam port $BP_{a1}$ (a source point) to a set of receiving elements, $$\begin{bmatrix} Ra1 \\ Rb1 \\ Rb2 \end{bmatrix}$$

(multiple destination points), is defined as a linear combination of [T1], [T2] and [T3]; where [Ti] is the scattering matrix, a set of transfer functions, from the $i^{th}$ transmitting element to the set of receiving elements $$\begin{bmatrix} Ra1 \\ Rb1 \\ Rb2 \end{bmatrix}.$$

More specifically, the composited transfer function (CTF) is expressed as:

$$H\_B_{a1} = wa1 * [T1] + wa2 * [T2] + wa3 * [T3] \quad (5)$$

$$= wa1 \begin{bmatrix} h1a1 \\ h1b1 \\ h1b2 \end{bmatrix} + wa2 \begin{bmatrix} h2a1 \\ h2b1 \\ h2b2 \end{bmatrix} + wa3 \begin{bmatrix} h3a1 \\ h3b1 \\ h3b2 \end{bmatrix}$$

$$= \begin{bmatrix} wa1*h1a1 + wa2*h2a1 + wa3*h3a1 \\ wa1*h1b1 + wa2*h2b1 + wa3*h3b1 \\ wa1*h1b2 + wa2*h2b2 + wa3*h3b2 \end{bmatrix}$$

We define the following components for the composited transfer function for beam $B_{a1}$; (1) $h_{ba1\text{-}b1}$ from the beam port $BP_{a1}$ to Rb1, (2) $h_{ba1\text{-}b1}$ from the beam port $BP_{a1}$ to Rb1, and (3) $h_{ba1\text{-}a1}$ from the beam port $BP_{a1}$ to Ra1. For OB beam shaping; beam $B_{a1}$ shall feature "zero" responses or nulls at both Rb1 and Rb2 elements; as specified in constraints 1 and 2:

$$h_{ba1\text{-}b1} = wa1*h1b1 + wa2*h2b1 + wa3*h3b1 = 0; \quad (6a)$$

$$h_{ba1\text{-}b2} = wa1*h1b2 + wa2*h2b2 + wa3*h3b2 = 0. \quad (6b)$$

Beam BBa1 shall also feature a peak at Ra1 location with constraint 3

$$\text{Max}(abs(h_{ba1\text{-}a1})) = \text{Max}(abs(wa1*h1a1 + wa2*h2a1 + wa3*h3a1)), \quad (6c)$$

where Max (x) is an operation to maximize x.

With three equations of 6a, 6b and 6c, an optimization algorithm shall led us to an optimum set of solutions for wa1, wa2 and wa3 as the optimized weighting components of a beam weighting vector (BWV) for the first beam, $B_{a1}$, under the above three constraints of OB beams.

Various optimization algorithms shall provide different solutions for the weighting component; wa1, wa2, and wa3. Optimized solutions full-filling the OB beam shaping must meet all 3 constraints, (6a, 6b and 6c) concurrently.

We may define the following components for the composited transfer function for beam $B_{a1}$; (1) $h_{ba1\text{-}b1}$ from the beam port $BP_{a1}$ to Rb1, (2) $h_{ba1\text{-}b1}$ from the beam port $BP_{a1}$ to Rb1, and (3) $h_{ba1\text{-}a1}$ from the beam port $BP_{a1}$ to Ra1. For "quiet-zone" beam shaping; beam $B_{a1}$ shall feature low response of the composited transfer functions at Rb1 and Rb2 with constraints 4 and 5

$$abs(h_{ba1\text{-}b1}) = abs(wa1*h1b1 + wa2*h2b1 + wa3*h3b1) < \delta1 \quad (6d)$$

$$abs(h_{ba1\text{-}b2}) = abs(wa1*h1b2 + wa2*h2b2 + wa3*h3b2) < \delta1 \quad (6e)$$

Where δ1 is a small positive number. Beam $B_{a1}$ shall still feature a peak at Ra1 location with constraint 3

$$\text{Max}(abs(h_{ba1\text{-}a1})) = \text{Max}(abs(wa1*h1a1 + wa2*h2a1 + wa3*h3a1)), \quad (6c)$$

where Max (x) is an operation to maximize x. In general, δ1 shall be less than −20 dB below the radiation level at the beam peak; or $(\delta1)^2 < (h_{ba1\text{-}a1})^2/100$.

With three equations of 6c, 6d and 6e, an optimization algorithm shall led us to an optimum set of solutions for wa1, wa2 and wa3 as the optimized weighting components of a beam weighting vector (BWV) for beam $B_{a1}$ under the constraints of "quiet zone". However, there may be more constraint locations with low flux density responses on the composited transfer functions over the receiving apertures of the second receiver in addition to Rb1 and Rb2. Adding more constraints will result in increased dimension of associated beam weight vectors (BWVs).

In other embodiments, there are 4 spatial-sampling points in the second destination; Rb1, Rb2, Rb3 and Rb4. We may define the following two additional components for the composited transfer function for beam $B_{a1}$; 1) $h_{ba1\text{-}b3}$ from the beam port $BP_{a1}$ to Rb3, (2) $h_{ba1\text{-}b4}$ from the beam port $BP_{a1}$ to Rb3. In other similar embodiments, the constraints 4 and 5 can be re-written as $$Abs(h_{ba1\text{-}b1}) + Abs(h_{ba1\text{-}b2}) + Abs(h_{ba1\text{-}b3}) < \delta1 \quad (6d\text{-}1)$$

$$Abs(h_{ba1\text{-}b1}) + Abs(h_{ba1\text{-}b4}) < \delta1 \quad (6e\text{-}1)$$

Various optimization algorithms shall provide different solutions for the weighting component; wa1, wa2, and wa3. The optimized solutions full-filling the "quiet zone" beam shaping must meet all 3 constraints, (6c, 6d and 6e) or (6c, 6d-1 and 6e-1) concurrently.

Concurrently, a second beam forming mechanism for a beam $B_{b1}$ in the second shaped beam set implemented by a second 2-to-3 BFN 439. $BP_{b1}$ is an input port to the beam forming network for beam $B_{b1}$. The transfer function, $H\_B_{b1}$, from $B_{b1}$ to a second set of receiving elements $$\begin{bmatrix} Rb1 \\ Ra1 \\ Ra2 \end{bmatrix}$$

is defined as a linear combinations of [T1'], [T2'], and [T3']; where [Ti] is the scattering matrix, a set of transfer functions, from the $i^{th}$ transmitting element to the second set of receiving elements $$\begin{bmatrix} Rb1 \\ Ra1 \\ Ra2 \end{bmatrix}.$$

$$H\_B_{b1} = wb1 * [T1'] + wb2 * [T2'] + wb3 * [T3'] \quad (7)$$

$$= wb1 \begin{bmatrix} h1b1 \\ h1a1 \\ h1a2 \end{bmatrix} + wb2 \begin{bmatrix} h2b1 \\ h2a1 \\ h2a2 \end{bmatrix} + wb3 \begin{bmatrix} h3b1 \\ h3a1 \\ h3a2 \end{bmatrix}$$

-continued $$= \begin{bmatrix} wb1*h1b1 + wb2*h2b1 + wb3*h3b1 \\ wb1*h1a1 + wb2*h2a1 + wb3*h3a1 \\ wb1*h1a2 + wb2*h2a2 + wb3*h3a2 \end{bmatrix}$$

For OB beam shaping; beam Bb1 shall feature nulls at Rb1 and Rb2 with constraints 1 and 2

$$wb1*h1a1+wb2*h2a1+wb3*h3a1=0 \quad (8a)$$

$$wb1*h1a2+wb2*h2a2+wb3*h3a2=0 \quad (8b)$$

Beam BBb1 shall also feature a peak at Rb1 location with constraint 3

$$\text{Max}(abs(wb1*h1b1+wb2*h2b1+wb3*h3b1)), \quad (8c)$$

Various optimization algorithms shall provide different solutions for the weighting component; wa1, wa2, and wa3. Solutions full-filling the OB beam shaping for the second sets of shaped beams must meet all 3 constraints, (8a, 8b, and 8c,) concurrently.

For "quiet-zone" beam shaping; beam $B_{b1}$ shall feature low intensity on flux density response on composited transfer functions at Ra1 and Ra2 with constraints 4 and 5

$$abs(wb1*h1a1+wb2*h2a1+wb3*h3a1)<\delta1 \quad (8d)$$

$$abs(wb1*h1a2+wb2*h2a2+wb3*h3a2)<\delta1 \quad (8e)$$

Beam $B_b1$ shall still feature a peak at Rb1 location with constraint 3

$$\text{Max}(abs(wb1*h1b1+wb2*h2b1+wb3*h3b1)), \quad (8c)$$

where Max (x) is an operation to maximize x. In general, $\delta1$ shall be less than −20 dB below the radiation level at the beam peak; $(\delta1)^2 < (wb1*h1b1+wb2*h2b1+wb3*h3b1)^2/100$.

In other embodiments, there are 4 spatial-sampling points in the first destination; Ra1, Ra2, Ra3 and Ra4. We may define the following two additional components for the composited transfer function for beam $B_{b1}$; (1) $h_{bb1-a3}$ from the beam port $BP_{b1}$ to Ra3, (2) $h_{bb1-a4}$ from the beam port $BP_b1$ to Ra3, the constraints 4 and 5 can be re-written as $$abs(h_{b11-a1})+abs(h_{bb1-a2})+abs(h_{bb1-a3})<\delta1, \quad (8d\text{-}1)$$

$$abs(h_{bb1-a1})+abs(h_{bb1-a4})<\delta1. \quad (8e\text{-}1)$$

Various optimization algorithms shall provide different solutions for the weighting component; wb1, wb2, and wb3. Solutions full-filling the "quiet zone" beam shaping for the second sets of shaped beams must meet all 3 constraints, (8c, 8d, and 8e,) or (8c, 8d-1, and 8e-1) concurrently.

As a result of preprocessing with either OB or quiet zone criteria; the two antennas 444a at the first receiving sites Rx A 441a will only capture radiated signal substreams; A1 and A2 delivered by beam $B_{a1}$ and $B_{a2}$, while the two antennas 441b at the second receiving site Rx B 441b will only be accessible to radiated substream signals, B1 and B2 delivered by beams $B_{b1}$ and $B_{b2}$. The received signals at Rx A are conditioned accordingly by two radios 443a independently, and then post-processed by a DSP 442a (1) to de-correlate two received substreams, A1 and A2, and (2) to de-segment the de-correlated substreams for recovering received signal stream "A".

Concurrently, the received substream signals B1 and B2 at Rx B are conditioned accordingly by two radios 443b independently, and then post-processed by a DSP 442b to recover received signal stream "B". Thus the radiated signal streams "A" and "B" at a common RF frequency slot are fully reconstituted at RX A and Rx B sites independently.

The "conditioning" performed by the radios 443a and 443b shall comprise amplifications by low noise amplifiers (LNAs) and frequency down conversions. However, as far as an individual user is concerned, the technique and configuration depicted on FIG. 6 is designed for frequency re-use in a multipath dominated propagation environment but the benefits of enhanced bandwidth for a user with multiple element receivers are through two shaped beams there. They are two sets of 2-to-2 MIMO combined efficiently for the purposes of re-using a same frequency and/or time slot.

In the following we shall use the constraints of orthogonal beams (OB) for "beam shaping" constraints illustrating frequency re-use functions of multiple users in multiuser (MU) MIMO communications systems. Other beam-shaping constraints including "quiet-zone" constraints are equally applicable to techniques of MU MIMO. In highly structured and dynamic multipath propagation environment, those techniques implemented via quiet zone constraints over various receivers for different users may require more instantaneous constraints to a user than the number of receiving antenna elements attached to his or her receiver. On the other hand, those techniques implemented via OB constraints over various receivers for different users may require no more instantaneous constraints to a user than the number of receiving antenna elements attached to his or her receiver. It is the "cost" of relaying feedback information in back-channels which shall dictate preference of beam shaping constraints. The information feedback "cost" includes numbers of required sensors at receivers, complexity of local processing before transporting feedback data, and required transporting communications resources such as bandwidths, time slots and/or radiated powers.

Figure 7A:
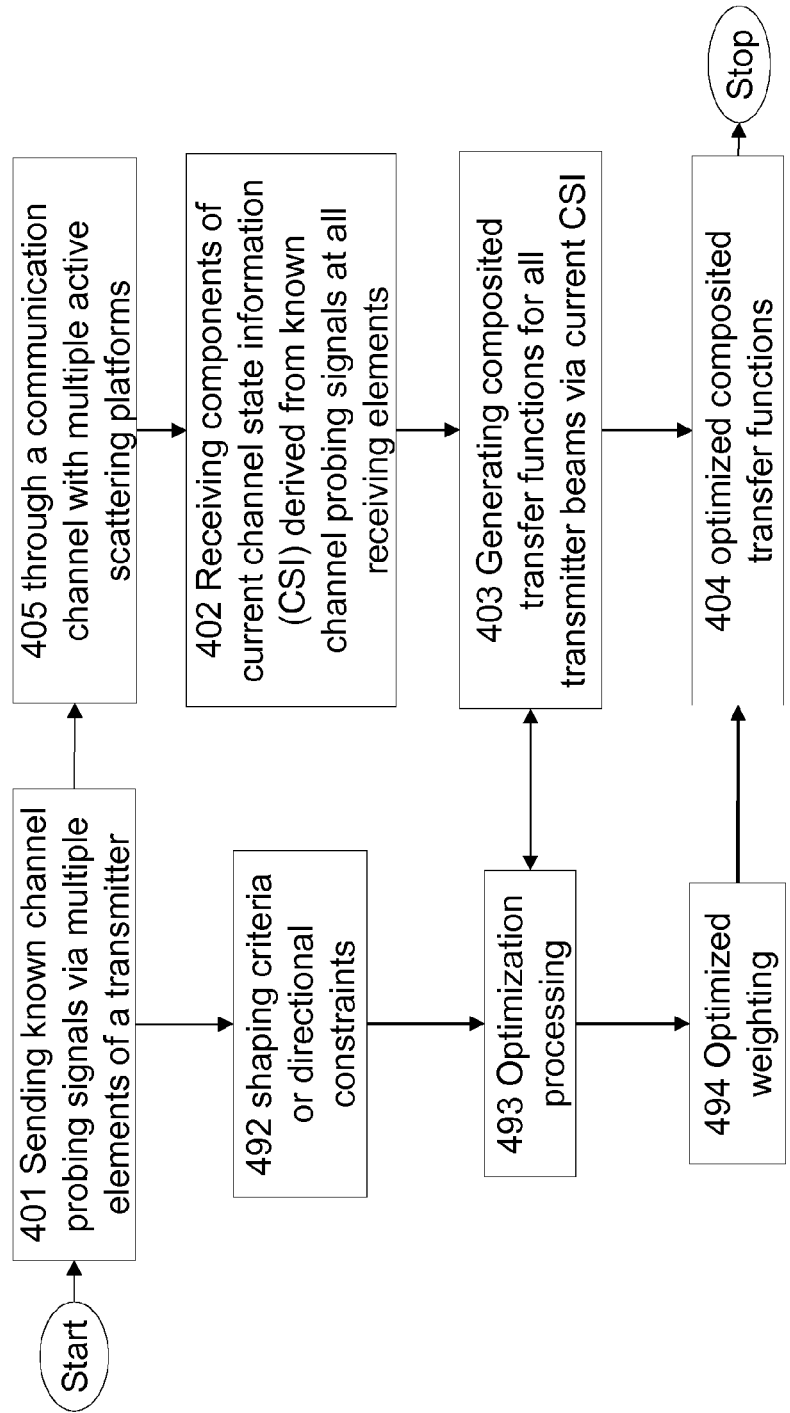
FIG. 7a depicts a flow diagram in generating optimized composited transfer functions via updated channel status information (CSI) and specified beam shaping criteria for a MIMO transmitter in accordance with some embodiments.

FIG. 7a depicts a flow chart with a close loop optimization for composited transfer functions; each composited transfer function shall exhibit shaped beam features. For each frame of transmissions, MIMO communications systems will monitor dynamic propagation channels and generate or update current channel state information (CSI) by sending probing signals from a transmitter 401 through a communications channel 405 with multiple active scattering platforms and obtaining feedback information from various receivers 402. Composited transfer functions 403 are formulated by summing multiple weighted transfer functions corresponding to propagation characteristics from various transmitting elements to same sets of receiving elements on various receivers. The propagation characteristics usually include time delays, phase and amplitude changes for various signal frequency components and will include the active scattering effects from all transponding platforms. To optimize composited transfer functions using beam shaping techniques; a set of beam shaping criteria 492, such as orthogonal-beam (OB) and quiet-zone criteria, must be available to an optimization processor 493, which may be programmed to (iteratively) generate a set of optimized weighting coefficients 494 based on algorithms; such as cost minimization. Optimized composited transfer functions usually are characterized as shaped beams with spatially sampled constraints. These transfer function constraints are measured concurrently at multiple receiving antenna elements on various receivers.

Figure 7B:
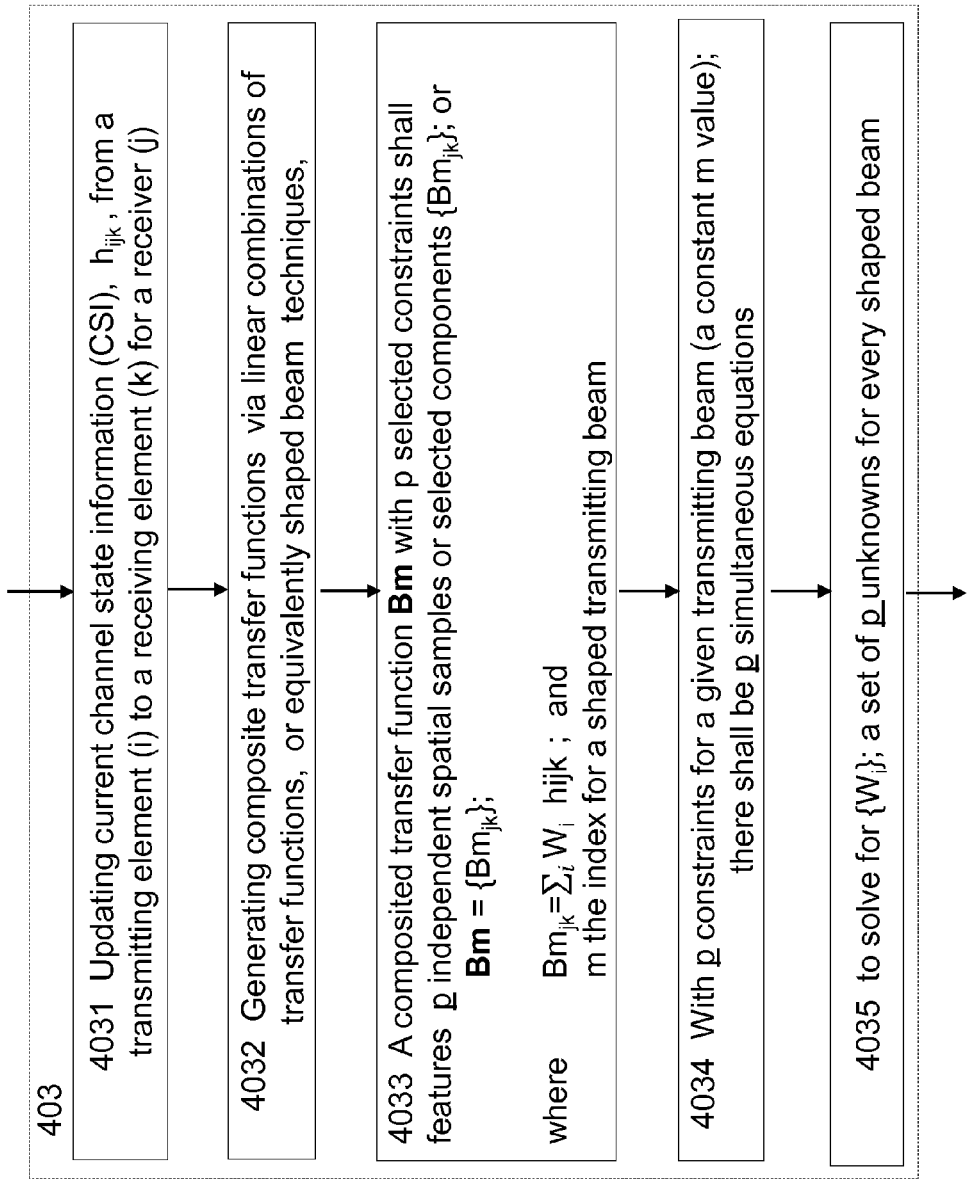
FIG. 7b depicts a more detailed flow diagram in generating composited transfer functions via updated channel status information (CSI) for a MIMO transmitter in accordance with some embodiments.

FIG. 7b depicts a detailed formulation for the box 403 in FIG. 7a. It is formulated based on a narrow band signal assumption. As a result, the weighting coefficients Wi comprise only time delay, phase and amplitude components. It is based on current measured channel state information CSI 4031 from various transmitting elements to different receiving elements. A component of a composited transfer function 4032, from multiple transmit elements of a transmitter to a first receiving element, is generated via a sum of weighted transfer function; or a linear combination of selected transfer functions. The set of the weightings shall be applied to other component of the composited transfer function 4032 from the same multiple transmit elements to a second receiving element, and so on. In other words, a composited transfer function Bm with p selected constraints 4033 shall features p independent spatial samples or selected components $\{Bm_{jk}\}$; or $$Bm_{jk} = \{Bm_{jk}\};$$

where $$Bm_{jk} = \Sigma_i W_i h_{ijk};$$

m the index for a shaped transmitting beam,
i is an index for all transmit antenna elements,
j and k are the indexes for the $k^{th}$ element of a $j^{th}$ receiver, and
the summation is operated over the entire i's, or all transmitting elements.

As a result, every shaped beam shall be constrained by p simultaneous equations 4034. To solve $\{W_i\}$ 4035, we shall use these equations via iterative optimization processing. We usually select p to be identical to number of transmitting elements.

For wide band signal processing applications, the weighting shall be formulated, as an example, by finite impulse response (FIR) filters. There are many other wideband signal processing formulation/configurations as suggested in standard text books on digital signal processing.

Embodiment 1

Figure 8:
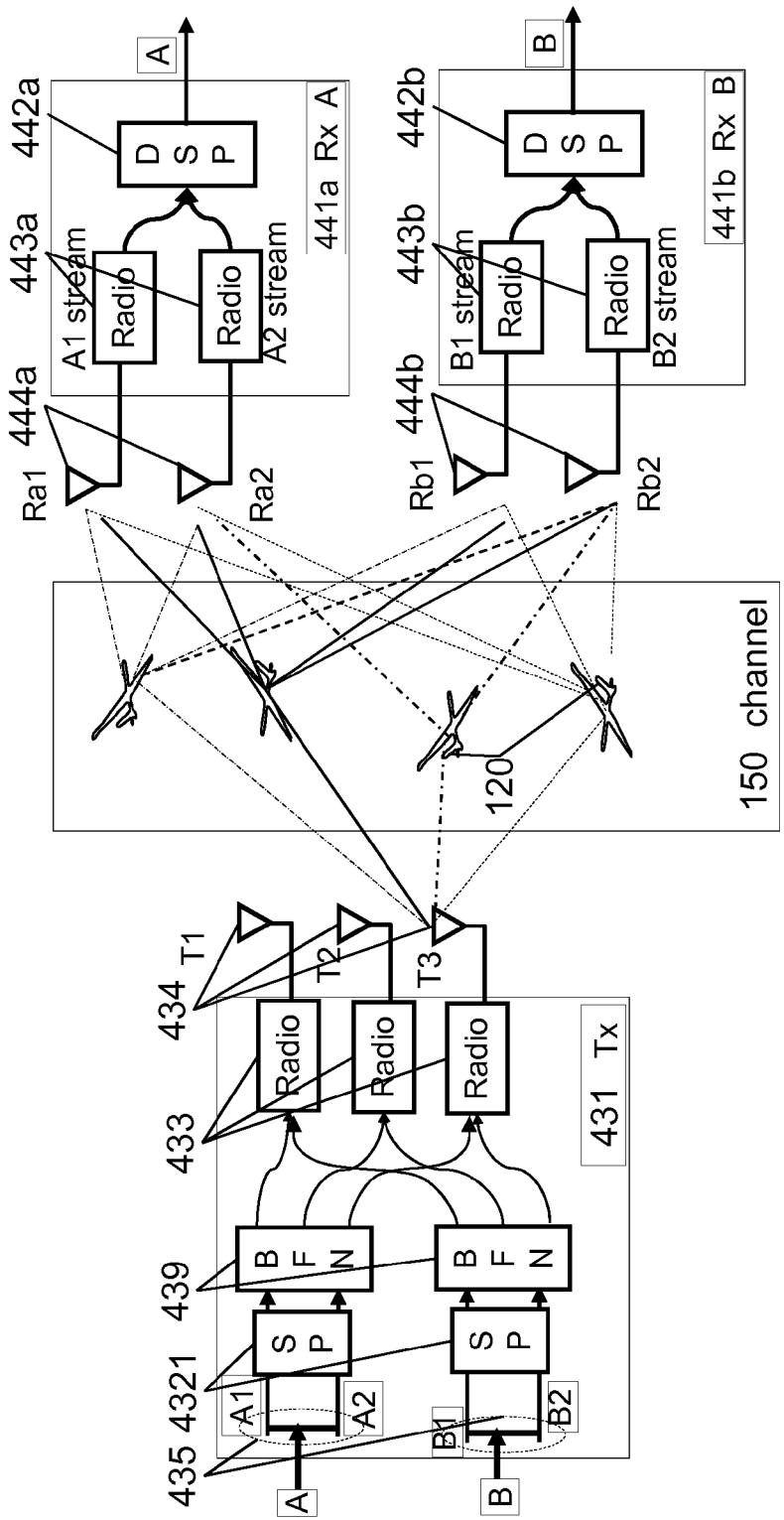
FIG. 8 illustrates a communication network in a multipath dominated propagation environment performing preprocessing to form two groups of user sensitive transferred functions assuming users featuring two receiving antenna elements each in accordance with some embodiments.

In FIG. 8, the first input data stream for a transmitter (Tx) 431, stream A, is segmented into two substream A1 and A2; followed by a first signal processor (SP) 4321, and then followed by a first 2-to-3 beam forming network (BFN) 439 which performs beam shaping for two concurrent transmitting beams. The SP 4321 features 2 inputs and 2 outputs for part of space mapping functions, and the BFN 439 two inputs and three outputs. The first input of the BFN 439 is the for beam $B_{a1}$ for equation (6), and the second input is for a second shaping beam for transmitting, beam $B_{a2}$, also featuring with a peak aimed to the second antenna element 444a, Ra2 of a first user Rx A at a first destination and two nulls at the two elements of the antennas 444b, Rb1 and Rb2, for a second user Rx B at a second destination. The three outputs of the BFN 439 are connected to three radios 433 for frequency up-conversion and power amplifications, before radiated by three transmitting antennas 434.

The three beam shaping constraints for beam $B_{a1}$ are equations 6a, 6b and 6c for a OB beam. With the OB beam constraints, beam $B_{a2}$ shall feature nulls at Rb1 and Rb2 with constraints 1 and 2

$$wa1*h1b1+wa2*h2b1+wa3*h3b1=0 \quad (9a)$$

$$wa1*h1b2+wa2*h2b2+wa3*h3b2=0 \quad (9b)$$

Beam $B_{a2}$ shall also feature a peak at Ra2 location with constraint 3

$$\text{Max}(abs(wa1*h1a2+wa2*h2a2+wa3*h3a2)) \quad (9c)$$

With three equations of 9a, 9b and 9c (the constraints for one of the OB beams), an optimization algorithm shall led us to an optimum set of solutions for wa1, wa2 and wa3 as the optimized weighting components of a beam weighting vector (BWV) for beam $B_{a2}$.

It is assumed that spacing between elements Ra1 and Ra2 are relatively small in comparison to those from Ra1 to Rb1 or Rb2, and those from Ra2 to Rb1 or Rb2. Therefore, we have not imposed more stringent constraints than those in the example in FIG. 7a on shaped transmitting beams. With more performance constraints specified for a shaped transmitting beam, a transmitter would require more transmitting elements with proper element spacing.

In a slightly modified configuration for more transmitting elements, a beam peak pointed at a first receiving element of a first user for a first shaped OB beam shall feature a null at the second receiving elements of the first user, and two more nulls at the two receiving elements of the second user utilizing the same frequency slot. There are 4 constraints for each shaped beam, and therefore at least 4 elements are required in the transmitting array 434. The fine spatial resolutions, much finer than those derived directly for line-of-sight resolutions are results from "magnification effects" due to multipath scatting in a communication channel 150.

Referring to the configuration in FIG. 8 again, the second input data stream from the transmitter (Tx) 431, stream B, is also segmented into two substream B1 and B2; followed by a second signal processor (SP) 4321 which, among other functions, performs a part of spatial mapping for two concurrent signals substreams B1 and B2. Following the SP 4321, a second 2-to-3 beam forming network (BFN) 439 features 2 inputs and 3 outputs. The first input is the for beam $B_{b1}$ for equation (8), and the second input is for a second shaping beam, beam $B_{b2}$, featuring a peak aimed to Rx B 441b but to the second antenna element Rb2 of the array 444b, and two nulls at two elements Ra1 and Ra2 444a for the first receiver 441a. The three outputs are connected to three radios 433, which are followed by three transmitting antennas 434.

Similarly, the three beam shaping constraints for beam $B_{b1}$ are equations 8a, 8b and 8c for one of the OB beams. With the OB beam constraints, beam Bb2 shall feature nulls at Ra1 and Ra2 with constraints 1 and 2

$$wb1*h1a1+wb2*h2a1+wb3*h3a1=0 \quad (10a)$$

$$wb1*h1a2+wb2*h2a2+wb3*h3a2=0 \quad (10b)$$

Beam BBb2 shall also feature a peak at Rb2 location with constraint 3

$$\text{Max}(abs(wb1*h1b2+wb2*h2b2+wb3*h3b2)) \quad (10c)$$

With three equations of 10a, 10b and 10c, an optimization algorithm shall led us to an optimum set of solutions for wb1, wb2 and w3b3 as the optimized weighting components of a beam weighting vector (BWV) for beam $B_{b2}$.

The two antenna elements 444a at the first receiving sites Rx A 441a will only capture radiated signal substream "A1" delivered by beam $B_{a1}$ and substream "A2" delivered by beam $B_{a2}$, while the two antenna elements 441b of the second receiver Rx B 441b at the second destination will only be accessible to radiated substream "B1" signals delivered by beam $B_{b1}$ and the radiated substream "B2" signals delivered by beam $B_{b2}$.

For the first receiver Rx A 441a at the first destination, the received signals by the first element, Ra1, of the array 444a conditioned by a first one of the radios 443a, will comprise mostly information of substream A1 delivered by beam $B_{a1}$ and some leakage of substream A2 radiated by beam $B_{a2}$. Similarly, the received signals by the second element, Ra2, of two antennas 444a conditioned by a second one of the radios 443a, will comprise mostly information of substream A2 delivered by beam $B_{a2}$ and some leakage of substream A1 radiated by beam $B_{a1}$. The functions of the DSP 442a are (1) to recover received A1 and A2 substreams by de-coupling the correlations of the two received substreams of signals via linear combinations, and (2) combining the recovered A1 and A2 substreams to reconstitute the signal stream A.

At the site of Rx B 441b, the received signals by the first element, Rb1, of the array 444b conditioned by a first one of the radios 443b, will comprise mostly information of substream B1 delivered by beam Bb1 and some leakage of substream B2 radiated by beam Bb2. Similarly, the received signals by the second element, Rb2, of two antennas 444b conditioned by a second one of the radios 443b, will comprise mostly information of substream B2 delivered by beam $B_{b2}$ and some leakage of substream B1 radiated by beam $B_{b1}$. The functions of the DSP 442b are (1) to recover received B1 and B2 substreams by decoupling correlations of the two received substreams of signals via linear combinations, and (2) combing the recovered B1 and B2 substreams to reconstitute the signal stream B.

At transmitting site 431 of FIG. 8, the spatial mapping functions of SP 4321, and those in BFN 439 are combined in many other embodiments of MU MIMO with frequency re-use via beam shaping techniques.

Embodiment 2

Figure 9:
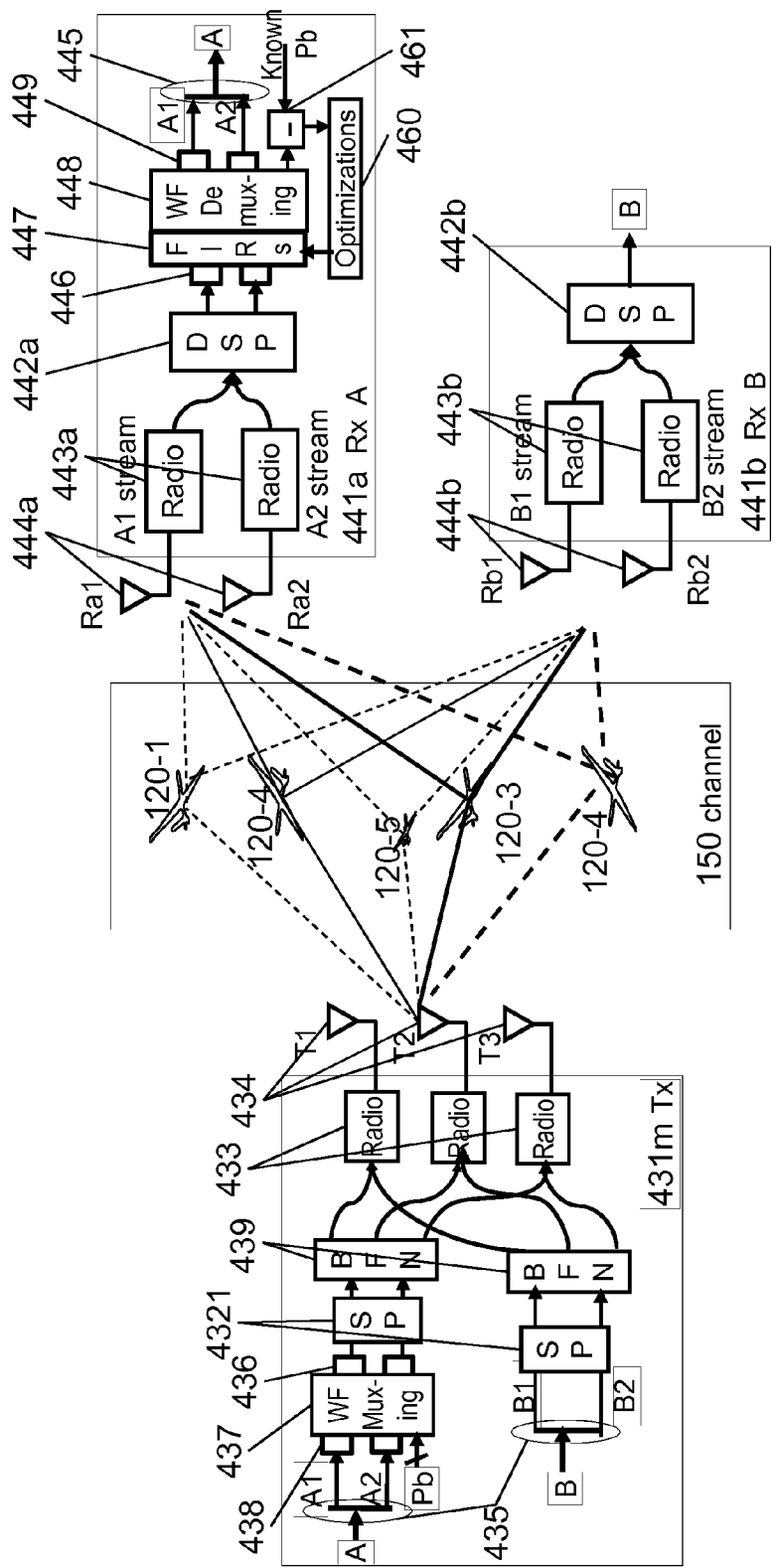
FIG. 9 illustrates a communication network in a multipath dominated propagation environment performing preprocessing to form two groups of user sensitive transferred functions assuming both users featuring two receiving antenna elements each in accordance with some embodiments. One user also features wavefront multiplexing/demultiplexing for dynamic resource allocations among RF power and RF bandwidth resources of the transmitting elements. The multipath dominated channel features multiple transponding airborne platforms.

In another embodiment depicted in FIG. 9, wavefront multiplexing/de-multiplexing (WF muxing/demuxing) are introduced for dynamic resource sharing. The only differences between FIG. 8 and FIG. 9 are (1) at a transmitter (Tx) 431m for signal stream "A" between the first splitter 435 and the first signal processor (SP) 4321 in FIG. 8, a suite of a wavefront multiplexing (WF muxing) processors is inserted; and (2) the current first receiver 441am is modified by inserting a suite of wavefront demultiplexing (WF demuxing) devices between a DSP 442a and a signal combiner 445a. We shall focus on the new additions.

At the transmitting site 431m for a signal stream "A", which are segmented into A1 and A2 substreams by a first splitter 435; each followed by a TDM demuxer or a serial-to-parallel (S/P) converter 438. The outputs of the demuxer or converters 438, along with pilot or diagnostic signals (Pb) are sent to an M-to-M wavefront multiplexer 437 (WF muxer) with M inputs and M outputs, where M≥3. The M outputs are grouped into two segments; each is individually multiplexed by a conventional multiplexer 436 (such as TDM, FDM or CDM multiplexer) into one WF muxed data stream. The two wavefront multiplexed (WF muxed) data streams; Mux1 and Mux2, are then connected to the two inputs of the first SP 4321. The remaining processing for the Mux1 and Mux2 in FIG. 9, from the inputs of the first SP 4321 all the way to the three radiating elements, are identical to those for A1 and A2 in FIG. 8. Similarly, the processing for data stream "B", from the splitting/segmenting device 435 all the way to the three radiating elements 434, is identical to that in FIG. 8.

There are many choices for the WF muxing transformation 437. Orthogonal matrixes are simple because their inverse matrixes are similar to the original ones. Non-orthogonal matrixes with existing inversed matrixes may also be used for WF muxing. For many embodiments, a 256-to-256 Hadamard transform is chosen as the WF muxing processor 437. The first 127 input ports are for the A1 substream after converted from a fast serial flow to 127 parallel slower flows by a first TDM demuxer as the first serial-to-parallel converter 438. Similarly the second 127 input ports are connected to the A2 substream after converted from a fast serial flow to 127 parallel slower flows by a second TDM demuxer as the second serial-to-parallel converter 438. As symbolically depicted, the last two inputs are connected to a set of probing/diagnostic signals.

The 256 outputs of the WF muxing processor 437 are 256 different weighted sums of the 256 inputs. Each input features a unique distribution of its weighting parameters, a weighting vector with 256 components or a wavefront with 256 components. Signals connected to different input ports shall exhibit various distributions of their weighting parameters, or various weighting vectors or wavefronts. In fact, the 256 input ports to the Hadamard transform are associated with 256 distinct wavefronts mutually orthogonal to one another. We will use the orthogonal features via probing signals in receiving, to equalize propagation channels and coherently combine received signals from multiple paths for enhanced signal to noise ratios of received desired signals A signal stream connected to one input of the WF muxing processor 437 will appear in all its outputs with a unique weighting distribution. Conversely signals from one output of the WF muxing processor 437 is a result of a linear combinations of all its input signals, which may be completely independent and unrelated.

After WF muxed, the 256 outputs of the WF muxing process 437 are grouped into two sets; each with 128 outputs which are multiplexed in time, frequency or coded into a single stream, Mu1 or Mu2. Mu1 and Mu2 comprise information from A1, A2 and known pilot or diagnostic signal streams, which only use less than 1%, or 2/256, of propagation bandwidth assets. By the way, the percentage of power assets for the probing or diagnostic signals can be controlled by minimizing the input power of these probing signals in comparisons to these of desired communications data/signal streams at the input ports from the $1^{st}$ to the $254^{th}$.

In many embodiments, pilot/diagnostic signals are connected to any input ports, not fixed for a last set of input ports of a WF muxing processor.

Referred back to the transmitter 431m in FIG. 9, two independent data streams A and B are segmented individually into two sets of segmented input data substreams (A1, A2), and (B1, B2) which are processed in parallel but through different processing. The stream A is converted to substreams (A1, A2), which are processed via a WF muxing transformation to become (Mu1, Mu2). They are spatially mapped by two shaped beams formed by a first SP 4321 followed by a first 2-to-3 beam forming network (BFN) 439 with 3 common outputs, which are amplified by 3 radios 433 and then radiated through a set of 3 antennas 434. On the other hand, the stream B is converted to substreams (B1, B2). They are spatially mapped by a second SP 4321 followed by a second 2-to-3 BFN 439 with 3 common outputs, which are amplified by the same 3 radios 433 and then radiated through the same set of 3 antennas 434.

As to the first receiver 441am in a first destination, Rx A, in FIG. 9, the two antennas 444a will only capture radiated signal WF muxed substream "Mu1" delivered by beam $B_{a1}$ and WF muxed substream "Mu2" delivered by beam $B_{a2}$. They 441a are at nulls of the third and the fourth shaped beams $B_{b1}$ and $B_{b2}$ under the OB beam constraints. Similarly, the two antennas 441b at a second destination, receiving site Rx B 441*b*, are at nulls of the first and the second shaped beams $B_{a1}$ and $B_{a2}$ under the OB beam constraints, and will only be accessible to radiated substream "B1" signals delivered by beam $B_{b1}$ and the radiated substream "B2" signals delivered by beam $B_{b2}$.

At the first destination of Rx A 441*a*, the received signals by the first element, Ra1, of a two element array 444*a* conditioned by a first one of the radios 443*a*, will comprise mostly information of substream Mu1 delivered by beam $B_{a1}$ and some leakage of substream Mu2 radiated by beam $B_{a2}$. Similarly, the received signals by the second element, Ra2, of the two element array 444*a* conditioned by a second one of the radios 443*a*, will comprise mostly information of substream Mu2 delivered by beam $B_{a2}$ and some leakage of substream Mu1 radiated by beam $B_{a1}$. Ideally, the functions of the DSP 442*a* are to recover received Mu1 and Mu2 WF muxed substreams by decoupling the correlations of the two received signal substreams via linear combinations. Since Mu1 and Mu2 are heavily correlated, conventional techniques of de-correlating Mu1 and Mu2 will not work efficiently as parts of spatial de-mapping by the SP 442*a*. However, that function is carried out as part of equalization process by a bank of the FIR filters 447 before the WF demuxing processor 448. Since we use both (1) differences 461 between signals from received probing signal channel and known probing signals, and (2) correlations of signals between pilot signal ports and desired signal ports as "cost functions" in optimization 460, the FIR filters with optimized weighting shall realign WF muxed components of A1 and A2 substreams. All cost functions shall be positive defined, and a "current' total cost is the sum of all "current" cost functions. At an optimized state, the total cost shall be minimized. The combining device 445*a* will de-segment the recovered A1 and A2 substreams to reconstitute the signal stream A.

The receiving hardware 443*a* in the first destination Rx A of FIG. 9 shall be identical to that in FIG. 8, but signal processing has been reconfigured to include mainly a WF demuxing block 448 as a part of software based processing. On the other hand, the receiving processing 443*b* in the second destination Rx B of FIG. 9 shall be identical to that in FIG. 8.

Figure 10:
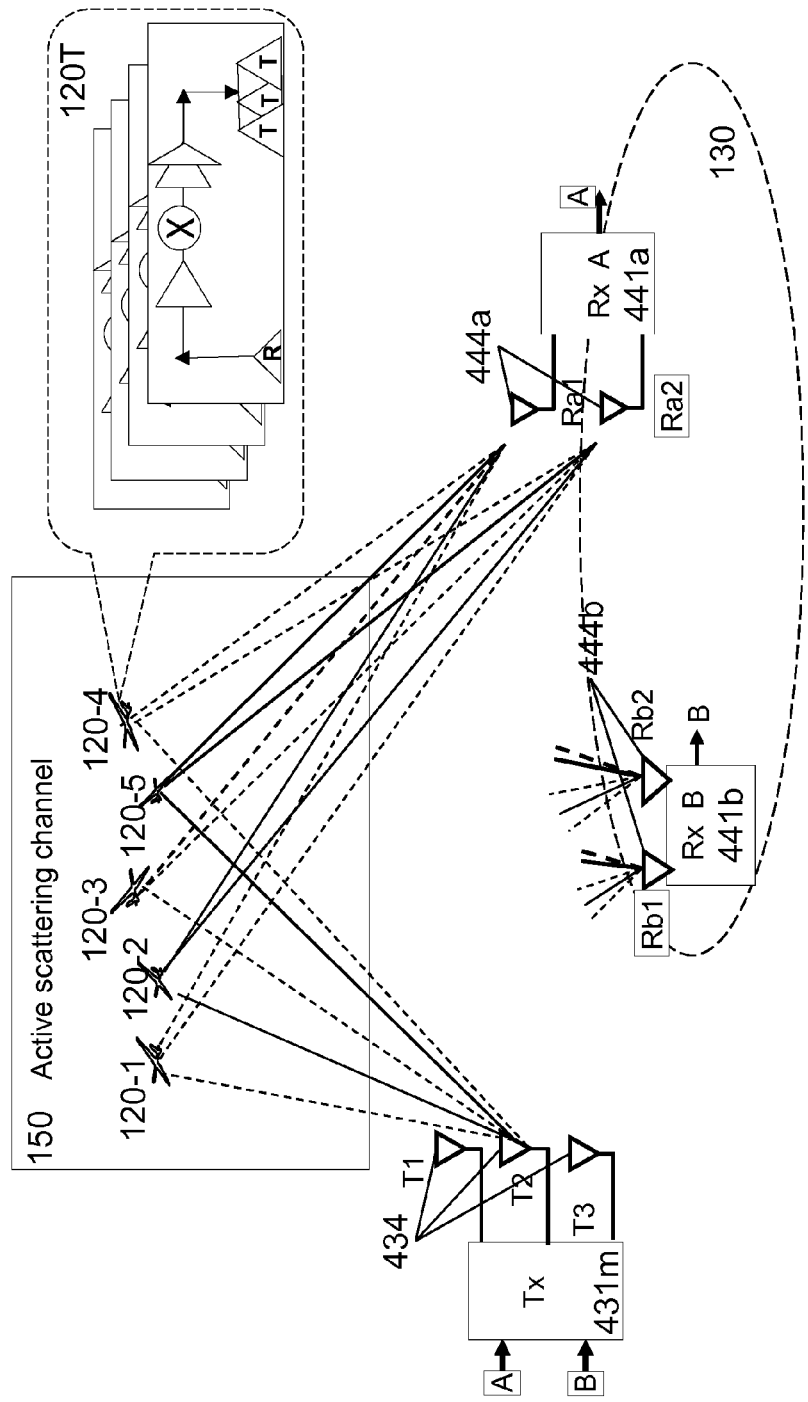
FIG. 10 illustrates a MIMO communication network via multiple airborne transponding platforms servicing two uses concurrently. Two groups of user sensitive transferred functions are formulated assuming both users featuring two receiving antenna elements each in accordance with some embodiments.

FIG. 10 depicts an identical configuration as that in FIG. 9, except multiple bent-pipe transponder payloads 120T on a UAV 120 are shown. The depicted 4 transponders are independent and identical; receiving in $f_u$ and transmitting in $f_d$ frequency band with a finite bandwidth BW. Frequency translations are accomplished via a band of frequency converters. Associated low noise amplifiers (LNA) in front of the converters and power amplifiers after the converters are depicted but not identified. Each of the 4 transponder may feature a less than 100W radiated power at $f_d$; such as radiation of 10 W at 1800 MHz. The receiving of a transponder in a forward link may feature a large field of view (FOV) by a single feed indicated as a triangle with a "R" symbol inside, while the transmitting in the forward link are over a smaller FOV by an array with three feeds indicated as a cluster of three triangles with a "T" symbol inside each. The return link configuration (not shown) may be reversed. Furthermore the receiving and the transmitting FOV's are centered at different directions. These independent transponders 120T may be clustered together in a small UAV 120 or distributed 10's of wavelengths away from one another in a large UAV 120. As the UAVs move, the resulting scattering effects will be dynamically altered accordingly. The dynamic scattering from a transponder are due to varying incident and exit angles as far as a forward link data stream from a fixed ground source to various ground destinations is concerned.

Figure 11:
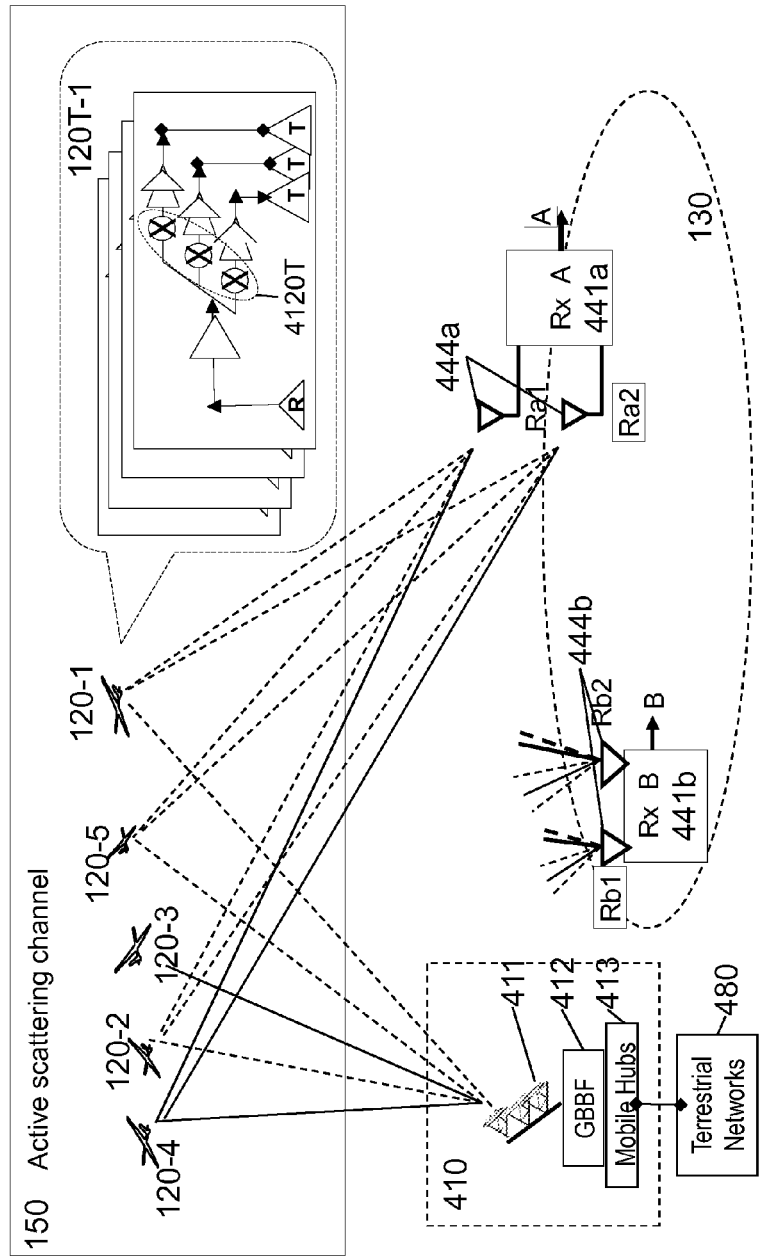
FIG. 11 illustrates a MIMO communication network via multiple airborne transponding platforms servicing two uses concurrently. Two groups of user sensitive transferred functions are formulated assuming both users featuring two receiving antenna elements each in accordance with some embodiments. Ground based beam forming techniques are used to address and direct signals to be radiated by identified elements on UAVs.

FIG. 11 depicts another forward link configuration similar to those in FIG. 9 and FIG. 10. There are two differences; (1) the ground hub 410 featuring additional equipment and functions than those in the source 431*m* in FIG. 9; (2) multiple bent-pipe transponder payloads 120T-1 on one of the UAVs 120 as shown featuring a frequency de-multiplexing capability via a bank of frequency converters 4120T in the forward link to allow the ground facility 410 to "address" each of the three transmitting elements independently; delivering various signals to different transmitting element. The receiving element, indicated by a triangle with an "R" in it, is for receiving signals from a feeder link originated from a ground facility 410 in a background region, while the transmitting elements, each indicated by a triangle with a "T" in it, are for radiating individually selected transponding signals concurrently to destinations in a foreground region 130.

The ground hub 410 features (1) high gain tracking beams generated by high gain tracking antennas 411 or equivalents, (2) ground based beam forming (GBBF) capability 412, and (3) mobile hub functions 413. Each of the high gain beams 411 tracks and communicates with at least one of UAVs 120 individually and continuously. The GBBF 412 provides capability via multiplexed wideband signals in feeder links to deliver various transmitting signal streams to individual transmitting elements on any one of the UAVs 120 as indicated for the forward links communications. For return link communications via UAVs (not shown), it will be able to recover various received signals from individual receiving elements on any one of the UAVs 120 and perform further processing such as beam forming functions. The mobile hub functions 413 include all those of the source equipment 431*m* in FIG. 9 and interface or gateway functions with other terrestrial communications networks.

The depicted forward link communications payload features 4 sets of independent bent pipe transponders 120T-1; each with one receiving element to capture multiplexed wideband signals comprising 3 independent signal streams. The captured wideband signals are amplified and properly filter, and then sent to a 1-to-3 de-multiplexer 4120T to separate the multiplexed wideband signals into 3 individual signal streams, which are further amplified by individual power amplifiers before radiated by three transmitting elements to foreground coverage 130. This payload supports three independent but controllable propagation paths. The controls on ground by processing in the GBBF 412 for the three independent paths comprise modifications of propagation delays, as well as alterations of differential amplitudes and phases.

Embodiment 3

Figure 12:
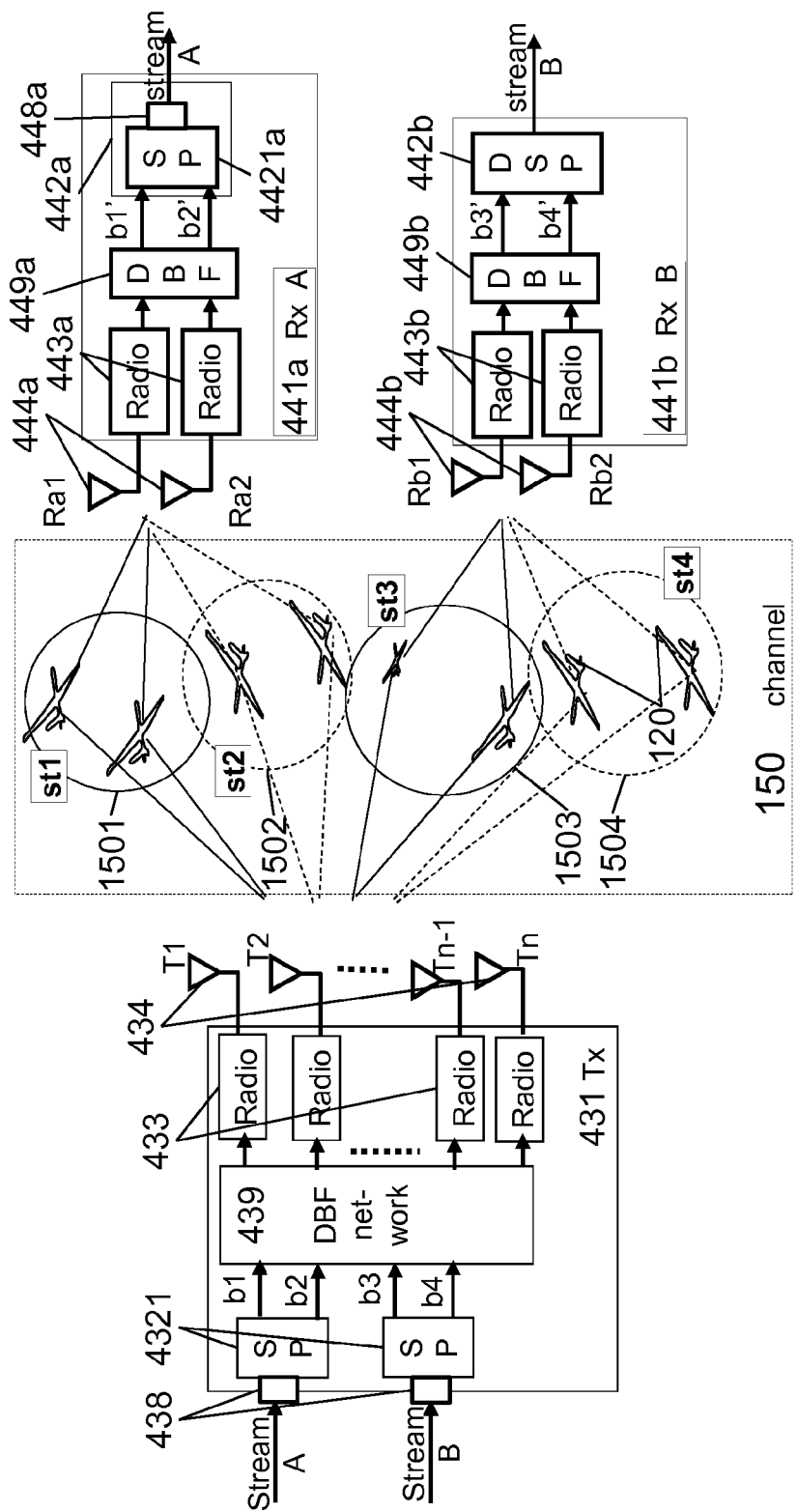
FIG. 12 illustrates a multi-user MIMO communication configuration in a propagation environment dominated by a fleet of multiple air borne transponding platforms with preprocessing to form two groups of orthogonal beams in a common frequency slot dedicated for two independent users in accordance with some embodiments.

FIG. 12 depicts a third embodiment. A point to multiple-point communications system features a transmitter 431 with n transmitting (Tx) elements 434, T1, T2, T3, . . . , and Tn, where n≥4; sending two independent signal streams, A and B, through a multiple path dominated channel 150. There are 4 transmitting (Tx) beams formed by a multibeam digital beamforming (DBF) 439 network or equivalents focused to 4 different scattering regions 1501 1502, 1503, 1504 of the multipath dominated channel 150. Each of the scattering regions 1501, 1502, 1503, and 1504 comprises of multiple UAVs 120. As a result, an allocated spectrum has been used at least four times (4×) through a multipath dominated communications via the four independent beams; b1, b2, b3, and b4. These 4 beams, featuring spot beams, shaped beams, or combinations of spot and shaped beams, are divided into two groups; two of the 4 Tx beams as a first set of Tx beams, optimized and assigned to deliver signal stream A to a first receiver 441a, Rx A, only. The input ports of these two beams are indicated as "b1" and "b2". The allocated spectrum will be utilize two times, or 2×, for the two beams. The remaining two Tx beams, a second set of Tx beams, are optimized and assigned to service only a second receiver 441b, Rx B. The input ports of these two beams are indicated as "b3" and "b4", utilizing the same allocated spectrum two more times.

There are feedback networks (not shown) for dynamic updating the channel state information (CSI).

At the transmitter (Tx) 431, a first signal stream, stream A, to be transmitted for the first receiver 441a, Rx A, is divided into two segments; substreams A1 and A2, by a first splitters 438, while a second stream, stream B, to be transmitted for the second receiver 441b, Rx B, is divided into two segments; substreams B1 and B2 by a second splitters 438. Substreams A1 and A2 are pre-processed by a signal processor (SP) 4321, which may include additional coding, space-time processing and/or other formatting prior to a transmitting DBF network 439; which features 4 inputs and n outputs; where n≥4. The transmitting radios 433 comprise frequency up-converters, and power amplifiers. Each may also comprise part of modulation functions.

The depicted transmitting system, an optimized combination of the transmitter (Tx) 431 and the transmitting array 434, supports two receivers, Rx A 441a and Rx B 441b, each with two receiving beams using at least two Rx elements 444a and 444b. The two elements, Ra1 and Ra2, of the array 444a for the first receiver 441a, Rx A, are electronically configured by a first 2-to-2 receiving digital beam forming (DBF) processor 449a to efficiently capture radiated signals by the first set of Tx beams. The two outputs of the first DBF processor 449a are indicated by b1' and b2' beams. Similarly, the two elements 444b, Rb1 and Rb2. for the second receiver 441b, Rx B, are configured by a second 2-to-2 receiving DBF processor 449b to optimally capture radiated signals sent by the second set of Tx beams. The two outputs of the second DBF processor 449b are indicated by b3' and b4' beams.

In a multipath dominated channel 150, there are multiple scattering regions, st1 1501, st2 1502, st3 1503, st4 1504 for EM waves originated from a transmitter to different receiver elements 444a and 444b. There is at least one of the UAVs 120 in each scattering region as active scattering platforms.

Via controlling or shaping of radiations of multiple antenna elements in transmitting side, spatial separations or isolations are achieved in delivering "A" stream and "B" stream through a multi-path dominant active scattering to service two different users at slightly different destinations in a common time/frequency slot. The transmitting system, an optimized combination of the transmitter 431 and the array antenna 434, delivers the first stream of data, the "A" stream," to a first receiver Rx A with adequate isolations from the transmission of signal stream B.

At the first receiver Rx A 441a, with two receiving beams formed concurrently by the first receiving DBF 449a from multiple receiving array elements 444a (at least two); Ra1 and Ra2. Substream A1 is "captured" and delivered only to a first beam port b1' of the receiving DBF 449a and substream A2 only to a 2nd beam port b2' of the DBF 449a. The radios 443a will condition the incoming received signals. The "conditioning" includes amplifying by low noise amplifiers, bandpass filtering, and frequency down conversions by other electronics accordingly. The DSP 442a performs "de-correlation" functions between b1' and b2' substreams by a signal processor (SP) 4421a and combining by a de-segmenting device 448a in which the de-correlated two substreams are properly combined into a reconstituted signal stream "A".

Similarly, the transmitting system, an optimized combination of the transmitter 431 and the transmitting antenna elements 434 will concurrently deliver signals to the second receiver Rb, with two receiving beams concurrently formed by multiple array elements (at least two); Rb1 and Rb2. Data substream B1 appears only to a first beam port b3' and data substream B2 only to a 2nd beam port b4' of the 2nd receiver Rx B. The DSP 442b performs both de-correlation and combining functions. Spatial de-mapping functions are carried out by combinations of the DBF 449b and the DSP 442b.

Figure 13:
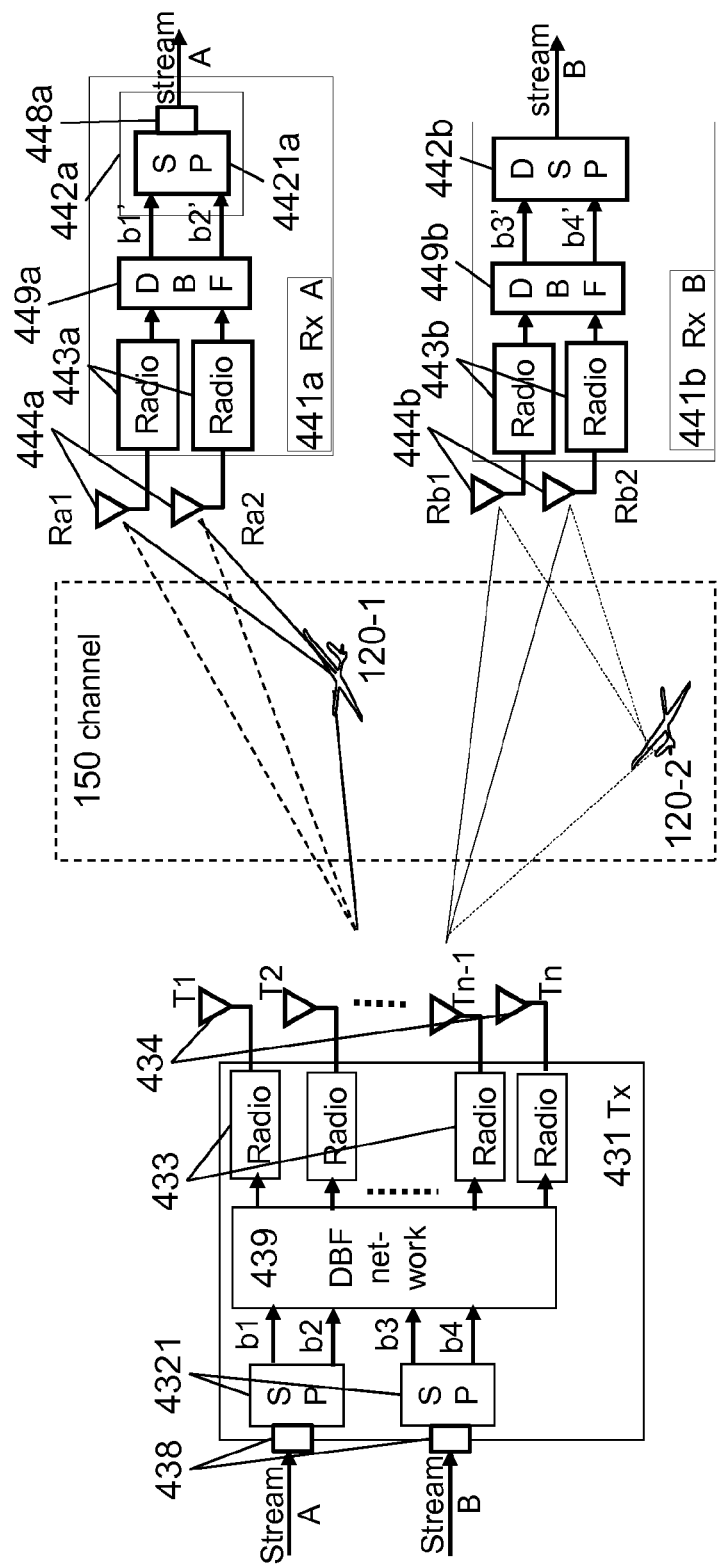
FIG. 13 illustrates a multi-user MIMO communication configuration in a propagation environment with two exclusive sets of airborne transponding platforms with preprocessing to form two groups of orthogonal beams in a common frequency slot dedicated for two independent users in accordance with some embodiments.

FIG. 13 is a special case of FIG. 12. The transmitter and the two receivers are identical to those in FIG. 12. The differences are in the propagation channel 150. Multi-paths are due to scatterings of two UAVs 120-1 and 120-2. There are 4 separated transmitting beams, b1, b2, b3, and b4, by the transmitter 431. A first set of two transmitting beams [b1, b2] is for receiver A 441a, Rx A, and a second set of the other two beams [b3, b4] is for receiver B 441b, Rx B. The two transmitting beams in the first set to Rx A 441a feature a first beam with a line-of-sight propagation and a second beam with an active scattering by a first UAV 120-1. Similarly, the two transmitting beams in the second set to Rx B 441b feature a third beam with line-of-sight propagation and a fourth beam with active scattering in propagation by a second UAV 120-2. There are feedback networks (not shown) for dynamic updating the channel state information (CSI).

Figure 14:
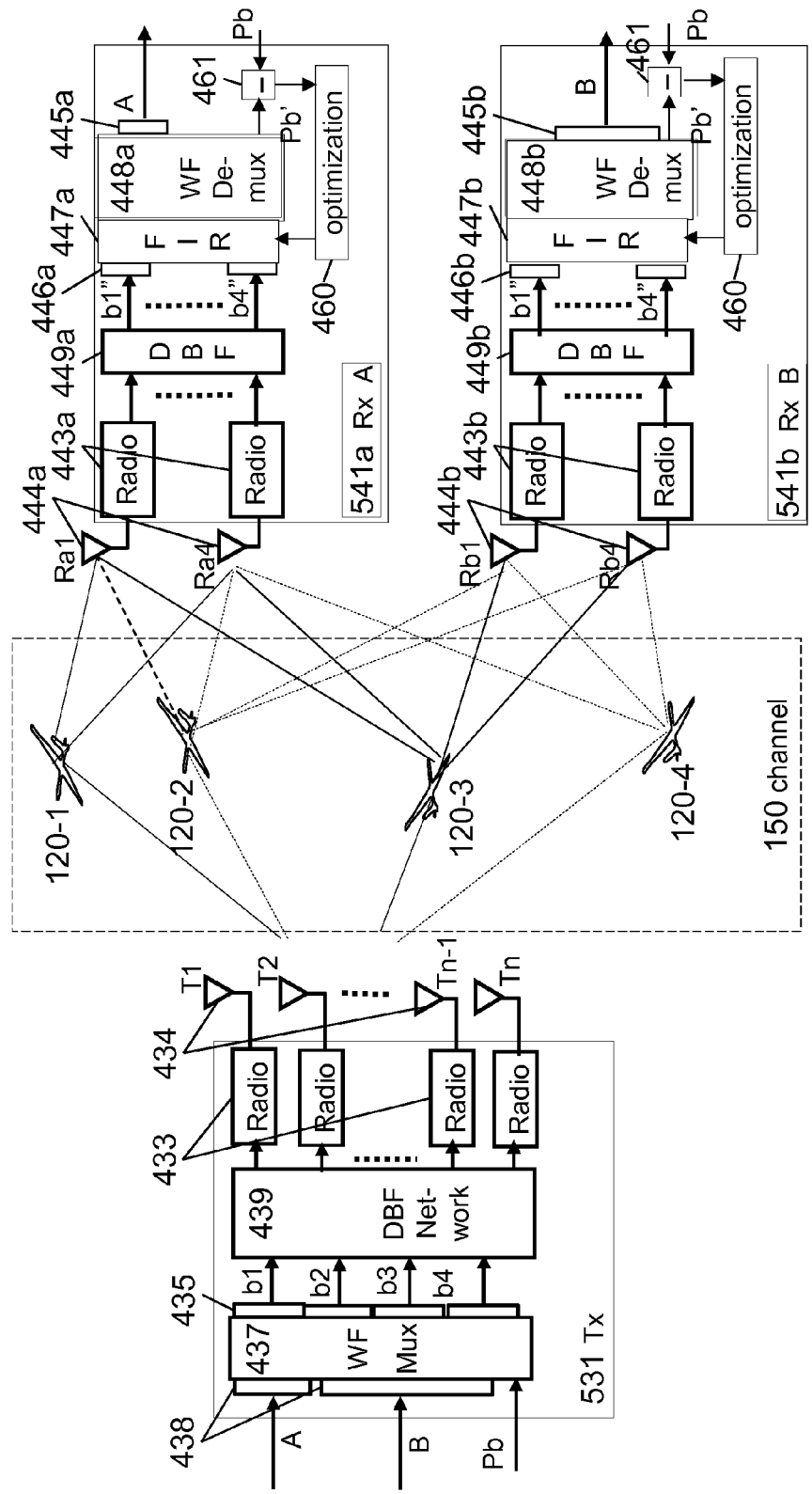
FIG. 14 illustrates a multi-user MIMO communication configuration in a propagation environment with 4 airborne transponding platforms. The transmitting site features a preprocessing of wavefront multiplexing (WF muxing) and digital beam forming (DBF) while the receiving sites with post processing of DBF and Wavefront de-multiplexing (WF demuxing). The DBF's are form a groups of 4 orthogonal beams (OB) in a common frequency slot, tracking and communicating with transponding platforms individually. The four platforms are dedicated for two independent users in accordance with some embodiments. The WF muxing/demuxing enable dynamic resource allocations among the two users, both in radiated power and in channel bandwidth.

FIG. 14 features a modified configuration to that depicted in FIG. 12. The depicted MU-MIMO configuration exhibits four time (or 4×) reuse of an assigned spectrum for two users. Wavefront (WF) multiplexing/demultiplexing (muxing/demuxing) is incorporated for dynamic resource allocations among two users, Rx A, and Rx B. The propagation channel 150 is simplified. Multi-paths are due to scatterings of four UAVs 120. A digital beam forming (DBF) network 439 is configured to form 4 separated transmitting beams, [b1, b2, b3, b4], in a transmitter 531 on ground for tracking 4 individual UAVs 120 independently. A first set of two transmitting beams [b1, b2] is to deliver data to receiver A, Rx A 441a, and a second set of the other two beams [b3, b4] is for delivering data to receiver B, Rx B 441b. In the first set, a first beam continuously tracks a first UAV 120-1 and a second beam aiming for active scattering by a second UAV 120-2. Similarly in the second set, a third beam tracks continuously a third UAV 120-3 and a fourth beam aiming for a fourth UAV 120-4. Each transmitting beam tracks and communicates with a corresponding one of the UAVs 120 roving over a foreground service area 130, such as an area 130 in FIG. 11. There are feedback networks (not shown) for dynamic updating the channel state information (CSI).

Referred back to the transmitter 531 in FIG. 14, two independent data streams A and B are segmented individually into two sets of segmented input data substreams which are converted by programmable TDM demuxers 438 and then processed in parallel along with additional probing/diagnostic substreams concurrently by a M-to-M WF muxing transformation 437. The signal streams A and B after converted to substreams occupy, respectively, a first group and a second group of inputs, while probing and diagnostic codes are assigned to the remaining input ports of the M-to-M WF muxing transform 439. The M outputs are grouped via 4 conventional multiplexers 435, e.g. 4 TDM muxers, followed by a 4-to-n digital-beam-forming (DBF) network 439 which is connected to n radiating elements 434 through a bank of n transmitting radios 433.

The 4 grouped outputs from the WF muxing transform 437 are 4 sets of WF muxed signals, and designated as Mu1, Mu2, Mu3, and Mu4. Mu1 is sent to the first beam port, b1, of the 4-to-n DBF network 439, dynamically aiming to the first UAV 120-1 and forming nulls toward the other three UAVs 120-2, 120-3, and 120-4. The first beam is dynamic controlled via a first beam weight vector (BWV), a set of n components using complex numbers to dictate the signal amplitude and phase setting through the n transmitting elements. The shaped radiation pattern and associated wavefront are dynamically optimized. Similarly the remaining three beams are dynamic controlled via 3 separated beam weight vectors (BWVs), aiming to the corresponding ones of the UAVs 120 and concurrently forming nulls toward the other three of the UAVs. These four transmitting beams are a set of orthogonal beams, or OB beams, with following features;

A peak of a selected beam is always at nulls of other OB beams.

Peaks of other OB beams are always at nulls of the selected beam.

As to the depicted first receiver 541a in a first destination, Rx A, at least 4 antenna elements 444a will only capture radiated signal WF muxed substream "Mu1" delivered by beam b1 via the first UAV 120-1, while WF muxed substream "Mu2" delivered by beam b2 via the second UAV 120-2. So are the other two WF muxed substreams "Mu3" and "Mux4" delivered by beam b3 and b4 via the third and the fourth UAVs 120-3 and 120-4, respectively.

A 4-to-4 receiving DBF processor 449 shall form 4 independent beams, b1' b2' b3' and b4' dynamically aiming for individual UAVs 120. Each receiving beam may take advantage of at least 4 receiving elements to form a set of 4 OB beams. The four receiving elements are to accommodate at least 4 performance constraints for each of the 4 OB beams; one constraint for a specified beam peak and the remaining three for directions of three nulls which are the beam peaks of the other three OB beams respectively. As a result, the b1' port shall feature recovered WF muxed substream "Mux1," and the b2', b3', and b4' ports for the recovered WF muxed substreams "Mux2," "Mux4," and "Mux4," respectively.

The 4 recovered WF muxed substreams are set to 4 demultiplexers 446, which converted them into M parallel channels before connected to a bank of adaptive equalizer 447a, followed by a M-to-M WF demuxing transform 448a, which is programmed to output only a first group of the M outputs and additional outputs of recovered probing signals/diagnostic codes. We use both (1) differences 461 between signals from received probing signal channel and known probing signals, and (2) correlations of signals between pilot signal ports and desired signal ports as "cost functions" in optimization 460, the FIR filters with optimized weighting shall equalize differentials on amplitude and phase as well as time delays among the multiple paths via various UAVs 120.

All cost functions shall be positive defined, and a "current" total cost is the sum of all "current" cost functions. At a non-optimized state in an optimization 460, groups of propagation paths are not equalized. There are significant leakages among the received substreams. As a result, there shall be strong cross-correlations among the recovered probing signals and recovered desired signals and significant differences on received probing signals with respect to a set of known referenced probing signals. Therefore, the total cost shall be "high". On the other hand at an optimized state for the optimization 460, the groups of propagation paths are equalized. There are no leakages among the received substreams. As a result, the total cost shall be minimized.

The combining device 445a will de-segment all recovered substreams to reconstitute the signal stream A.

Similarly, the receiver Rx B in a second destination is identical to the one Rx A in the first destination, except the WF demuxing transform 448b or the WF demuxer is programmed to output only a second group of the M outputs and additional outputs of recovered probing signals/diagnostic codes. As a result, only stream B will be recovered and reconstituted at the second destination.

It is noticed that (1) signal streams A and B are segmented and reformatted into two groups of parallel substreams (2) every substream is sent through all 4 UAVs 120 via the M-to-M WF muxer 437 and the 4-to-n DBF network 439 and (3) each of the 4 Mux is a linear combination of all substreams from signal streams A and B. The communications resources comprise the available bandwidth and radiated powers supported by the 4 UAVs 120. These radiated powers by the four UAVs 120 can be allocated to stream A or B dynamically through the input intensities of A and B streams at the inputs of the WF muxer 437, while the total channel bandwidth through the communications channel 150 can be allocated to stream A or B dynamically through the controlling of number of input ports of the WF muxer 437.

Embodiment 4

Figure 15:
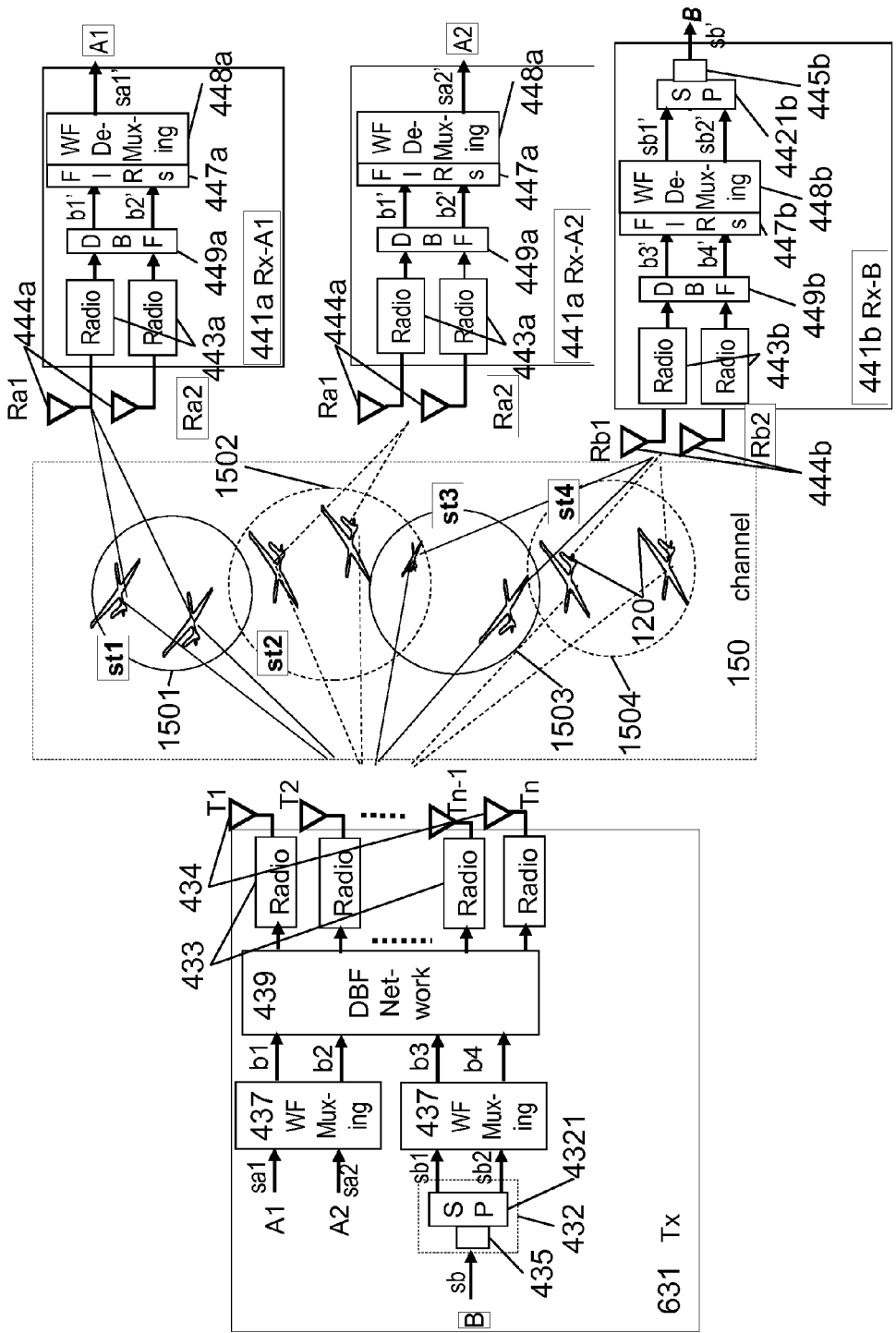
FIG. 15 illustrates a multi-user MIMO communication configuration with digital beam forming (DBF) networks and Wavefront muxing/demuxing for both transmitter or/and receivers in a multipath dominated propagation environment with preprocessing to form two groups of orthogonal beams, or beams with quiet-zones, in a common frequency slot dedicated for two independent users in accordance with some embodiments; There are 4 transmitting beams and 8 airborne transponding platforms; each transmitting beam covers multiple platforms.

FIG. 15 depicts another MU MIMO configuration with wavefront multiplexing/de-multiplexing (WF muxing/demuxing) for efficient dynamic resource allocations. To highlight the key architecture features, we have omitted implementation circuits of the updating measured CSI in feedback networks and simplified WF muxing/demuxing circuits with optimization loops in receivers for path calibrations and equalizations. Furthermore probing/diagnostic signal injection to the WF muxing/demuxing and Input/Output (I/O) port mapping have been discussed extensively in FIG. 14.

The transmitter 631 features 3 input data streams A1, A2, and B (or sa1, sa2, and sb), as well as two WF muxing processors 437. The configuration enables data transporting from a transmitter to three users via an allocated spectrum used four times concurrently. The first and second users need bandwidth allocations to accommodate their dynamic bandwidth requirements. The third user for receiving a third data stream, B or sb, requires about twice the average bandwidth as those of sa1 and sa2 in transmissions but with a near constant bandwidth. As a result, an allocated spectrum will be used twice for transporting the sb; and another two folds for transporting sa1 and sa2 concurrently.

In the transmitter, signals for the first two users, Rx A1 and Rx A2 are designated as A1 (or sa1) and A2 (or sa2). They are WF muxed via a first WF muxing device 437, same as the one in FIG. 14, and two aggregated outputs of the WF muxing device 437 are sent to first two inputs of a multiple beam DBF network 439. The depicted DBF is a 4-to-n DBF; where n is the number of elements in the transmitting array 434. Concurrently, the sb for the third user Rx B is segmented into two substreams sb1 and sb2 by a divider 435 and mapped spatially by a signal process 4321; and then WF muxed by a second WF muxing device 437 before sent to the last two inputs of the 4-to-n DBF network 439. There are n corresponding transmitting elements 434 following N radios 433, each of which performs a frequency up conversion and RF power amplification functions.

As depicted, the 4 beams shall target 4 different regions; st1 1501, st2 1502, st3 1503, and st4 1504. Furthermore, feedback networks (not shown) updating CSI will be used to optimize the BWVs for the four shaped transmit beams in some embodiments. The concepts of OB beams and quiet zones as shaping criteria may be implemented in the DBF networks as good options in simplifying the configuration; such as replacing the spatial mapping functions by the SP 432 and thus eliminating the need for the SP 4321. Two of the 4 targeted scattering regions, st1 1501 and st2 1502, are for the first receiver Rx A1 441a and the second receiver Rx A2 441a. The remaining two; st3 1503 and st4 1504, are for the third user Rx B 441b. The three receivers depicted as Rx A1 441a, Rx A2 441a, and Rx B 441b respectively shall feature same hardware but programmable via software control to various functional configurations as indicated. The first receiver Rx A1 441a shall have at least two receiving elements 444a; each followed by a receiving radio 443a before a digital beam forming (DBF) network 449a. The DBF 449a features two output ports, connected to inputs of a WF de-muxing processor 448a after a bank of equalizers 447a compensating for dynamic differentials on time delays, phases and amplitudes among propagations in various scattering regions 1501 and 1502 of a multi-path dominated channel 150 dynamically. Associated optimization loops for the two receivers are not shown. They shall be identical to the one shown in FIG. 9. Furthermore for the first and the second receivers, Rx A1 and Rx A2 respectively, the recovered signals of sa1' and sa2' are the output of the first and the second outputs of a WF demuxer 448a. However, there are two separated WF demuxers 448a belonging to two spatially separated receivers, but they are configured identically except assigned output ports.

The third receiver, Rx B, 441b shall have at least two receiving elements 444 b; each followed by a receiving radio 443b, before a receiving digital beam forming (DBF) network 449b with two output ports. The radios 443b will condition captured or received signals by associated elements. The DBF network 449b is connected to inputs of a WF de-muxing processor 448b after a bank of equalizers 447b which dynamically compensating for differentials in time delays, phases and amplitudes among various scattering regions st3 1503 and st4 1504 of propagations in a multi-path dominated channel 150. The two outputs of an associated WF demuxing device 448b are sent to a digital signal processor (DSP) 442b for further spatial de-mapping 4421b and de-segmenting 445b of the two recovered substreams sb1' and sb2' in reconstituting the recovered stream B, or sb.

Figure 16:
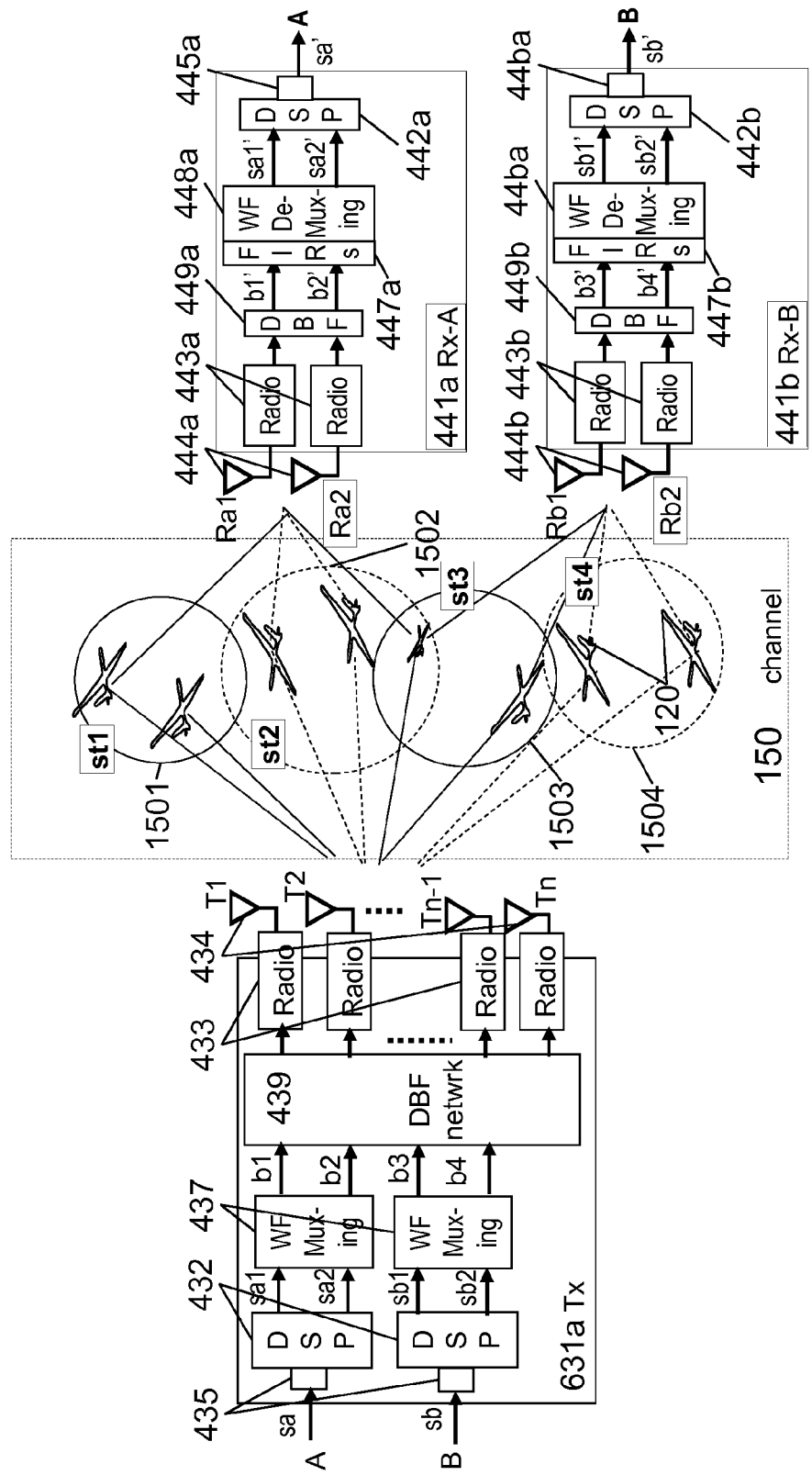
FIG. 16 illustrates a similar configuration as that in FIG. 15 for a multi-user MIMO communication with digital beam forming (DBF) networks and Wavefront muxing/demuxing for both transmitter or/and receivers in a multipath dominated propagation environment with preprocessing to form two groups of orthogonal beams, or beams with quiet-zones, in a common frequency slot dedicated for three independent users in accordance with some embodiments; There are 4 transmitting beams and 8 airborne transponding platforms; each transmitting beam covers multiple platforms.

FIG. 16 depicts another multi-user MIMO configuration with wavefront multiplexing/de-multiplexing (WF muxing/demuxing) for efficient dynamic resource allocations. It features minor modifications from FIG. 15 to support two users. To highlight key different features, we will not focus on implementation circuits of updating measured CSI in feedback networks and WF muxing/demuxing circuits with optimization loops in receivers for path calibrations and equalizations. Furthermore probing/diagnostic signal injection to the WF muxing/demuxing and Input/Output (I/O) port mapping have been discussed extensively in FIG. 14.

The transmitter (Tx) 631a features 2 input data streams, A (or sa) and B (or sb), as well as two WF muxing processors 437. The configuration enables data transporting from a transmitter to two users via an allocated spectrum used four times concurrently. The first user needs a near constant bandwidth for receiving a first signal stream, sa, in a first destination; and the second user in a second destination for receiving a second signal stream sb requires about the same bandwidth as that for the first user. Both need requirements on dynamic allocations of received signals strength. sb in transmissions but with a near constant bandwidth. As a result, an allocated spectrum will be used twice for transporting the sb; and another two folds for transporting sa concurrently.

A first signal stream for the first user, Rx A is designated as stream A, or sa, which is segmented to two substreams; sa1 and sa2, by a first DSP 432. The sa1 and sa2 substreams are WF muxed via a first WF muxing device 437, same as the one in FIG. 14, and two aggregated outputs of the WF muxing device 437 are sent to first two inputs of a multiple beam DBF network 439 with 4 inputs and n outputs. Concurrently, the sb for the second user Rx B is segmented into two substreams sb1 and sb2 by a second DSP 432. The two substreams sb1 and sb2 are then WF muxed by a second WF muxing device 437 before sent to the last two inputs of the 4-to-n DBF network 439. There are n corresponding transmitting elements 434 following n radios 433, each of which performs a frequency up conversion and RF power amplification functions.

As depicted, the 4 beams shall target 4 different regions; st1 1501, st2 1502, st3 1503, and st4 1504. Furthermore, feedback networks (not shown) updating CSI are used to optimize beam weight vectors (BWVs) dynamically for the four shaped transmit beams in some embodiments. The concepts of OB beams and quiet zones as shaping criteria may be implemented in the DBF networks as options in simplifying the configuration; such as replacing the spatial mapping functions in the DSP 432. Two of the 4 targeted scattering regions, st1 1501 and st2 1502, are for the first receiver Rx A 441a. The remaining two; st3 1503 and st4 1504, are for the second user Rx B 441b. The two receivers depicted as Rx A and Rx B respectively shall feature same hardware but software programmed to various configurations as indicated. They shall have at least two receiving elements 444a or 444 b; each followed by a receiving radio 443a or 443b before a mire-to-2 digital beam forming (DBF) network 449a or 449b, where $m_{re} \geq 2$. The two receivers may not have the same numbers of array elements.

A first $m_{re}$-to-2 DBF 449a features two output ports, connected to inputs of a WF de-muxing processor 448a following a bank of adaptive equalizers 447a compensating for differentials on time delays, phases and amplitudes among propagations in various scattering regions 1501 and 1502 of a multi-path dominated channel dynamically. Associated optimization loops for the two receivers are not shown. They shall be identical to the one shown in FIG. 14. Furthermore for the first receiver, Rx A, the recovered signal substreams of sa1' and sa2' are the output of the first and the second outputs of a WF demuxer 448a.

The second receiver, Rx B, 441b shall have at least two receiving elements 444 b; each followed by a receiving radio 443b, before a second receiving digital beam forming (DBF) network 449b with two output ports. The radios 443b will condition captured or received signals by associated elements. The second DBF network 449b is connected to inputs of a WF de-muxing processor 448b after a bank of equalizers 447b which dynamically compensating for differentials on time delays, phases and amplitudes among various scattering regions st3 4503 and st4 4504 of propagations in a multi-path dominated. The two outputs of an associated WF demuxing device 448b are sent to a digital signal processor (DSP) 442b for further spatial de-mapping 4421b and de-segmenting 445b of the two recovered substreams sb1' and sb2' in reconstituting the recovered stream B, or sb.

Embodiment 5

Figure 17:
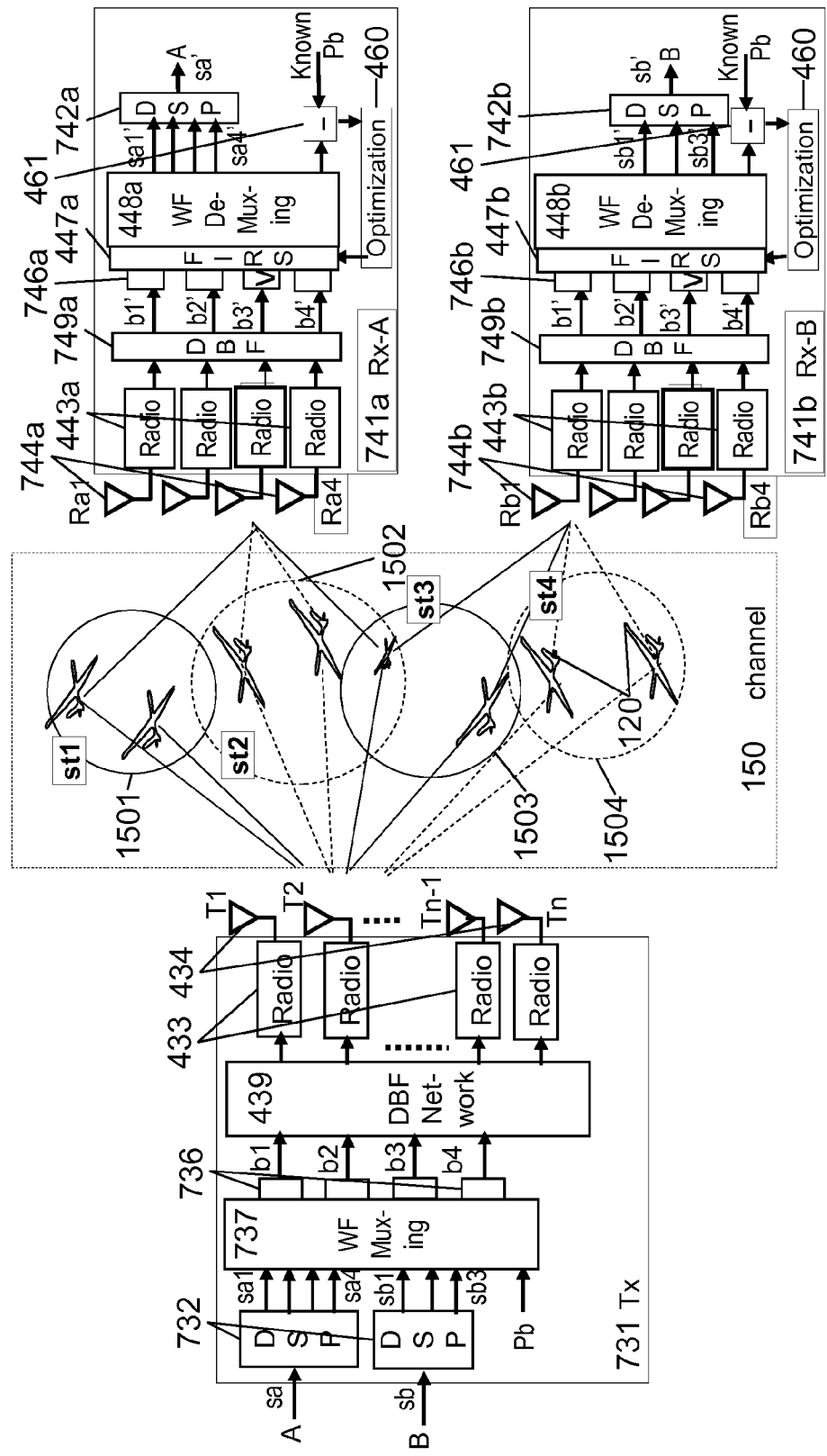
FIG. 17 illustrates an alternate multi-user MIMO communication configuration with digital beam forming (DBF) networks and Wavefront muxing/demuxing for both transmitter or/and receivers in a propagation environment dominated by multiple airborne transponding platforms. The transmitting site features preprocessing to form two groups of orthogonal beams, or beams with quiet-zones, in a common frequency slot dedicated for two independent users in accordance with some embodiments; There are 4 transmitting beams and 8 airborne transponding platforms; each transmitting beam covers multiple transponding platforms.

FIG. 17 depicts another multi-user MIMO configuration with wavefront multiplexing/de-multiplexing (WF muxing/demuxing) for efficient dynamic resource allocations. To highlight the different features, we do not show circuits for updating measured CSI in feedback networks. The transmitter 731 features 2 input data streams, A stream (sa) and B stream (sb), as well as one 8-to-8 WF muxing processors 737. The configuration enables data transporting from a transmitter to two users via an allocated spectrum used four times concurrently. Both users need dynamic allocations to accommodate their bandwidth and radiated power or EIRP requirements. The dynamic allocations are under constraints of constant resources on total bandwidth and on total radiated power. As a result, an allocated spectrum will be used four times for transporting both the sa and sb concurrently. The depicted configuration is similar to that in FIG. 14; except that there are more than one scattering UAVs 120 in each of 4 scattering regions; st1 4501, st2 4502, st3 4503, and st4 4504. As a result, programming of space-time coding is implemented in both a transmitting source and receiving destinations to dynamic "accommodate" equalizing mechanisms for phase and time delay differentials among multiple active scattering platforms over each of the 4 scattering regions; st1 1501 to st4 1504. At the transmitting source 731, DSPs 732 and a 4-to-n DBF network 439 may be used for space-time coding. Similarly the mr-to-4 DBF 749 and DSPs 742 in a destination may also be used to accommodate space-time coding, as in a convention p-to-p MIMO.

As depicted, signals for the two users, Rx A and Rx B, designated as sa and sb are dynamically segmented into total 7 segments via two DSP 732; 4 for sa and 3 for sb at one instance. They distribution may become 6 for sa and 1 for sb at a second instance, or 0 for sa and 7 for sb at a third instance; and so on. The 7 substreams are sent to 7 of the 8 inputs of the 8-to-8 WF muxing processor 737. The remaining inputs may be used for probing or diagnostic signals, denoted as Pb. As depicted, the first 4 input ports are for stream A (sa), the second 3 input ports for stream B (sb), and the last input port for Pb. The 8 outputs are grouped into 4 groups via a bank of 4 multiplexers 736; each group is connected to an input of a 4-beam DBF 439 which features n outputs; followed by a bank of radios 433 for signals frequency up-conversion and power amplification before individually radiated by n transmitting elements 434. There shall be 4 shaped beams generated concurrently by the 4-to-n DBF 439; each may be dynamically and individually optimized via updating an associated Beam-Weight-Vector (BWV) in some embodiments based on updated CSI by feedback networks (not shown). In other embodiments the associated BWV are periodically or occasionally updated when multipath dominated communications channels are nearly stationary. It is clear that there are other arrangements for the input signals via the same WF muxing transform. In facts there exists 8! or 40,320 different input arrangements for any 8-to-8 WF muxing transformation such as the one 737 shown in here. The high number of possible input arrangements may be taken advantages of as part of transmission privacy.

Signals from any one of the 8 output ports of the WF muxing transform 737 are results of a unique linear combination of all 8 input signals connected to the 8 input ports. The linear combination is a weighted sum of all 8 input signals which are completely independent. Furthermore, signals connected to any one of the 8 input ports will appear in every one of the 8 outputs, as parts of aggregated signals. Consequently, each of the 8 inputs of the WF muxing processor 736 is associated to a distribution of 8 weighting parameters among the 8 aggregated signals (or 8 linear combinations). The distribution of 8 weighting parameters is also referred as a wavefront vector (WFV) with a dimension of 8; or simply as a wavefront (WF). There shall be 8 WF vectors associated with the WF muxing transform 737. These WF vectors will be mutually orthogonal only when the 8-to-8 WF muxing transform 737 is implemented by an orthogonal matrix such as an 8-to-8 FFT, an 8-to-8 Hadamard matrix, a 2×4-to-2×4 Hadamard Matrix, Cascaded FFT and Hadamard matrixes; and etc.

As depicted, the 4 beams shall target 4 different regions; st1 1501, st2 1502, st3 1503, and st4 1504. Furthermore, feedback networks (not shown) updating CSI will be used to optimize BWVs for the four shaped transmit beams. The concepts of OB beams and quiet zones as shaping criteria may be implemented in the 4-to-n DBF networks 439. All 4 targeted scattering regions, st1 1501, st2 1502, st3 1503 and st4 1504, are for both users with receivers Rx A 741a and Rx B 741b, respectively; which shall feature same hardware but software programmed to various functional configurations as indicated.

The receiving array for a first user shall have at least four receiving elements 744a; followed by receiving radios 443a before a 4 beam digital beam forming (DBF) network 749a. The 4 beam DBF 749a features four output ports, connected to inputs of a 8-to-8 WF de-muxing processor 448a after a bank of demultiplexers 746a and adaptive equalizers 447a which dynamically compensating for differentials on time delays, phases and amplitudes among propagations in various scattering regions 1501 to 1504 of a multi-path dominated channel 150. The first 4 of the 8 outputs from the WF demuxing processor 448a are allocated for the first signal stream sa for the first receiver, Rx A 741a. One output of the WF demuxer 448a is assigned to recovered probing signals Pb' which will be compared to a known probing signal Pb. The differences 461 are indexed as cost functions for an optimization processor 460 to calculate weighting parameters for the bank of equalizers 447a. The detailed processing shall be identical to the one shown in FIG. 14. Before reaching an optimized state of the equalizers, the assigned 4 outputs of the WF demuxer 448a shall feature significant cross-coupling of Pb to the 4 output ports for recovering substreams sa1', sa2', sa3', and sa4'. There shall be major difference between recovered signals from the recovered Pb port and the known a priori Pb signals. Various positively defined cost functions are formed base on these measurements. Current total cost is a sum of all cost functions from updated measurements. Optimization 460 is carried out to find updated coefficients or parameters for the adaptive equalizers via a cost minimization algorithm based on measured current total cost and derived gradients on total cost.

At an optimized state of the equalizers 447a, the assigned first 4 outputs of the WF demuxer 448a will recover the 4 substreams sa1', sa2', sa3', and sa4'. The de-segmenting unit 742a will perform spatial de-mapping further before combining all 4 substreams; sa1' sa2', sa3', and sa4', into a reconstituted stream A or sa'.

Furthermore a second receiver, Rx B 741b features identical functions as those in the first receiver, Rx A 741a. It shall have at least four receiving elements 744 *b*; each followed by a receiving radio 443*b*, before a receiving digital beam forming (DBF) network 449*b* with two output ports. The WF demuxers 448*b* is configured identically to the one 448*a* except assigned output ports. The three outputs of an associated WF demuxing device 448*b* are sent to a digital signal processor (DSP) 742*b* for further spatial de-mapping and de-segmenting of the three recovered sub-streams sb1' sb2' and sb3' in reconstituting the recovered stream B, or sb.

In other embodiments, the WF muxing device 737 may be implemented, instead of a 8-to-8 WF muxer, by a 1024-to-1024 Hadamard transform with 1024 input ports and 1024 output ports. The 1024 output ports are grouped by 4 sets of 256-to-1 TDM multiplexers into 4 streams before the 4-to-n DBF 439. The 1024 input ports are shared by the two user streams (sa and sb) in forms of multiple segmented sub-streams in parallel via two DSP 732 and a set of probing or diagnostic signals. To dynamically allocating available bandwidth, the input port distribution for the WF muxing device 737 among two signal streams, sa and sb, and probing streams in forms of [sa, sb, pb] may be dynamically altered among distributions of [1023, 0, 1], [512, 510, 2], [128, 890, 6], [20, 1000, 4], [0, 1023, 1], and others.

Embodiment 6

Figure 18:
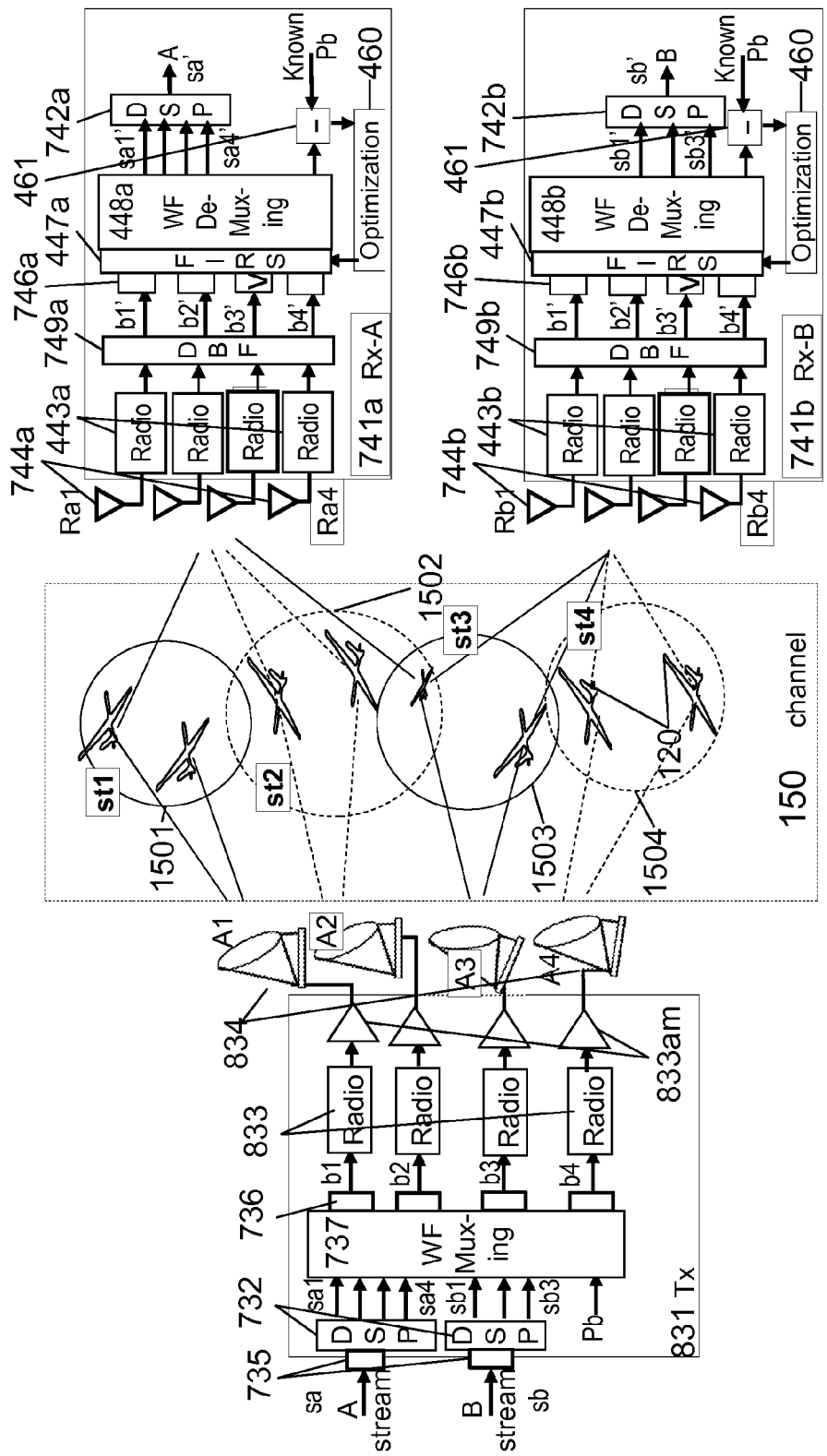
FIG. 18 illustrates a multiuser MIMO communication configuration with multibeam antenna (MBA) elements and Wavefront muxing/demuxing for transmitter in a multipath dominated propagation environment with preprocessing to form two groups of orthogonal beams, or beams with quiet-zones, in a common frequency slot dedicated for two independent users in accordance with some embodiments; There are 4 transmitting beams and 8 airborne transponding platforms; each transmitting beam covers multiple platforms.

FIG. 18 depicts another multi-user MIMO configuration with wavefront multiplexing/de-multiplexing (WF muxing/demuxing) for efficient dynamic resource allocations. To highlight the key architecture features, we do not show circuits for updating measured CSI in feedback networks. The transmitter 831 features 2 input data streams, A stream (sa) and B stream (sb), as well as one 8-to-8 WF muxing processors 737. The configuration enables data transporting from a transmitter to two users via an allocated spectrum used four times concurrently. The four beams are generated by 4 high gain antennas 834 pointing to various portions of the propagation. Both users need dynamic allocations to accommodate their bandwidth and radiated power or EIRP requirements. The dynamic allocations are under constraints of constant resources on total bandwidth and on total radiated power. As a result, an allocated spectrum will be used four times efficiently for transporting both the sa and sb concurrently.

In comparing to the configuration in FIG. 17, the propagation and the receivers 741*a* and 741*b* in FIG. 18 are identical to those in FIG. 17. We will not repeat descriptions on these items again in here. We shall focus on the differences in the transmitter 831 in FIG. 18 and the one 731 in FIG. 17. The mechanisms of forming 4 shaped beams, amplifying signals and radiating power-amplified signals in FIG. 17 comprise of a 4-to-n DBF 439 followed by n radios 433, and n antenna elements 434, each antenna element shall feature a low gain and broad beam radiation pattern. On the other hand, there are no beam forming mechanisms except geometries of the 4 high gain radiators 834; A1, A2, A3, and A4. We have also separately added a power-amplifier stage 833 Am in each of the 4-radios 833.

As depicted on the transmitter 831 in FIG. 18, signals for the two users, Rx A and Rx B, designated as sa and sb are dynamically segmented into total 7 segments via two DSP 732; 4 for sa and 3 for sb at one instance. They distribution may become 6 for sa and 1 for sb at a second instance, or 0 for sa and 7 for sb at a third instance; and so on. The 7 substreams are sent to 7 of the 8 inputs of the 8-to-8 WF muxing processor 737. The remaining input may be used for probing or diagnostic signals, denoted as Pb. As depicted, the first 4 input ports are for stream A (sa), the second 3 input ports for stream B (sb), and the last input port for Pb. The 8 outputs are grouped into 4 groups via a bank of multiplexers 736; each group is connected to an input of a high gain radiator 834 after frequency up-converted by a radio 833 and amplified by a power amplifier 833 Am. Beam shaping are implemented in the 4 high gain radiators 834 such as reflectors through techniques of digital or analogue beam forming networks or customized reflector mechanical surface contours.

Embodiment 7

Figure 19:
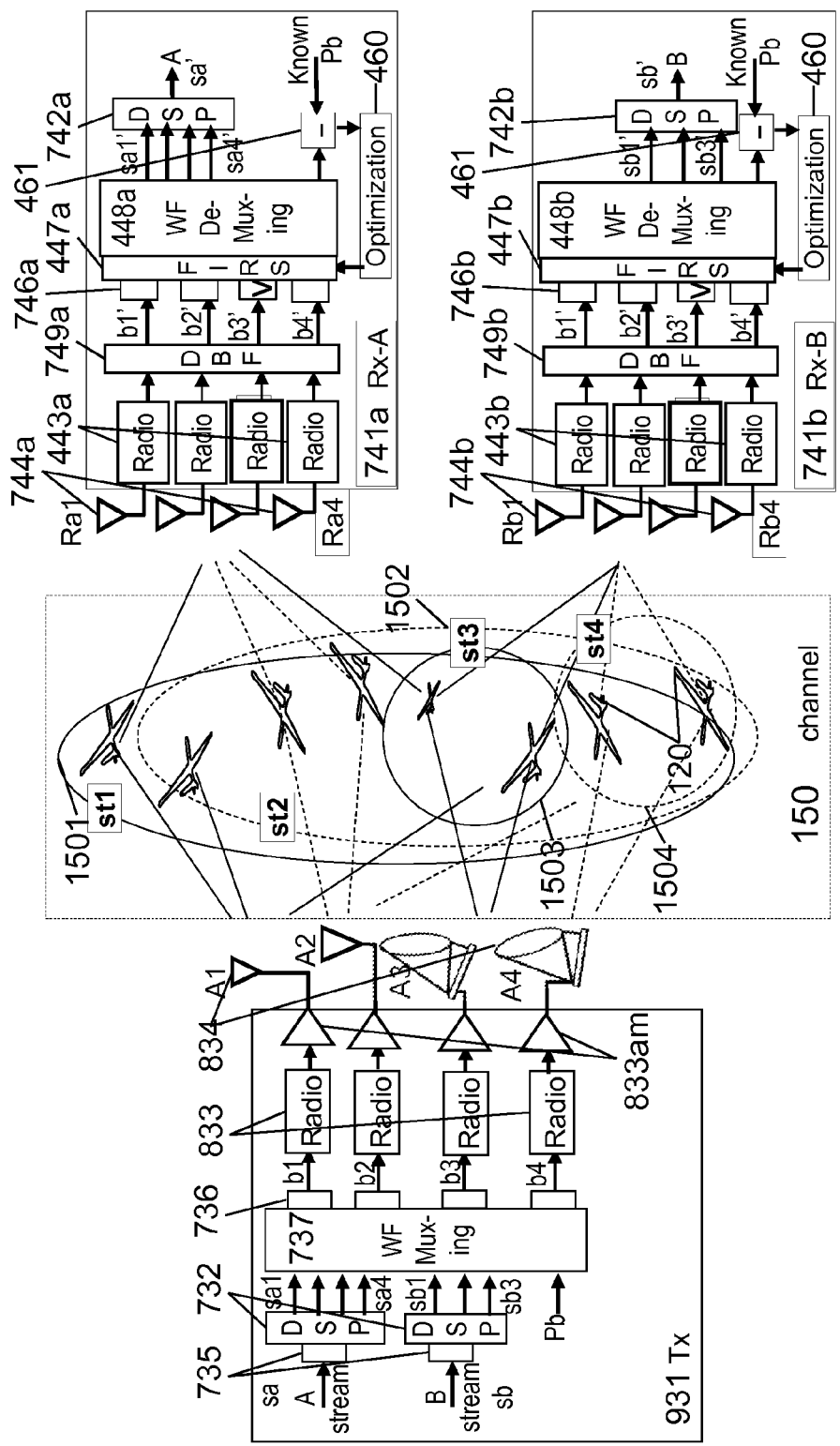
FIG. 19 illustrates a multiuser MIMO communication configuration with combinations of direct radiating elements and multibeam antenna (MBA) elements and Wavefront muxing/demuxing for transmitter in a propagation environment dominated by multiple airborne transponding platforms. The transmitting site features with preprocessing to form two groups of orthogonal beams, or beams with quiet-zones, in a common frequency slot dedicated for two independent users in accordance with some embodiments; There are 4 transmitting beams and 8 airborne transponding platforms; two of the transmitting beams are low gain with wide angular coverage to reach all 8 platforms and the other two featuring high gain with narrow angular coverage for connecting subsets of the 8 platforms. The 4-element antennas in various receivers shall feature at least 4 independent beams. The WF muxing/demuxing scheme enable dynamic resource allocations among the two users, both in radiated power and in channel bandwidth. These communications resources are aggregated from all 8 transponding platforms.

FIG. 19 depict another multi-user MIMO (MU-MIMO) configuration with wavefront multiplexing/de-multiplexing (WF muxing/demuxing) for efficient dynamic resource allocations. To highlight the key architecture features, we do not show circuits for updating measured CSI in feedback networks. The transmitter 931 features 2 input data streams, A stream (sa) and B stream (sb), as well as one 8-to-8 WF muxing processors 737. The configuration enables data transporting from a transmitter to two users via an allocated spectrum used four times concurrently. The four beams are generated by 4 antennas 834 pointing to various portions of the propagation. The first two elements, A1 and A2, feature radiation patterns of low gain and wide angular coverage; and the remaining two, A3 and A4, are high gain, spot of shaped beam antennas. Both users need dynamic allocations to accommodate their bandwidth and radiated power or EIRP requirements. The dynamic allocations are under constraints of constant resources on total bandwidth and on total radiated power. As a result, an allocated spectrum will be used four times efficiently for transporting both the sa and sb concurrently.

In comparing to the configurations in FIG. 17 and FIG. 18, the propagation channel 150 and the receivers 741*a* and 741*b* in FIG. 19 are identical to those in FIG. 17 and those in FIG. 18. We will not repeat descriptions on these items again in here. We shall focus on the transmitter 931 in FIG. 19. The mechanisms of forming 4 shaped beams, amplifying signals and radiating power-amplified signals in FIG. 17 comprise of a 4-to-n DBF 439 followed by n radios 433, and n antenna elements 434. Each antenna shall feature a low gain and broad beam radiation pattern. On the other hand, there are no beam forming mechanisms except geometries of the 4 radiators 834; 2 elements A1, and A2 featuring low gain broad beams and the other 2 antennas A3, and A4 featuring high gain shaped beams. We have also separately added a power-amplifier stage 833*am* following each radios 833.

Radiations from A1 and A2 cover a field-of-view (FOV) of st1 1501 and a FOV of st2 1502, respectively, flooding large access portions of the communications channel 150. On the other hand, radiations from A3 and A4 cover FOVs of st3 1503 and a FOV of st4 1504, respectively, focusing on limited access portions of the same communications channel 150.

As depicted on the transmitter 931 in FIG. 19, signals for the two users, Rx A and Rx B, designated as "A stream" or sa and "B stream" or sb are dynamically segmented into total 7 substreams (or segments) via two DSP 732; 4 for sa and 3 for sb at one instance. They distribution may become 6 for sa and 1 for sb at a second instance, or 0 for sa and 7 for sb at a third instance; and so on. The 7 substreams are sent to 7 of the 8 inputs of a 8-to-8 WF muxing processor 737. The remaining input may be used for probing or diagnostic signals, denoted as Pb. As depicted, the first 4 input ports are for stream A (sa), the second 3 input ports for stream B (sb), and the last input port for Pb.

The 8 outputs are grouped into 4 groups via a bank of multiplexers 736; each group is connected to an input of an antennas 834 after frequency up-converted by a radio 833 and amplified by a power amplifier 833 Am. Beam shaping are implemented only in the 2 high gain radiators 834 A3 and A4 such as reflectors through techniques of beam forming networks or customized reflector mechanical surface contours. There is no beam-forming for A1 and A2 antenna elements. The multiplexers 736 in transmitter 931 and the corresponding de-multiplexers 746 in receivers 741*a* and 741*b* shall be conventional pairs for muxing/demuxing in a domain space of frequency (FDM), time (TDM), or code (CDM).

Embodiment 8

Figure 20:
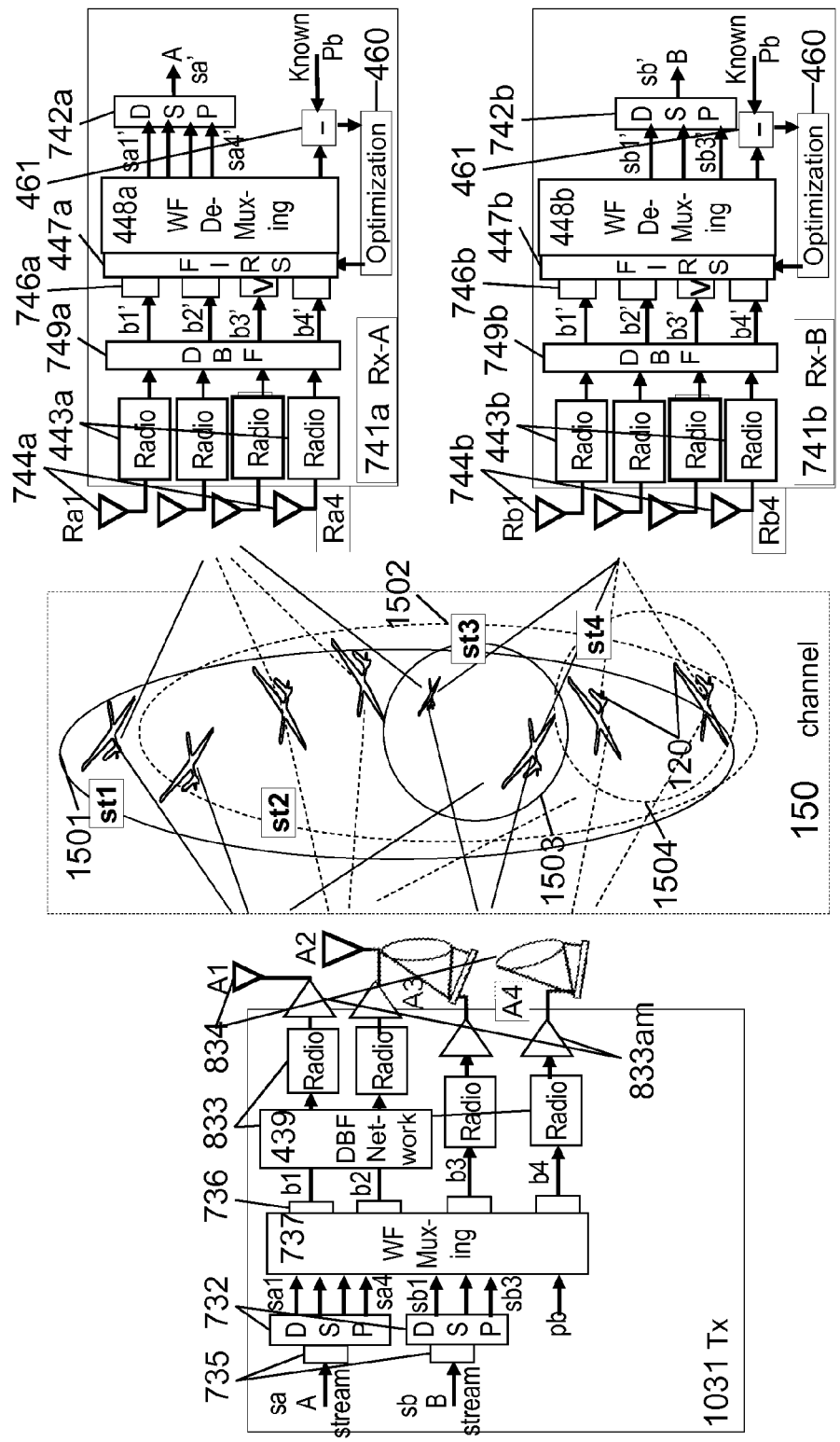
FIG. 20 illustrates a multiuser MIMO communication configuration with combinations of direct radiating elements and multibeam antenna (MBA) elements and Wavefront muxing/demuxing for transmitter in a propagation environment dominated by 8 airborne transponding platforms. The transmitting site features preprocessing to form multiple beams, or beams with quiet-zones, in a common frequency slot dedicated for two independent users in accordance with some embodiments; The DBF is programmed to form two shaped beams from two transmitting elements featuring low gain with wide angular coverage to reach all 8 platforms. The other two high gain beams with narrow angular coverage are oriented to connect subsets of the 8 platforms. The 4-element antennas in various receivers shall feature at least 4 independent beams. The WF muxing/demuxing scheme enable dynamic resource allocations among the two users, both in radiated power and in channel bandwidth. These communications resources are aggregated from all 8 transponding platforms.

FIG. 20 depict another multi-user MIMO configuration with wavefront multiplexing/de-multiplexing (WF muxing/demuxing) for efficient dynamic resource allocations. To highlight the key architecture features, we do not show circuits for updating measured CSI in feedback networks. The transmitter 931 features 2 input data streams, A stream (sa) and B stream (sb), which go through a common 8-to-8 WF muxing processors 737. The configuration enables data transporting from a transmitter to two users via an allocated spectrum re-used four times concurrently. The four beams are generated by antennas 834 pointing to various portions of the propagation. Both users need dynamic allocations to accommodate their bandwidth and radiated power or EIRP requirements. The dynamic allocations are under constraints of constant resources on total bandwidth and on total radiated power. As a result, an allocated spectrum will be used four times efficiently for transporting both the sa and sb concurrently.

In comparing to the configurations in FIG. 19, the propagation channel 150 and the receivers 741*a* and 741*b* in FIG. 20 are identical to those in the two figures We will not repeat descriptions on these items again in here. We shall focus on the transmitter 1031 in FIG. 20.

There are two different sets of beam forming mechanisms including geometries of the 4 radiators 834. The 2 elements, A1 and A2, featuring low gain broad beams are organized by a 2-to-2 transmitting DBF network 439 in forming two independent beams. Depending on the spacing between the elements and associated beam weight vectors, there will be two shaped beams generated. The transmitting patterns from the other 2 antenna elements; A3 and A4 shall feature high gain shaped beams. We have also separately added a power-amplifier stage 833*am* following each of the 4-radios 833. Beam shaping for the 2 high gain radiators 834 A3 and A4 may be through techniques of beam forming networks among a feed array near focal regions of a reflector or those with a feed illuminating a reflector with customized mechanical surface contours.

In other different embodiments, the 4 elements 834 in FIG. 20 may features 4 different element patterns; and 4 shaped beams are results of various configurable linear combinations of the 4 element beams by a multibeam beam forming network or equivalents; implemented by analogue and/or digital devices/circuits.

Embodiment 9

Figure 21:
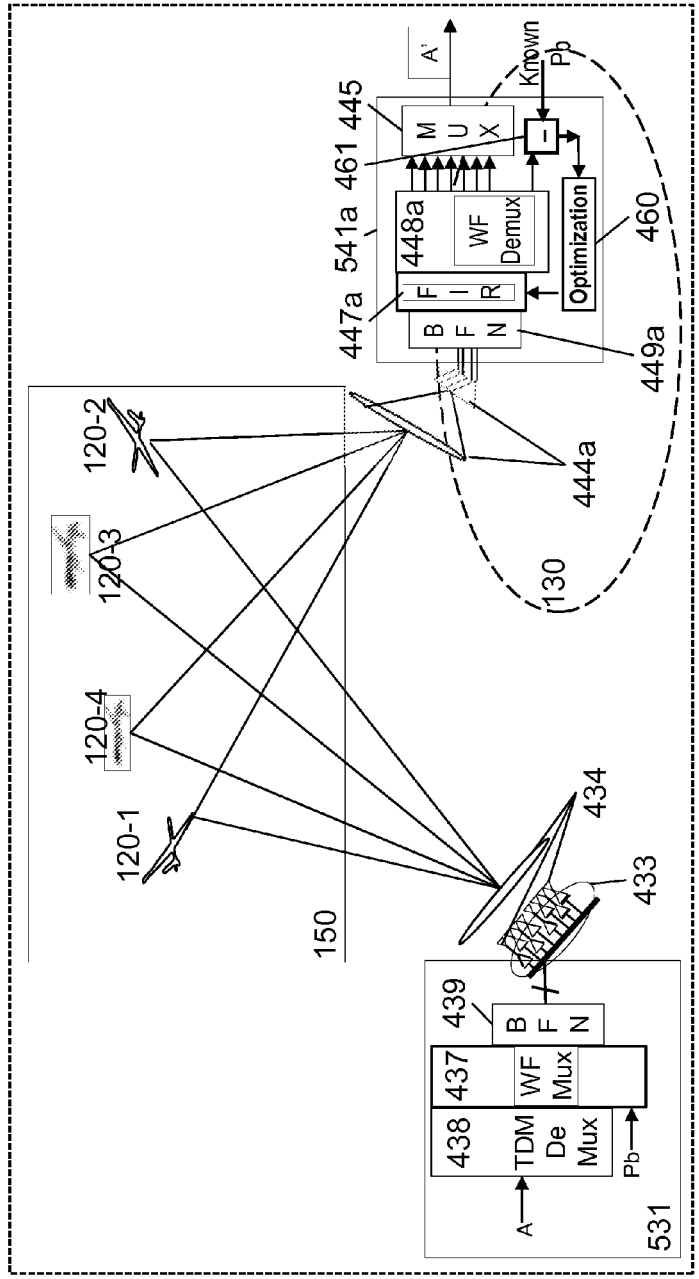
FIG. 21 depicts a point-to-point (p-to-p) high bandwidth MIMO communications configuration with WF muxing via 4 transponding airborne platforms which may be transponding UAVs.

FIG. 21 features a point-to-point (p-to-p) MIMO configuration exhibits four time (or 4×) reuse of an assigned spectrum, and can be extended to a point-to-multipoint (p-to-mp) version as the one in FIG. 14. Wavefront (WF) multiplexing/demultiplexing (muxing/demuxing) is incorporated to coherent power combining for the scattered radiations from the UAVs 120; a first UAV 120-1 to a fourth UAV 120-4. The transmitter and the receiver are modified accordingly from those in FIG. 14. The communications is identical to that in FIG. 14. Multi-paths are due to scatterings of four UAVs 120.

From the ground facility 531, there are 4 separated transmitting beams, [b1, b2, b3, b4], by the transmitter 531 tracking and communicating with all four UAVs 120 individually, while they 120 roving over a foreground service area 130. There are feedback networks (not shown) for dynamic updating the channel state information (CSI).

Referred back to the transmitter 531, a signal stream A, say at $7 \times 10^9$ samples per second or 7 Gsps as a numerical example, are segmented into a set of 7 segmented input substreams; sa1 to sa7, which are converted by programmable TDM demuxers 438 and then processed in parallel along with additional probing/diagnostic substreams (not shown) concurrently by a 8-to-8 WF muxing transformation 437. The signal stream A after converted to substreams occupy, respectively, 7 parallel inputs at a 1 Giga-samples per second (1 Gsps) rate each, while probing and diagnostic codes are assigned to the last input port of the 8-to-8 WF muxing transform 439 also clocked at 1 Giga-samples per second. With 8 parallel channels, the WF muxer 437 operates at a data rate of 8 Gsps. The 8 outputs, each at 1 Gsps, are grouped via 4 conventional multiplexers 435, e.g. 4 sets of 2-to-1TDM muxers, followed by a 4-to-n digital-beam-forming (DBF) network which is connected to a defocused RF lens with n feed array elements 434 through a bank of n radios with power amplifiers 433. The 4 grouped outputs from the WF muxing transform 437 are 4 sets of WF muxed signals flowing in a 2 Gsps rate, and designated as Mu1, Mu2, Mu3, and Mu4. Mu1 is sent to the first beam port, b1, for the 4-to-n DBF network (shown in FIG. 14 only), aiming to a first UAV 120-1 dynamically and forming nulls toward the other three UAVs 120-2, 120-3, and 120-4. The first beam is dynamic controlled via a first beam weight vector (BWV), a set of n components using complex numbers to dictate the signal amplitude and phase setting through the n transmitting elements of the feed array 434. The shaped radiation pattern and associated wavefront are dynamically optimized.

Similarly the remaining three beams are dynamic controlled via 3 separated beam weight vectors (BWVs), aiming to the corresponding ones of the four UAVs 120 and concurrently forming nulls toward the other three of the UAVs. These four transmitting beams are a set of OB beams with following features;

A peak of a selected beam is always at nulls of other OB beams.

Peaks of other OB beams are always at nulls of the selected beam

As to the depicted receiver 541*a* in a first destination, Rx A, a receiving antenna comprising of a reflector with a feed array 444*a* and a receiving beam forming network (BFN) 449*a*, will only capture radiated signal WF muxed substream "Mu1" delivered by beam b1 via the first UAV 120-1, while WF muxed substream "Mu2" delivered by beam b2 via the second UAV 120-2. So are the other two WF muxed substreams "Mu3" and "Mux4" delivered by beam b3 and b4 via the third and the fourth UAVs 120-3 and 120-4, respectively. The four tracking beams at the destination will be dynamically formed by a 4 beam receiving BFN 449*a*.

The received signals will be amplifier and down converted by a bank of receiving radios (not shown), followed by a bank of adaptive equalizers 447a before a coherent power combining process in a WF demuxer 448a.

Equalizers are iteratively optimized via a optimization process 460 to dynamically compensate for phase differentials through different scattering paths by 4 separated UAVs 120. The equalization processing and associated parameters are identical to the ones in FIG. 10. We shall not repeat them again in here.

When the equalizers 447a are fully optimized, the propagation paths through the 4 UAVs 120 are fully equalized at the interface between the adaptive equalizers 447a and the WF demuxer 448a. There are no leakages among the substreams at the output ports of the WF demuxer 448. For instance the recovered probing signal substreams is the output from the $8^{th}$ port of the WF demuxer; which delivers, sample-by-sample, a linear combined result from the samples from all 8 inputs weighted by a corresponding WF vector for the probing signal. When the 8 inputs are fully compensated; the linear combination operation shall produce results with two unique features;

- Components of the desired signal distributed in the 8 inputs after weighted by the corresponding WF vector shall be line-up in phase,
- Components of any one of the 7 undesired inputs distributed in the 8 weighted inputs shall be destructively interfered to cancel one another.

At fully equalized states, the 8 outputs from the WF demuxing transform 448a comprise two groups of signals. The first group from port 1 to port 7 features recovered signal substreams sa1' to sa7', which are followed by a 7-to-1 TDM multiplexer converting the 7 parallel substreams, each at 1 Gsps as in the numerical example, into a reconstituted signal stream A at 7 Gbps. The second output group from the $8^{th}$ port is used by probing and diagnostic signal at a rate of 1 Gsps. The probing signals occupy 12.5% of total available bandwidth.

Figure 22:
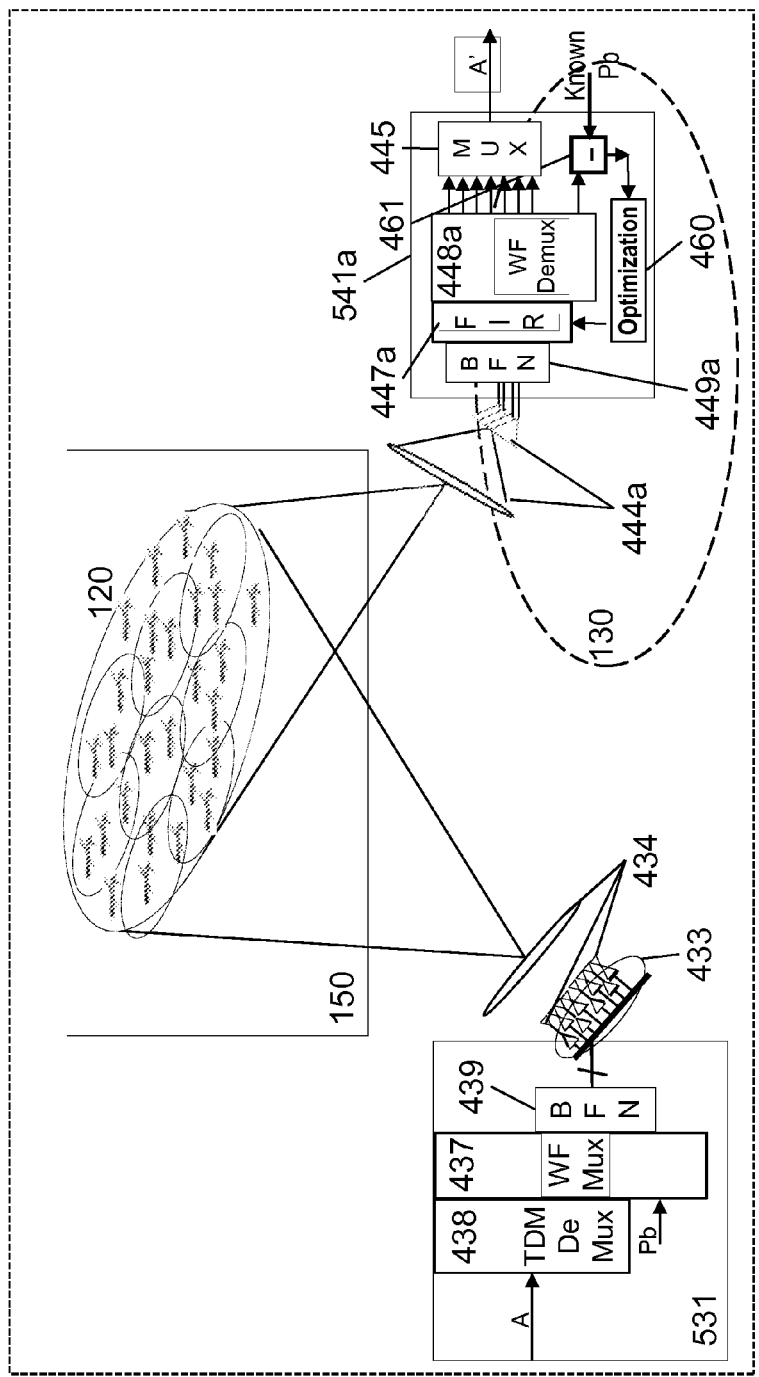
FIG. 22 depicts a similar p-to-p MIMO configuration as that of FIG. 21 with greater channel capacity. It is scaled via more transponding UAVs for a broadband wireless communications pipe with a higher channel capacity; say >100 GB per second.

FIG. 22 depicts a similar p-to-p configuration as that in FIG. 21, except the 4 UAVs 120-1 to 120-4 are replaced by a swarm of small or micro UAVs 120, each radiated normally less than 5 watt RF power. These UAVs are slow moving platforms staying over an airspace with a volume of ~km in diameters indicated by a large circle with 8 smaller circles. The UAV distributed volume is indicated by the large circle graphically dimension-wise. The spacing among the UAVs are smaller than angular resolutions of both multi-element antennas 434 of a ground transmitter 531 and a receiver 444a. Resolutions of the transmitting antenna 434 are indicated by the smaller circles. A first radiation signal stream originated from a first feed element of the transmitting antenna 434, which is a multibeam lens, will illuminate over a finite bandwidth on a group of micro UAVs in a first one of the 8 smaller circles. The first small circle shall feature N1u small UAVs, each shall have at least one transponder with one receiving and one transmitting elements, where N1u≥1. The collectively scattered first signal stream from the N1u small UAVs will be re-radiated toward a foreground coverage area 130 and shall be captured by multiple antenna elements of a desired receiver 541a. V The number of small UAVs within a small circle may gracefully be alerted, as the UAVs hovering in/out of their assigned airspace. Similarly a second signal stream from a second antenna element of the transmitter 531 shall be actively scattered by N2u UAVs in a second smaller circle toward the desired receiver 541a, where N2u≥1. There are 8 independent signal streams initiated from the multibeam antenna 434 of the transmitter 531, scattered by the swarm of UAVs 120, and arriving at the multiple elements of the receiving antenna 444a of the receiver 541a over the same bandwidth. With proper post processing in the receiver 541a, channel capacity of the multipath communications channel 150 between the transmitter 531 and the receiver 541a remotely located has been multiplied by 8 times via active scattering of the small UAVs 120.

Figure 23:
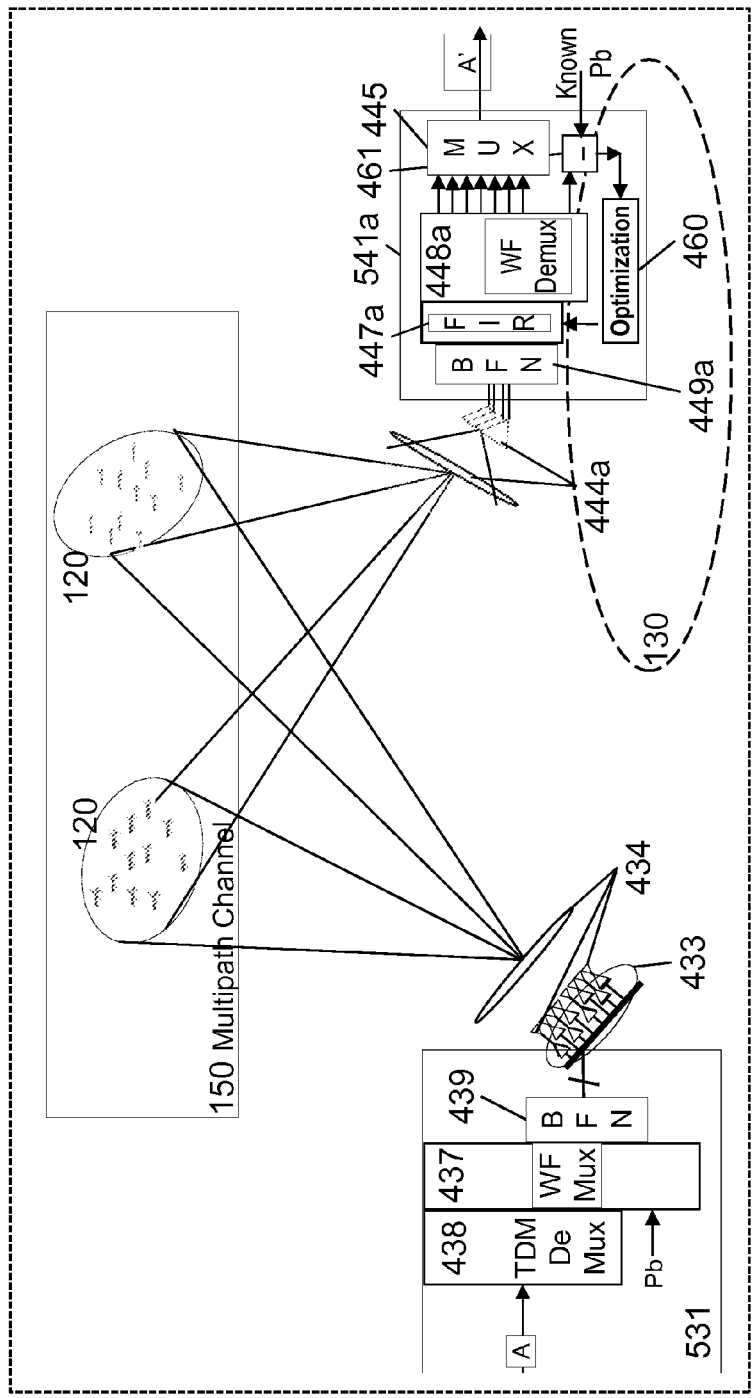
FIG. 23 depicts another p-to-p MIMO configuration with WF muxing similar to that of FIG. 21 with greater channel capacity. It can be scaled for a broadband wireless communications pipe with a higher channel capacity.
Figure 24:
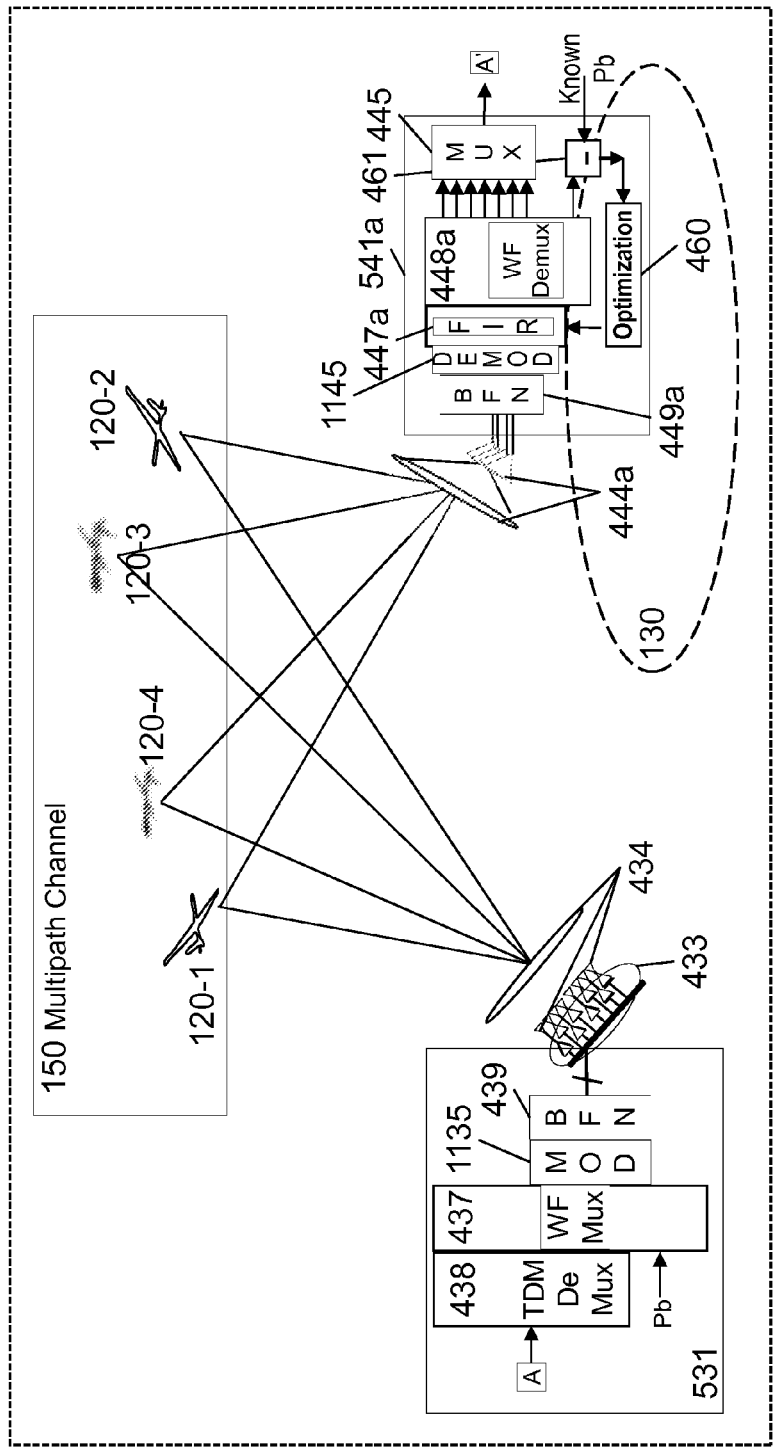
FIG. 24 depicts a point-to-point (p-to-p) high bandwidth communications configuration with multiple channels with channel binding via a non-coherent WF muxing via 4 transponding airborne platforms/UAVs. WF muxing transforms are performed on data to be transmitted in a before multi-channel modulations. Similarly, WF demuxing are implemented on received data sets after demodulated on signals received from multiple channels. This channel blinding configuration via WF muxing provides better data transport privacy and enhanced reliability via redundancy; but not higher signal-to-noise ratio (SNR).

The multiple-time channel capacity between the transmitter 531 and the receiver 541 via swarm of UAVs are implementable even the transmit antenna 444a becomes a multi-element array (not shown) in other embodiments. It is also possible to extend active scattering applications of swarm of UAVs 120 for point-to multipoint (p-to-mp) communications with multiple times of frequency reuse. With 10 radiating elements (not shown) in a transmitter antenna 434, it is possible to allocate 7× bandwidth for a channel capacity from the transmitter 531 connecting to a first receiver 541a, and concurrently 3× bandwidth from the same transmitter 531 connecting to a second receiver (not shown) in the coverage 130, under the following assumptions;

i. There are no less than 10 mini UAV's in the swarm, and each UAVs featuring a single transponder with one receiving and one transmitting antenna element.
 ii. The transmitter features no less than 10 radiating elements
 iii. The first receiver has no less than 7 elements, while the second one with no less than 3 elements FIG. 23 depicts similar configuration as that in FIG. 22, except the swarm of small or micro UAVs 120, each radiated normally less than 5 watt RF power is spatially separated into multiple groups FIG. 24 depicts similar configuration of that in FIG. 21, except the WF muxing are applied in transmitters to streams of data before they are modulated by a modulator 1135 to become signal streams, and WF demuxing in receivers are applied recovered signal streams after they are demodulated to become recovered data streams by a demodulator 1145. A transmitter 531 is programmed to enable an un-modulated input data stream, A, segmented into multiple parallel substreams by a TDM demuxer 438, or an equivalent, followed by a M-to-M WF muxing transform 437. The outputs of the TDM demuxer 438 only occupy, say, 75% of the M input ports. For cases with M=16, 12 inputs are for connections to the TDM demuxers. The remaining 4 are for connections to known signals for diagnostic or redundancies. The M WF muxed data streams from the M outputs are grouped into 4 streams via 4 multiplexing devices before sent to a bank of modulators 1135 followed by a 4 beam beam-forming-networks (BFN) 439, transmitting radios 433 and then a multiple beam antenna 434.

As a result, modulations are on 4 grouped WF muxed data streams. The 4 modulated signal streams after the modulators 1135 are frequency up-converted and amplified before radiated toward 4 separated UAVs 120. Each UAV 120-1, 120-2, 120-3, or 120-4 carries a modulated signals stream from one of the four grouped WF muxed data substreams.

In order to recover desired data streams Ai' at a first destination, the receiver 541a shall be accessible to, at least, any three of the four UAVs 120. A receive 541a is programmed from the configuration in FIG. 21 to an alternate configuration with a bank of demodulators 1145 following a receiving beam-forming network (BFN) 449a for 4 tracking beams and before a bank of adaptive equalizers 447a and a WF demuxing transform 448a. The demodulators shall convert received signals (waveforms) into data substreams.

The optimization process 460 is to align the timing among the data substreams normally via adaptive equalizers 447a.

The depicted approach is for "non-coherent" WF muxing/de-muxing applications to enhance reliability and security of data transport through the active scattering communications, while those configurations in FIGS. 21, 22, 23 are for "coherent" WF muxing/de-muxing applications, to enable (1) coherent power combining and/or (2) efficient dynamic combined resource allocations through the multipath dominated communications with multiple scattering UAVs 120.

It is possible in MIMO communications architecture with multiple active scattering UAVs 120 to switch between the depicted configuration in FIG. 21 and that in FIG. 24 through software reprogramming on both transmitting equipment at sources and receiving user equipment at destinations. It is also possible to allow both configurations through the same set of UAVs 120.

Figure 25:
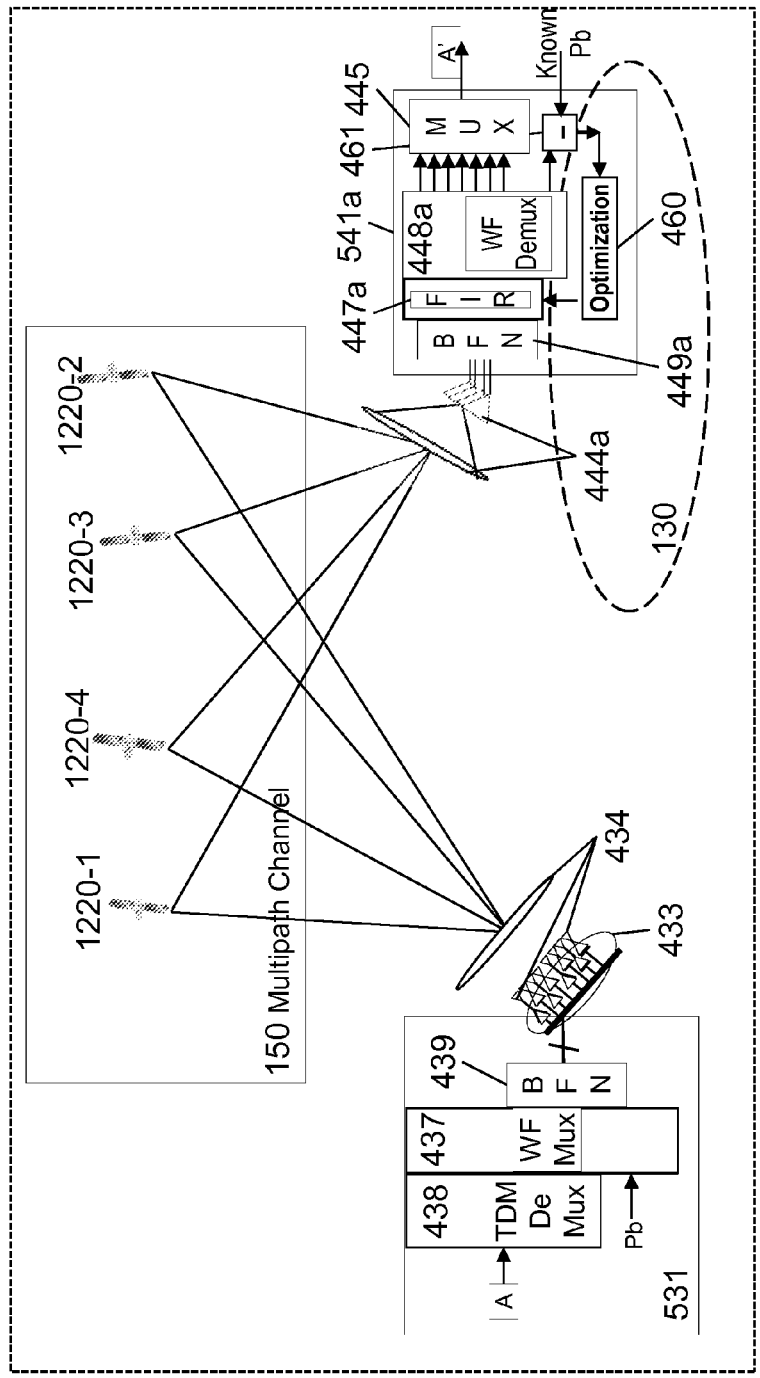
FIG. 25 depicts a point-to-point (p-to-p) high bandwidth MIMO communications configuration with WF muxing via 4 satellites.

FIG. 25 depicts similar configuration as that in FIG. 21, except the 4 UAVs 120 are replaced by multiple satellites 1220. These satellites 1220-1 to 1220-4 may be in various earth orbits with radiated 10s watt or 100s watt of RF power each.

Figure 26:
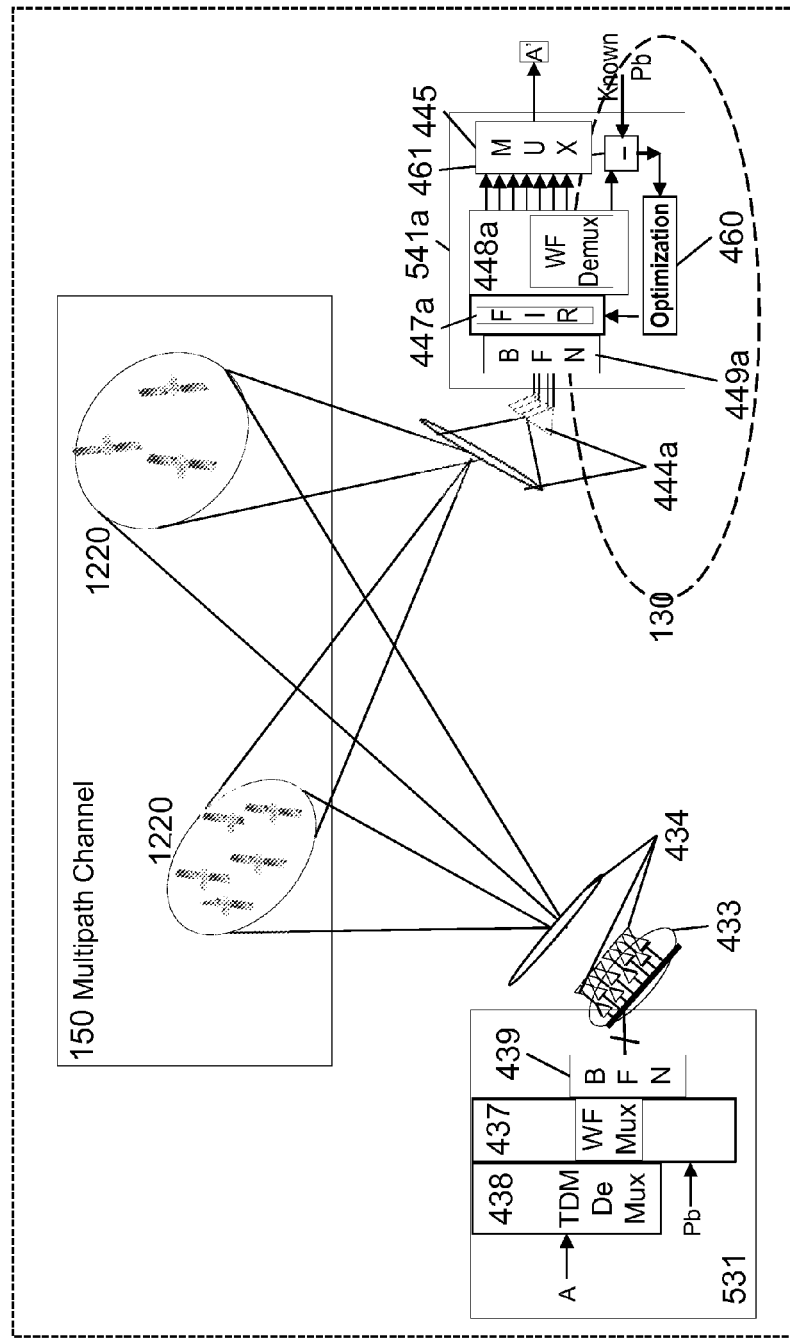
FIG. 26 depicts another p-to-p MIMO configuration similar to that of FIG. 25 with greater channel capacity. It can be scaled for a broadband wireless communications pipe with a higher channel capacity with more satellite transponders.
Figure 27:
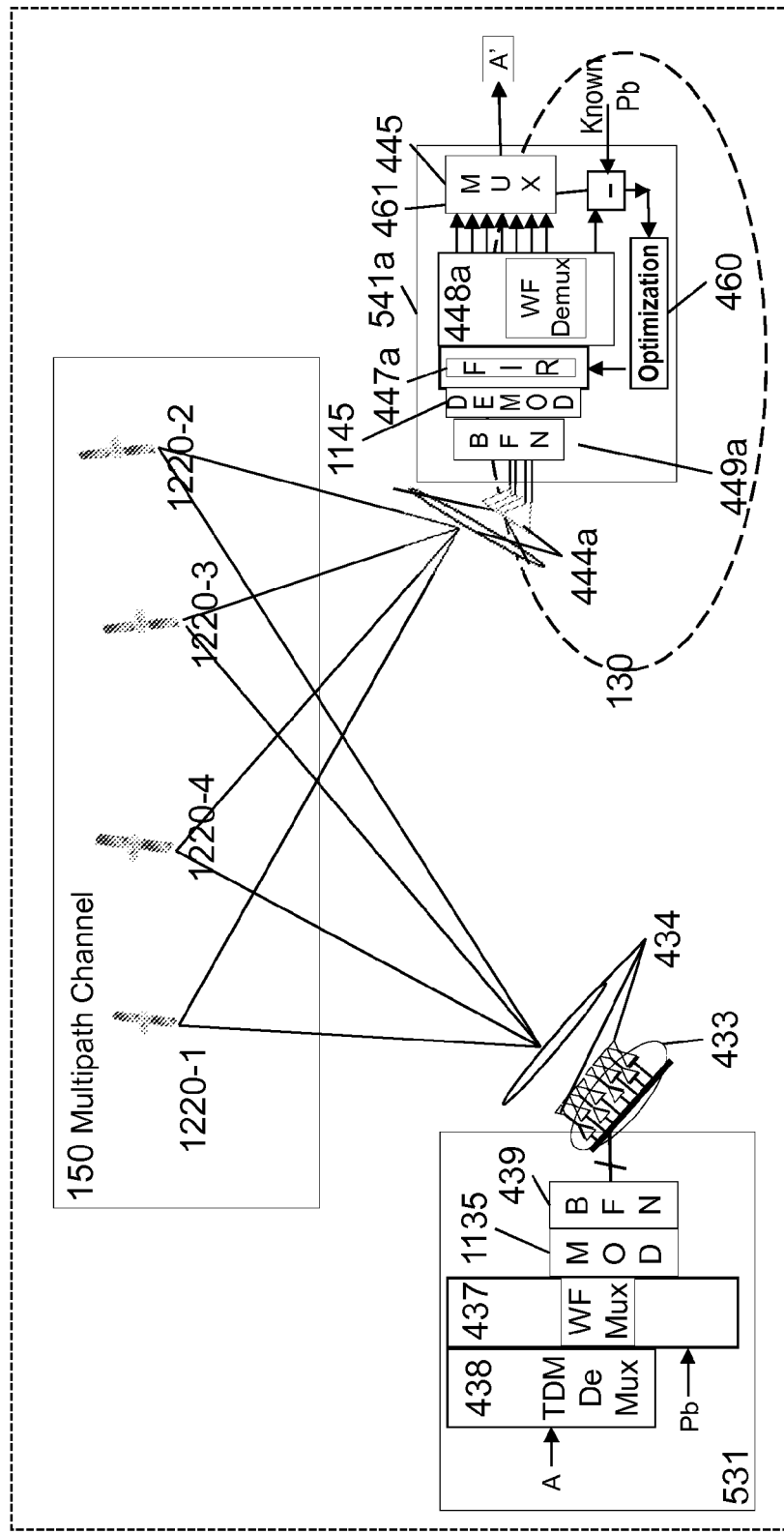
FIG. 27 depicts a point-to-point (p-to-p) high bandwidth communications configuration with multiple channels with channel binding via a non-coherent WF muxing via 4 transponding satellites. WF muxing transforms are performed on data to be transmitted before multi-channel modulations. Similarly, WF demuxing are implemented on received data sets after demodulated on signals received from multiple channels. This channel blinding configuration via WF muxing provides better data transport privacy and enhanced reliability via redundancy; but not higher signal-to-noise ratio (SNR).

FIG. 26 depicts similar configuration as that in FIG. 25, except the small or micro satellites 1220, each radiated normally less than 100s watt of RF power are spatially separated into multiple groups FIG. 27 depicts similar configuration as that in FIG. 25, except the WF muxing are applied in transmitters to streams of data before they are modulated by a modulator 1135 to become signal streams, and WF demuxing in receivers are applied recovered signal streams after they are demodulated by a demodulator 1145 to become recovered data streams. A transmitter 531 is programmed to enable an un-modulated input data stream, Ai, segmented into multiple parallel substreams by a TDM demuxer 438, or an equivalent, followed by a M-to-M WF muxing transform 437. The outputs of the TDM demuxer 438 only occupy 75% of the M input ports. For cases with M=16, 12 inputs are for connections to the TDM demuxers. The remaining 4 are for connections to known signals for diagnostic or redundancies. The M WF muxed data streams from the M outputs are grouped into 4 streams via 4 multiplexing devices before sent to a bank of modulators 1135 followed by a 4 beam beam-forming-networks (BFN) 439, transmitting radios 433 and then a multiple beam antenna 434. As a result, modulations are on 4 grouped WF muxed data streams. The 4 modulated signal streams after the modulators 1135 are frequency up-converted and amplified before radiated toward 4 separated UAVs 120. Each UAV 120-1, 120-2, 120-3, or 120-4 carries a modulated signals stream from one of the four grouped WF muxed data substreams.

In order to recover desired data streams A at a first destination, the receiver 541a shall be accessible to, at least, any three of the four satellites 1220. A receive 541a is programmed from the configuration in FIG. 25 to an alternate configuration with a bank of demodulators 1145 following a receiving beam-forming network (BFN) 449a for 4 tracking beams and before a bank of adaptive equalizers 447a and a WF demuxing transform 448a. The demodulators shall convert received signals (waveforms) into data substreams. The optimization process 460 is to align the timing among the data substreams normally via adaptive equalizers 447a.

The depicted approach is for "non-coherent" WF muxing/de-muxing applications to enhance reliability and security of data transport through the active scattering communications, while those configurations in FIGS. 12, and 12a are for "coherent" WF muxing/de-muxing applications, to enable (1) coherent power combining and/or (2) efficient dynamic combined resource allocations through the multipath dominated communications with multiple transponding satellites 1220.

Figure 28:
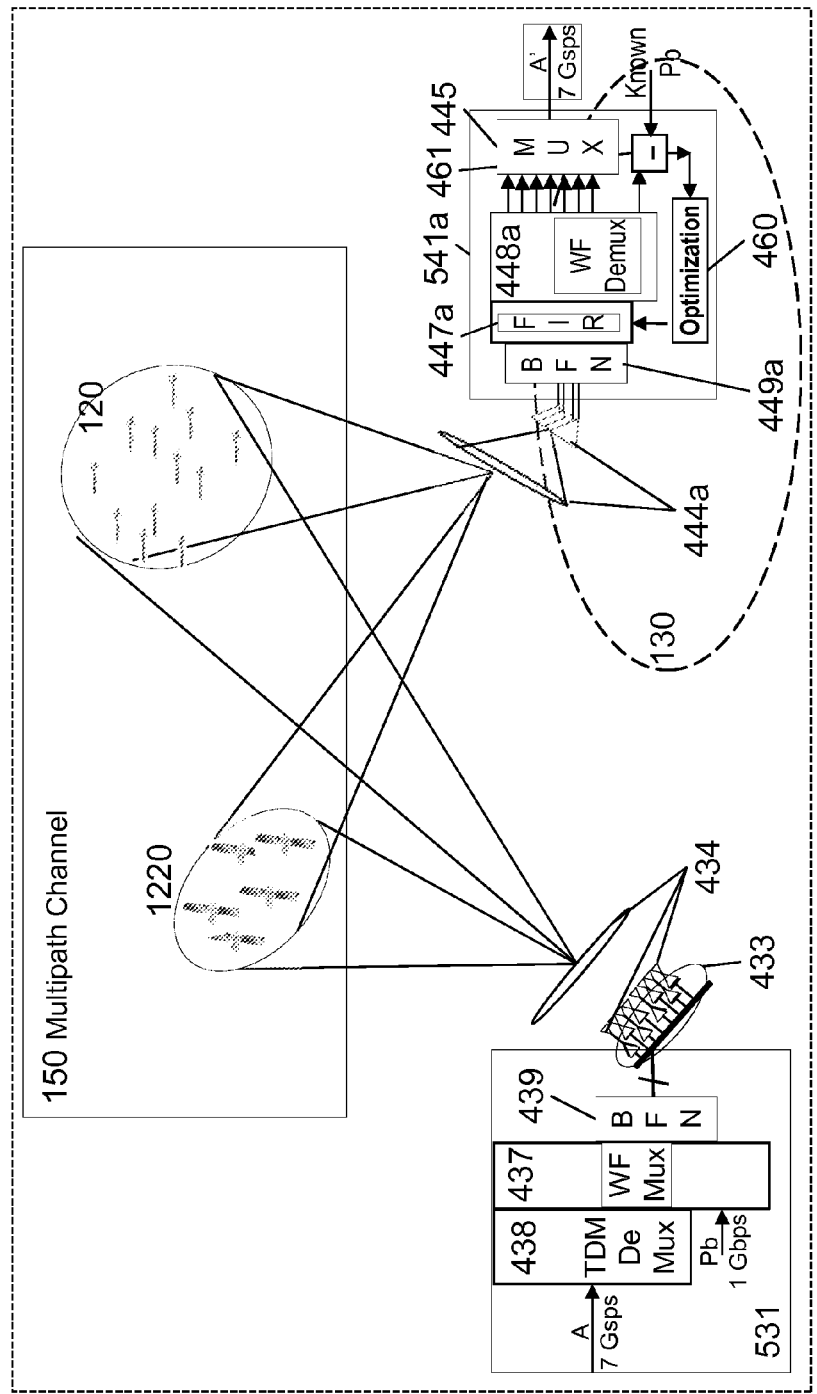
FIG. 28 depicts a point-to-point (p-to-p) high bandwidth MIMO communications configuration with WF muxing via 4 transponding satellites and 4 transponding airborne platforms.

FIG. 28 depicts similar configuration as that in FIG. 26, except the some spatially separated groups of the satellites 1220, are replaced by clusters of mini UAVs 120.

REFERENCES

1. "MIMO-OFDM Wireless Systems: Basics, Perspectives, and Challenges," by Helmut Bölcskei, Eth Zurich; IEEE Wireless Communications, August 2006.
2. "Multiuser MIMO-OFDM for Next-Generation Wireless Systems," by Ming Jiang, and Lajos Hanzo, Proceedings of the IEEE|Vol. 95, No. 7, July 2007.
3. U.S. Pat. No. 7,324,480, "Mobile Communications Apparatus and Methods including base-station and Mobile station having multi-antennas;" by S. J. Kim and et al; issued on Jan. 29, 2008.
4. "A Survey on the Successive Interference Cancellation Performance for OFDM Systems," by N. I. Miridakis And D. D. Vergados; IEEE Communications Surveys & Tutorials, Vol. 15, No. 1, First Quarter 2013.
5. U.S. Pat. No. 8,111,646, "Communications Systems for Dynamically Combing power from a Plurality of Propagation Channels in order to Improve Power Levels of Transmitted Signals without Affecting Receiver and Propagation Segments," by DCD Chang; issued on Feb. 7, 2012.
6. "Improving MU-MIMO Performance in LTE-(Advanced) by Efficiently Exploiting Feedback Resources and through Dynamic Scheduling," by Ankit Bhamri et al, WCNC 2013, IEEE Wireless Communications and Networking Conference, Apr. 7-10, 2013, Shanghai, China.
7. "A Simple Transmit Diversity Technique for Wireless Communication," by S. Alamouti, IEEE Journal on Selected Areas in Communications Vol: 16, Issues: 8, October 1998.

What is claimed is:
1. A communication system comprising:
a transmitter comprising:
a plurality of first antenna elements; and
a preprocessor coupled to the first antenna elements, the preprocessor being configured to process a set of probing signals, the transmitter transmitting the set of probing signals via the first antenna elements; and
one or more active scattering platform configured to receive one or more of the probing signals and re-radiate the one or more of the probing signals toward a plurality of second antenna elements of one or more remote receiver;
wherein the one or more remote receiver receives the re-radiated one or more of the probing signals via the second antenna elements, generates and transmits a response to the re-radiated one or more of the probing signals, wherein the first antenna elements receive the response, and wherein the preprocessor updates channel state information based on the received response, generates a set of composite transfer functions based on the updated channel state information and generates a plurality of shaped beams for the first antenna elements based on the composite transfer functions, and
wherein the channel state information includes a set of transfer functions characterizing at least a propagating path between a transmitter element and a receiver element and one of the composite transfer functions is a linear combination of the set of the transfer functions.

2. The communication system of claim 1, wherein the one or more active scattering platform is airborne and comprises a plurality of transponders.

3. The communication system of claim 1, wherein the transmitter is at a source on ground and the one or more remote receiver is on ground.

4. The communication system of claim 1, wherein the transmitter is on a mobile platform.

5. The communication system of claim 1, wherein the one or more remote receiver is on one or more mobile platform.

6. The communication system of claim 1, wherein the one or more active scattering platform is ground based.

7. The communication system of claim 1, wherein the transmitter is on an airborne platform and the one or more active scattering platform is ground based or on an ocean surface.

8. The communication system of claim 1, wherein the preprocessor dynamically optimizes the composite transfer functions based on the updated channel state information.

9. The communication system of claim 1, wherein the one or more active scattering platform is on an ocean surface.

10. The communication system of claim 1, wherein the preprocessor comprises a beam forming network configured to generate the shaped beams such that a radiation pattern of each of the shaped beams is based on one of the composite transfer functions, the radiation pattern of each of the shaped beams being a linear combination of radiation patterns of the first antenna elements.

11. The communication system of claim 1, wherein the preprocessor comprises a wavefront multiplexer configured to receive input signals and generate a plurality of linear combinations of the input signals.

12. A communication system comprising:
a transmitter comprising:
a plurality of first antenna elements; and
a preprocessor coupled to the first antenna elements, the preprocessor being configured to compute channel state information based on responses to probing signals received from one or more remote receiver, generate a set of composite transfer functions based on the channel state information, generate a plurality of shaped beams for the first antenna elements based on the composite transfer functions, and process a plurality of first signals destined for the one or more remote receiver, the transmitter transmitting the processed first signals via the shaped beams; and
one or more active scattering platform configured to receive the processed first signals and re-radiate the processed first signals toward one or more second antenna element of the one or more remote receiver,
wherein the channel state information includes a set of transfer functions characterizing at least a propagating path between a transmitter element and a receiver element and one of the composite transfer functions is a linear combination of the set of the transfer functions.

13. The communication system of claim 12, wherein the one or more active scattering platform comprises multiple transponders.

14. The communication system of claim 12, wherein the transmitter and the one or more remote receiver are ground based.

15. The communication system of claim 12, wherein the one or more active scattering platform is an airborne platform and comprises a transponder, the transponder comprising a plurality of third antenna elements.

16. The communication system of claim 12, wherein the transmitter is on a mobile platform.

17. The communication system of claim 12, wherein the one or more remote receiver is on a mobile platform.

18. The communication system of claim 12, wherein the one or more active scattering platform comprises distributed airborne platforms for communication comprising multiple transponders, each of the transponders comprising a plurality of third antenna elements.

19. The communication system of claim 18, wherein the distributed airborne platforms are configured to move in a slow moving flight pattern and to be randomly distributed over an airspace.

20. The communication system of claim 18, wherein the distributed airborne platforms are configured to move in a slow moving flight pattern and to beslustered into multiple groups.

21. The communication system of claim 12, wherein the one or more active scattering platform is ground based or on an ocean platform.

22. The communication system of claim 12, wherein the transmitter is on an airborne platform.

23. The communication system of claim 12, wherein the one or more remote receiver is on an airborne platform.

24. The communication system of claim 12, wherein the preprocessor comprises a beam forming network configured to generate the shaped beams such that a radiation pattern of each of the shaped beams is based on one of the composite transfer functions, the radiation pattern of each of the shaped beams being a linear combination of radiation patterns of the first antenna elements.

25. The communication system of claim 12, wherein the preprocessor comprises a wavefront multiplexer configured to receive the first signals and generate a plurality of linear combinations of the first signals as the processed first signals.

26. A communication system comprising:
a transmitter comprising:
a plurality of first antenna elements; and
a preprocessor coupled to the first antenna elements, the preprocessor being configured to compute channel state information based on responses to probing signals received from one or more remote receiver, generate a set of composite transfer functions based on the channel state information, generate a plurality of shaped beams for the first antenna elements based on the composite transfer functions, and process a plurality of first signals destined for the one or more remote receiver, the transmitter transmitting the processed first signals via the shaped beams; and
a swarm of small active scattering air platforms configured to receive the processed first signals and re-radiate the processed first signals toward one or more second antenna element of the one or more remote receiver,
wherein the channel state information includes a set of transfer functions characterizing at least a propagating path between a transmitter element and a receiver element and one of the composite transfer functions is a linear combination of the set of the transfer functions.

27. The communication system of claim 26, wherein the preprocessor comprises a beam forming network configured to generate the shaped beams such that a radiation pattern of each of the shaped beams is based on one of the composite transfer functions, the radiation pattern of each of the shaped beams being a linear combination of radiation patterns of the first antenna elements.

28. The communication system of claim 1, wherein the preprocessor comprises a wavefront multiplexer configured to receive the first signals and generate a plurality of linear combinations of the first signals as the processed first signals.

\* \* \* \* \*